US010198777B2

(12) United States Patent
Savenok et al.

(10) Patent No.: US 10,198,777 B2
(45) Date of Patent: Feb. 5, 2019

(54) SYSTEM, METHOD, AND APPLICATION FOR EXCHANGING CONTENT IN A SOCIAL NETWORK ENVIRONMENT

(71) Applicant: REMOTE MEDIA, LLC, Wheaton, IL (US)

(72) Inventors: Alexander Savenok, Grandview, MO (US); Pavel Savenok, Wheaton, IL (US); Gregory H. Leekley, Charlotte, NC (US)

(73) Assignee: REMOTE MEDIA, LLC, Wheaton, IL (US)

( * ) Notice: Subject to any disclaimer, the term of this patent is extended or adjusted under 35 U.S.C. 154(b) by 0 days.

(21) Appl. No.: 15/407,192

(22) Filed: Jan. 16, 2017

(65) Prior Publication Data
US 2017/0124664 A1 May 4, 2017

Related U.S. Application Data

(63) Continuation-in-part of application No. 14/099,348, filed on Dec. 6, 2013, now Pat. No. 9,549,024, and a
(Continued)

(51) Int. Cl.
*H04L 29/06* (2006.01)
*G06F 21/60* (2013.01)
(Continued)

(52) U.S. Cl.
CPC .......... *G06Q 50/01* (2013.01); *G06F 21/604* (2013.01); *G06Q 20/065* (2013.01);
(Continued)

(58) Field of Classification Search
CPC ............. H04L 67/1074; H04L 67/1063; H04L 41/5009; H04L 41/5025; H04L 41/5035;
(Continued)

(56) References Cited

U.S. PATENT DOCUMENTS

2007/0156726 A1* 7/2007 Levy .................. G06F 17/3002
2011/0107379 A1* 5/2011 Lajoie ................. H04L 65/1016
725/87
2012/0304233 A1 11/2012 Roberts et al.

* cited by examiner

*Primary Examiner* — Tu T Nguyen
(74) *Attorney, Agent, or Firm* — Christopher J. Scott

(57) ABSTRACT

Users share live (SHARE LIVE) content in real-time by sharing socially-targeted user-selected/generated content while simultaneously consuming content from any integrated content provider. In the context of an exemplary music-based scenario, the user, while listening to music from any integrated music provider, may initiate a SHARE LIVE session such that concurrent data streams are maintained and media playback information is managed separately from media content playback channels. Information about playback events is continuously transmitted via facilitated sockets. Other users may consume shared content (LISTEN LIVE) by tapping a proprietary resolution method to identify and properly source the media content files the broadcaster is sharing. Independent social broadcast streams may also be overlaid atop the direct playback of media content from a preferred provider as governed by the proprietary resolution method. An event-handling micro-service maintains and combines the broadcaster's content playback actions and social content, which are synchronized on multiple user devices.

8 Claims, 48 Drawing Sheets

Related U.S. Application Data continuation-in-part of application No. 15/048,480, filed on Feb. 19, 2016, now Pat. No. 9,729,497, and a continuation-in-part of application No. 15/124,014, filed on Sep. 6, 2016, and a continuation-in-part of application No. 15/305,977, filed on Oct. 21, 2016.

(60) Provisional application No. 62/306,546, filed on Mar. 10, 2016.

(51) Int. Cl.
*G06Q 50/00* (2012.01)
*G06Q 20/06* (2012.01)
*G06Q 50/18* (2012.01)
*H04L 29/08* (2006.01)

(52) U.S. Cl.
CPC ........... *G06Q 50/184* (2013.01); *H04L 63/10* (2013.01); *H04L 65/1069* (2013.01); *H04L 65/4076* (2013.01); *H04L 65/4084* (2013.01); *H04L 67/1063* (2013.01); *H04L 67/1074* (2013.01)

(58) Field of Classification Search
CPC .......... G06F 9/5061; G06F 9/541; G06F 8/51; G06F 8/68
USPC ......................................................... 709/217
See application file for complete search history.

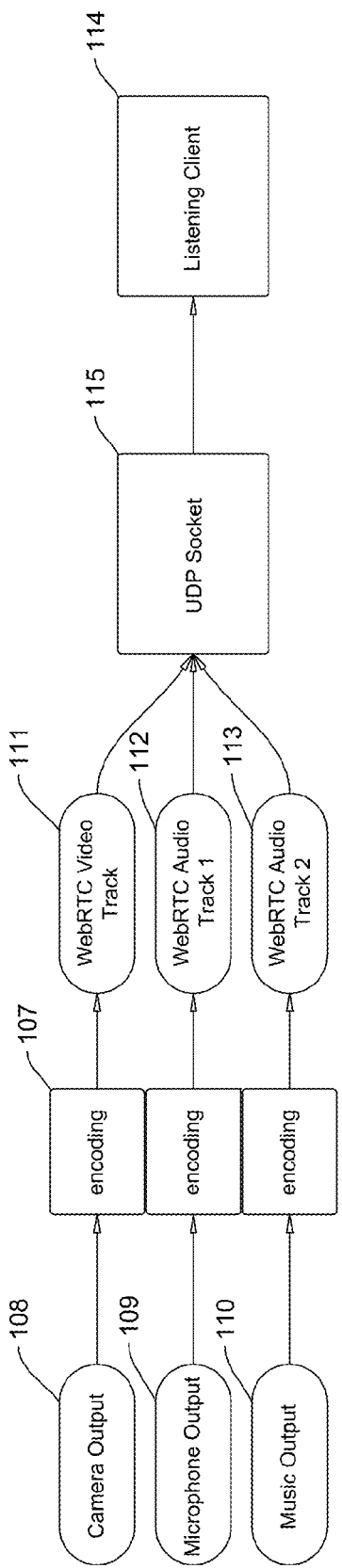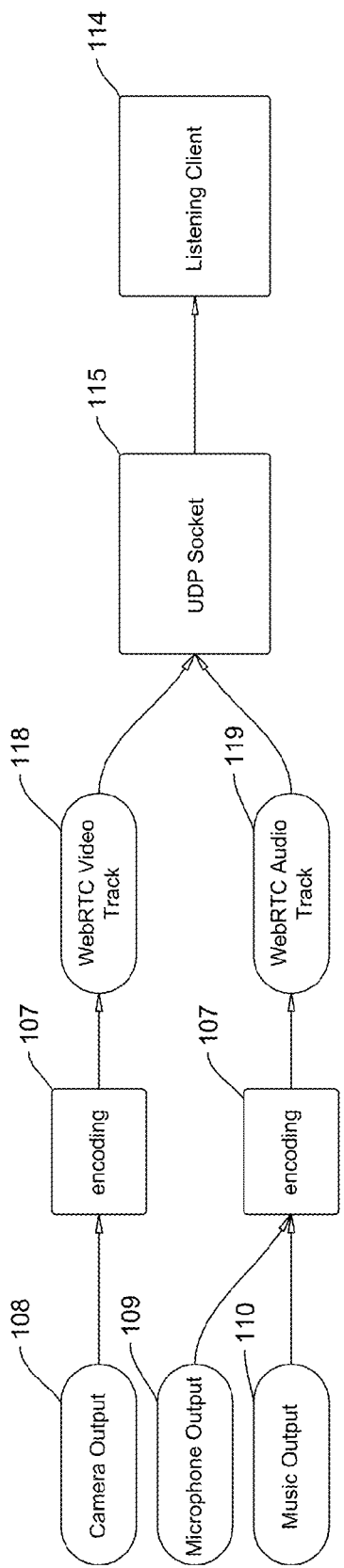

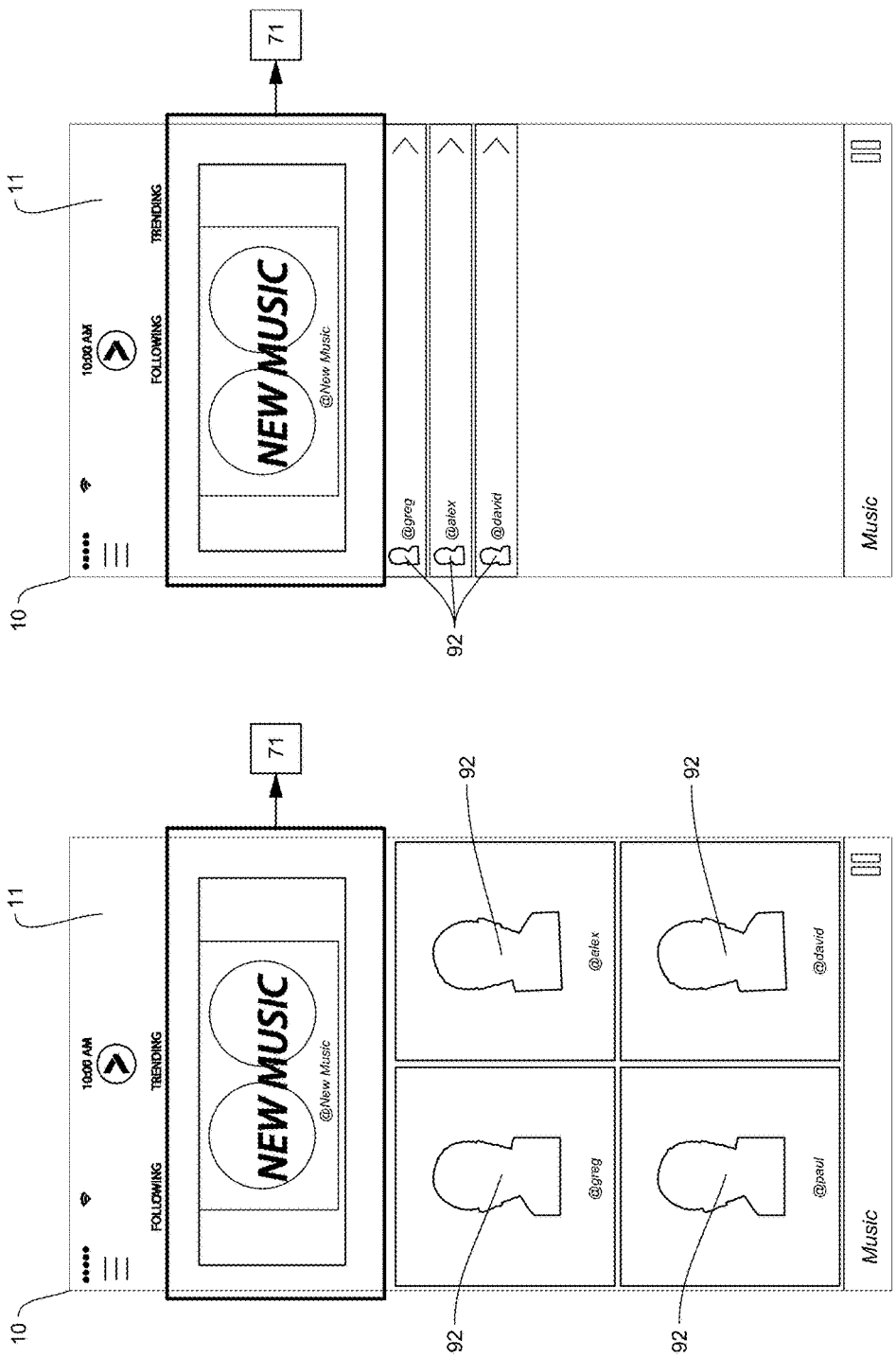

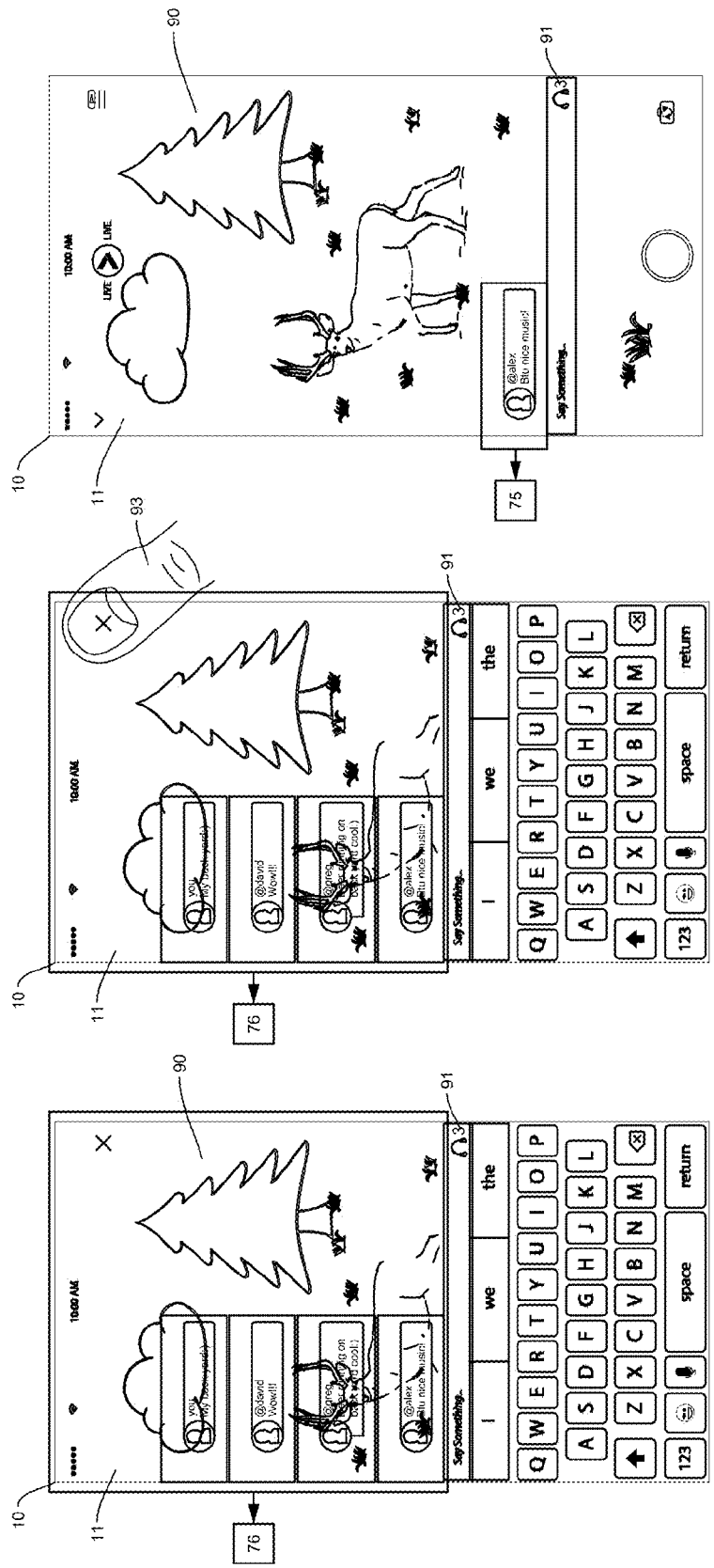

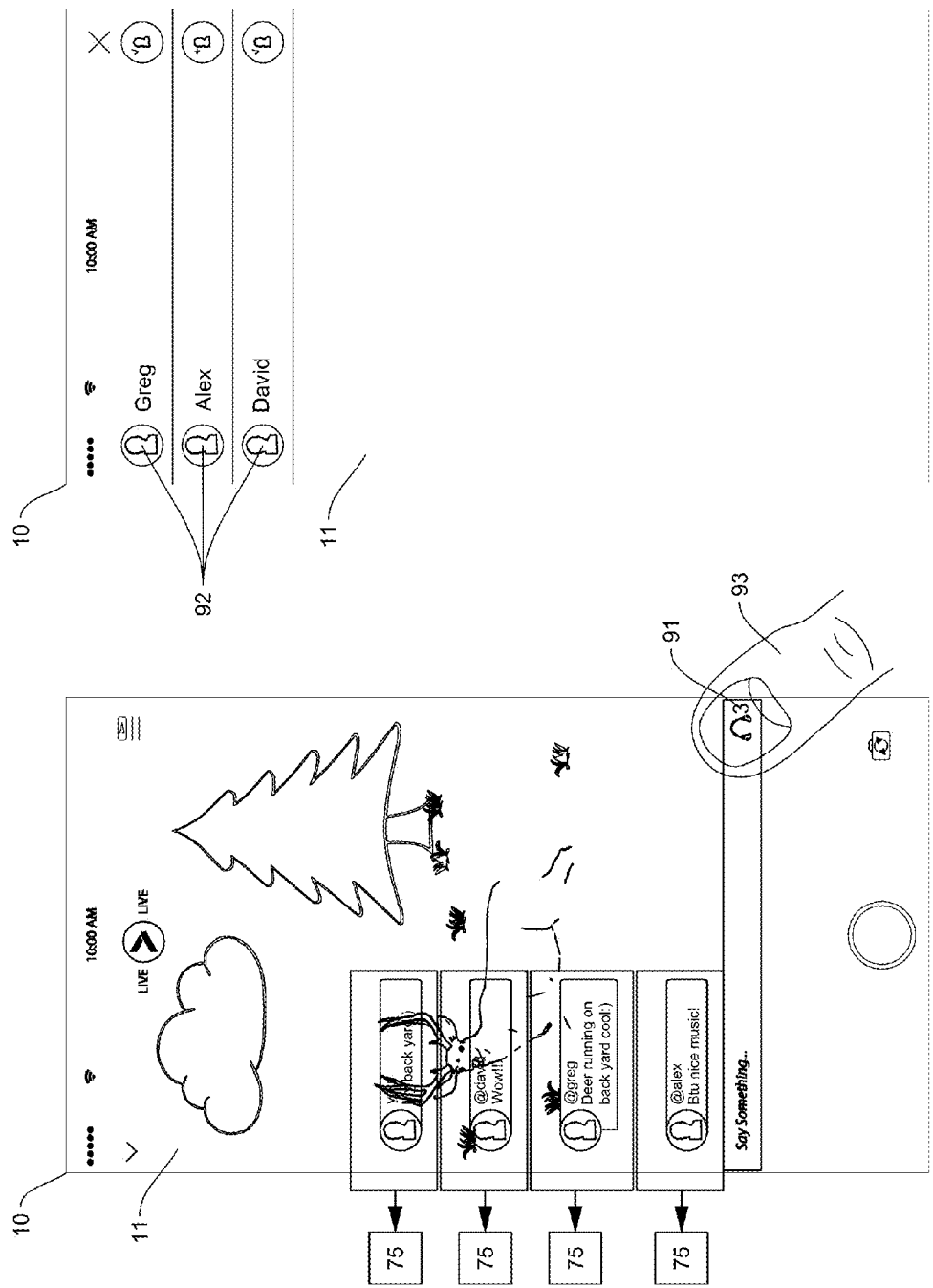

SYSTEM, METHOD, AND APPLICATION FOR EXCHANGING CONTENT IN A SOCIAL NETWORK ENVIRONMENT

PRIOR HISTORY

This U.S. patent application claims the benefit of U.S. Provisional Patent Application Ser. No. 62/306,546 filed in the United States Patent and Trademark Office (USPTO) on 10 Mar. 2016; pending U.S. patent application Ser. No. 14/099,348 filed in the USPTO on 6 Dec. 2013; pending U.S. patent application Ser. No. 15/048,480 filed in the USPTO on 19 Feb. 2016; pending U.S. patent application Ser. No. 15/124,014 filed in the USPTO on 6 Sep. 2016; and pending U.S. patent application Ser. No. 15/305,977 filed in the USPTO on 21 Oct. 2016, the specifications and drawings of which applications are hereby respectively collectively incorporated in their entireties herein by this reference thereto.

FIELD OF THE INVENTION

The present invention generally relates to mobile application features or software tools interoperable or cooperable by way of networked computers as typified by networked mobile communications devices for implementing the mobile application features or software tools and enabling social exchanges of content. More particularly, the mobile application features or software tools according to the present invention enable users to share and consume in real time user-selected or user-generated content while simultaneously sharing and consuming media content, the latter of which provides certain context within which the live user-selected/user-generated content is to be shared/consumed.

BACKGROUND OF THE INVENTION

The present discussion represents an outgrowth of an originally perceived need within social media networks to provide for more robust, efficient, and economically advantageous means for sourcing media content to consumers. In its infancy, the authors noted that social media provides a host of sources for multimedia content, no two of which may be viewed as equal for any given consumer for all time. In other words, the consumer will typically prefer one source to another for whatever reason and thus no two content providers are or will always be equal in the eyes of the consumer. The consumer should thus be able to opt for his or her preferred source of content when consuming content.

An example of this is illustrated by musical track suggestions or recommendations by way of a music recommendation and streaming services exemplified by PANDORA® Internet Radio. The authors noted that when such a service would recommend or suggest a track based on user preferences, the user may well have any given recommended selection in his or her own music library, or alternatively, access thereto via an alternative provider. If the user-consumer's legally-owned, library-housed copy of that selection could be sourced to the client instead of the streamed version from the recommending service provider upon a recommendation prompt, the user-consumer's consumption of his or her own copy could very well represent a more robust, efficient, and economically advantageous source for that content. Legal rights to each potential source in the foregoing scenario obviously differ, and thus it becomes necessary to properly manage and/or account for delivered content for compliance purposes.

Accordingly, the authors developed a system for providing either Indirect or Direct source initiation of copyrighted media to be (smartly) routed and consumed via a second Direct source of the same copyrighted media. One effect of such routing is to create a synthetic broadcast where the originating source of the media (e.g. an "Indirect initiating Source") is not actually sent through to the media consumer but rather the consumer's own separate legally compliant "direct" access point and source of the very same copyrighted material is delivered instead.

An "Indirect Initiating Source" may thus be defined as any source whereby the consumer is not "directly" selecting the specific media to be consumed but that media selection is coming from a second "Indirect Initiating Source" whether that source is a computer-curated stream such as a digital "radio" provider or an individual live curator. Such (smart) routing or (smart) syncing of an Indirect source to a separate Direct compliant source uniquely enables a legal and compliant collaborative listening or viewing experience of media between two plus people when and where the access to the copyrighted material is derived from two plus separate compliant media sources of that material.

Alternatively, a "Direct Initiating Source" may be defined as a source whereby the consumer is "directly" selecting the specific media to be consumed and that specific media may be obtained from an optimal or preferred data resource location as selected from at least two locations to which the consumer has legal access, which optimization protocol is based upon pre-defined user parameters such as price efficiency and/or data quality. Such (smart) routing or (smart) syncing of a such a request to a direct compliant source uniquely enables legal and compliant listening or viewing experience of media when and where the access to the copyrighted material is optimally or preferably derived from at least two separate compliant media sources of that material to which the consumer has legal access.

Referencing allowed U.S. patent application Ser. No. 14/099,348 from which this application claims a benefit, the reader will there consider functionality for delivering an indirect request stream from a local server (e.g. digital radio as exemplified by PANDORA® Internet Radio); delivering an indirect request stream from a peer-connected server; delivering an indirect request stream from a second direct request source (e.g. iTUNES MATCH® or SPOTIFY® branded services or cloud locker like DROPBOX® branded services or any media in the cloud); delivering an indirect request stream from a peer-connected server based on a second direct request source's right to play or stream; delivering a direct request stream from a second direct request source based upon (a) price efficiency or (b) sound quality of source; and delivering a direct request stream from a peer-connected source based upon a second direct request source's right to play or stream.

Given the data origin-agnostic or cloud-agnostic aspects of that system, the system further provides (a) industry rights management (b) compliance monitoring and/or (c) compliance reporting where delivery of content is sourced from a secondary source other than the original requested source service including the examples there listed and as re-presented above. No known prior art reference provides a routing synchronization system for providing an optimally or preferably sourced broadcast to a consumer comprising certain smart routing mechanisms for routing select legally-protected content to a consumer having alternative and preferable source(s) therefor. The smart routing system(s) according to the '348 application thereby provide an optimally or preferably sourced broadcast ideally and patentably characterized by optimal source delivery of select legally-protected content to the consumer as prompted by either indirect requests, or direct requests.

The smart source routing according to the '348 application may thus be preferably characterized by certain scenario types including local server-based delivery of either indirectly or directly requested streams; peer-connected server-based delivery of either indirectly or directly requested streams; or legal access point-based delivery of either indirectly or directly requested streams, which delivery bases are optimally selected based on pre-defined parameters set or defined by the user, such as price efficiency or audio/video quality. The invention of the '348 application is thus directed to real-time synchronization of streaming media content from either indirect or direct initiation sources to a direct source. The ability to source an indirect content stream with an alternative direct source (e.g. a personal and privately owned legal source NOT delivered from a peer-to-peer or computer-populated network) with a governing compliance appliance is believed foundational to the invention of the '348 application.

In other words, a content stream provider such as a digital radio provider is requested by a consumer to consume content from the content stream provider. The content stream provider and the consumer each have different legally owned access points to the content that is be streamed. The consumer may have a legal right to a direct request for this content form the consumer's own source or library, while the provider may stream content from a different source or library. A direct access point to the content from the user's own library is thus believed relatively more efficient or cost effective than obtaining access to the content from the provider. If the content is thus sourced from a consumer's own library, the content delivery will or should have an impact on compliance reporting by the content provider. The compliance appliance according to the invention of the '348 application accurately tracks and reports the resulting revenue generation for copyright holders.

United States Patent Application Publication No. 2012/0304233 authored by Roberts et al. is believed to be among the most pertinent prior art related to the subject invention. The Roberts et al. publication discloses Systems and Methods for Bridging and Managing Media Content Associated with Separate Content Networks and describes an exemplary system having at least one computing device located within a local media network configured to firstly generate a media index of local media content stored by one or more media content access devices located within the local media content network and cloud media content stored by one or more cloud computing devices located within a cloud media content service network and secondly manage the local media content and the cloud media content based on the media index and on a predefined media management heuristic.

Notably, Roberts et al. do not teach how to map media content across providers. In other words, the Roberts et al. teachings only appear to instruct on how two devices may be able to share a stream from a single provider, there being no corresponding mechanism or means (a) for mapping media content across providers, or (b) for streaming the same media content from a second provider when the media content is identical to the media content provided by a first provider. There is no reference to metadata mapping algorithms, nor is there any reference to any fingerprinting mechanisms to identify media content, and properly attribute media content to or associate media content with owners thereof across content providers.

Roberts et al. make mention that two devices could conceivably share the same media content session, but the method taught by Roberts et al. would present an extraordinary security risk over a public network exemplified by the Internet, and thus Roberts et al. specifically limit their methodology to local area networks. Roberts et al. indicate that the mechanism for synchronized viewing would be a shared media session. This assumes the retransmission of copyrighted data from one device to another across the Internet. Such a system would only be legal if both devices belonged to the same user (accessing a common content library owned by the user).

The invention of the '348 application, by contrast, is operable to transmit and re-create a broadcast across multiple users each of whom have their own rights or legal access to media content libraries, and in some cases their own respective rights and legal access to the very same media content library (e.g. two users accessing the SPOTIFY® branded library via two separate legal access points or accounts). Equating the Roberts et al. teaching to the invention of the '348 application would essentially result in mass copyright violations, and could be considered peer to peer file sharing.

Roberts et al. fail to teach a routing and synchronization system operable with one or more data sources within a network-based media content playback environment for providing an optimally sourced media content broadcast to a consumer, which routing and synchronization system is characterized by comprising a computer-implementable application for generally synchronizing and routing consumable, legally-protected media content to the consumer from an optimal routing instruction fulfillment source as prompted by routing and playback instructions generated via a routing instruction generation source.

The optimal routing instruction fulfillment source according to the present invention is preferably affiliated with at least one legal access point. The computer-implementable application is more particularly operable to generate the routing and playback instructions via the routing instruction generation source for governing playback of the consumable, legally-protected media content via a content-delivery primary channel; establish an instruction-passing secondary channel (in parallel to the content-delivery primary channel) to the consumer over an operable network infrastructure; and pass the routing and playback instructions to the consumer via the instruction-passing secondary channel for sourcing the consumable, legally-protected media content to the consumer from the at least one legal access point.

From a review of the foregoing citation in particular, and from a consideration of the prior art in general, it will be seen that the prior art perceives a need for an invention as otherwise taught by the specifications of the '348 application, but further colored or modified by the inclusion of simultaneous social content provision and consumption in the context of the underlying media broadcast experience. Further, the prior art perceives a need for a system whereby a user can control the source and type of social content overlay within the context of the underlying media broadcast experience, which latter feature is reflective of the specifications otherwise set forth in pending U.S. patent application Ser. No. 15/048,480 also incorporated herein by reference thereto, and as summarized in more detail hereinafter.

SUMMARY OF THE INVENTION

Among the many objectives of this invention is the basic provision of a computer-implementable mobile application, software tool or non-transitory computer readable medium with executable instructions executable by socially networked computers such as a tablet type computers, mobile phones, or similar other mobile communications devices for achieving the functionality here contemplated and is herein referred to as the VERTIGO[SM] branded computer-implementable mobile application or software tool. The VERTIGO[SM] branded computer-implementable mobile application or software tool essentially enables a music-based social media network, in which users share live content with synchronized music.

The VERTIGO[SM] branded computer-implementable mobile application or software tool according to the present invention essentially empowers users to share live (i.e. SHARE LIVE) moments of their life by way of social content in the form of video, audio, photographs, and text or SMS messaging delivered in real time while simultaneously attending to underlying or contextual media content as exemplified by music consumption as rebroadcast and sourced from any integrated music provider whether from free, low quality or from premium, high quality sources.

During a SHARE LIVE session, the VERTIGO[SM] branded computer-implementable mobile application or software tool according to the present invention maintains concurrent data streams that manage media playback information (e.g. metadata) separately from the media (e.g. video and/or audio) channels. Music, as an exemplary contextual medium, is not recorded for delivery as part of a video or audio stream. Rather, the VERTIGO[SM] branded computer-implementable mobile application or software tool according to the present invention continuously transmits information about playback events via facilitated sockets.

Receiving devices within the social network and outfitted with the VERTIGO[SM] branded computer-implementable mobile application or software tool may be referred to as LISTEN LIVE devices. The LISTEN LIVE devices are in communication with a proprietary resolution method to identify and properly source the tracks that the SHARE LIVE broadcaster is playing/sharing. The VERTIGO[SM] branded computer-implementable mobile application or software tool communicates with a separately maintained abstraction database of music entities and ID's across multiple third-party providers, enabling listeners' playback to be legally and variously sourced from across the platform.

It will thus be seen that the VERTIGO[SM] branded computer-implementable mobile application or software tool leverages existing digital rights to which listeners may be entitled. Because each listener must connect with a valid provider in order to stream premium content, social sharing via the VERTIGO[SM] branded computer-implementable mobile application or software tool may well impact the industry by incentivizing incremental adoption of premium music subscriptions.

Further, on a LISTEN LIVE device, independent social broadcast streams may be overlaid atop the direct playback of music from the listening user's connected provider or a non-subscription provider, as applicable. An event-handling micro-service maintains and combines the broadcaster's music playback actions and social content, which are synchronized on listeners' devices with timing precision for complete and consistent LISTEN LIVE experiences by multiple simultaneous listeners.

It will thus be seen that the VERTIGO[SM] branded computer-implementable mobile application or software tool according to the present invention enables a music-based social media network in which users SHARE LIVE content with synchronized music. The synchronized content is preferably intermittently transmitted via a live streaming protocol, and may be preferably delivered either in a separate audio track of the live media protocol, or via a separate hypertext transfer protocol or http request. Other objects of the present invention, as well as particular features, elements, and advantages thereof, will be elucidated or become apparent from, the following description and the accompanying drawing figures.

BRIEF DESCRIPTION OF THE DRAWINGS

FIG. 2 is a flowchart diagram of a first alternative music synchronization sequence according to the present invention.

FIG. 3 is a flowchart diagram of a second alternative music synchronization sequence according to the present invention.

FIG. 26A is a first alternative of a ninth screenshot enabled by the mobile application central to the practice of the present invention showing a first broadcast joining event screen and highlighting a broadcast tile/row prompt with enlarged profile pictured tiles or thumbnails.

FIG. 26B is a second alternative of a ninth screenshot enabled by the mobile application central to the practice of the present invention showing a first broadcast joining event screen and highlighting a broadcast tile/row prompt with reduced profile pictured bars.

FIG. 31 is a first view of a fourteenth screenshot enabled by the mobile application central to the practice of the present invention showing a third Chat event screen and highlighting Chat history functionality.

FIG. 31A is a second view of the fourteenth screenshot enabled by the mobile application central to the practice of the present invention showing the third Chat event screen and highlighting Chat history functionality with a user's finger depicted engaging a prompt to return or navigate the user to the thirteenth screenshot.

FIG. 31B is a second view of the thirteenth screenshot enabled by the mobile application central to the practice of the present invention showing a second Chat event screen and highlighting incoming Chat message functionality.

FIG. 32 is an enlarged second view of the fourteenth screenshot enabled by the mobile application central to the practice of the present invention showing the third Chat event screen and highlighting Chat history functionality with a user's finger depicted engaging a broadcast listener prompt to return or navigate the user to the thirteenth screenshot.

FIG. 32A is an enlarged view of a fifteenth screenshot enabled by the mobile application central to the practice of the present invention showing a listing of broadcast listeners.

FIG. 35A is a second alternative application initialization screenshot enabled by the mobile application central to the practice of the present invention showing a launch prompt and a Share/End dropdown selection for either broadcast initiation or broadcast termination as made operable by engagement of a fragmentary user finger with a corresponding user prompt.

DETAILED DESCRIPTION OF THE PREFERRED SYSTEM AND METHODOLOGY

Referencing the drawings now with more specificity, the present invention basically provides or enables a social media network within which network users share and consume social content in real time while simultaneously attending to an underlying synchronized media broadcast as a contextual basis within or against which the shared and consumed social content is to be considered. In an exemplary embodiment or preferred practice, the synchronized media broadcast is music-based. The synchronized content is intermittently transmitted via a live streaming protocol, and the music or media is delivered by way of either a separate audio/media track of the live media protocol, or via a separate http request.

The music-based social media network enabled by the present invention is so enabled by way of at least two, but preferably a series of networked computers and computer-implementable instructions made operable via the networked computers. Computers within the context of these specifications may be preferably exemplified or typified by mobile communications devices as at 10 such as smart phones and/or tablets each of which is basically outfitted with the VERTIGO$^{SM}$ branded computer-implementable mobile application or software tool 22 according to the present invention.

Figure 1:
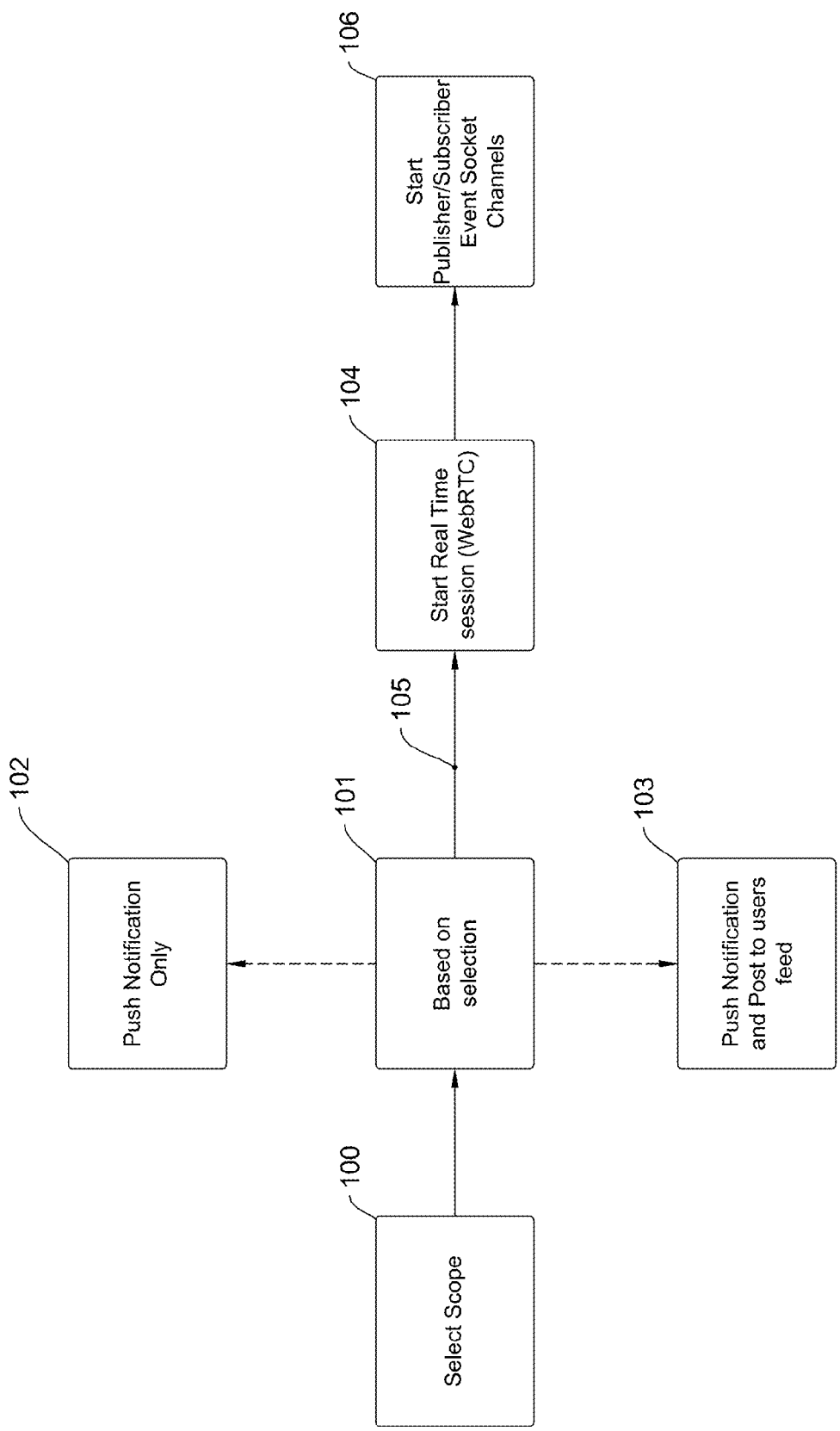
FIG. 1 is a flowchart diagram of a broadcast initialization or live streaming initiation sequence according to the present invention.

FIG. 1 is a flowchart diagram generally depicting a live streaming session initiation or broadcast initialization sequence according to the present invention. The VERTIGO$^{SM}$ branded computer-implementable mobile application or software tool 22 according to the present invention is made operable or is implemented by user devices as at 10 having a visual display 11 as further generally depicted in the screenshot depictions submitted in support of these specifications. The live stream or broadcast session enabled by the VERTIGO$^{SM}$ branded computer-implementable mobile application or software tool 22 is initiated by a user upon his or her device 10 via an initialization prompt 12 displayed upon the visual display 11.

Once the scope of the broadcast session is selected as at process 100, the client initiates either of two push notification sequences as at processes 102 and 103 (dependent upon the scope selection), and a Web Real Time Communication or WebRTC streaming session as at process 104. Based or dependent upon the scope selection as at decision symbol 101, an additional "post to a user's feed" sequence is embraced as depicted at 103. The broadcast streaming session is initiated as at 105 via a socket connection between the Application Server 80 and the client application 22. Once the streaming session is initiated, the client application 22 begins to send events playback and comment events on publisher/subscriber sockets as at process 106. The playback events include information on changes in playback, load information, along with timestamp information that is used to synchronize playback on listening clients. The comment events include start/end time for video and audio commentary.

Figure 4:
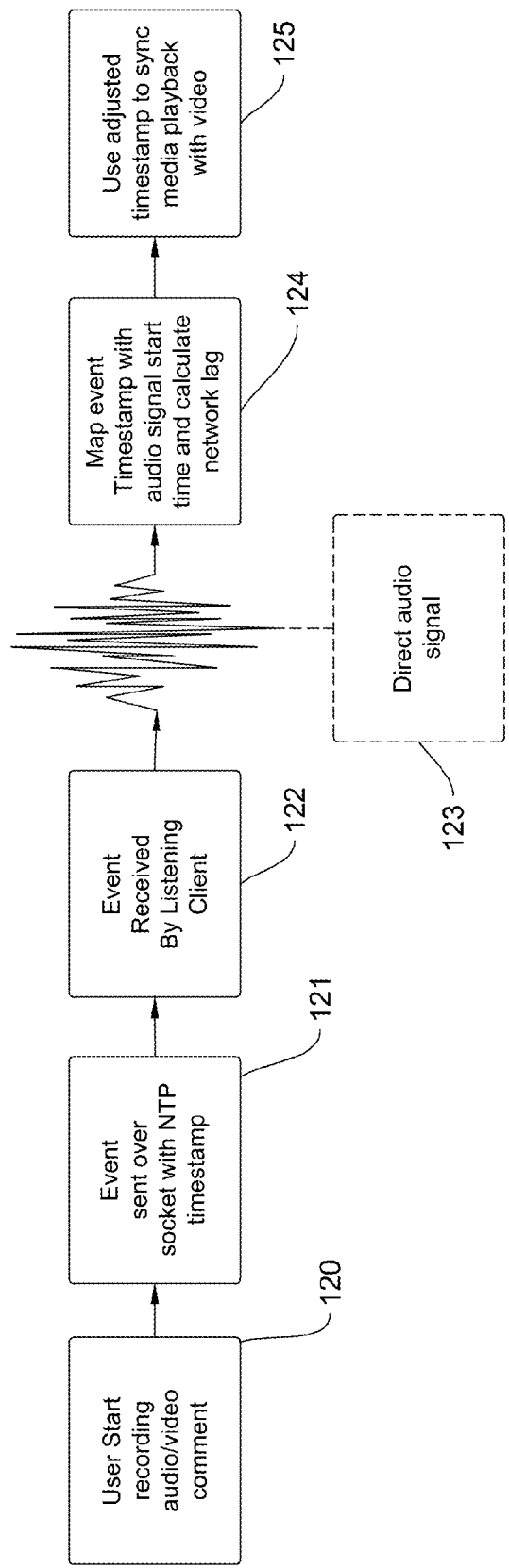
FIG. 4 is a flowchart diagram of a third alternative music synchronization sequence according to the present invention.
Figure 5:
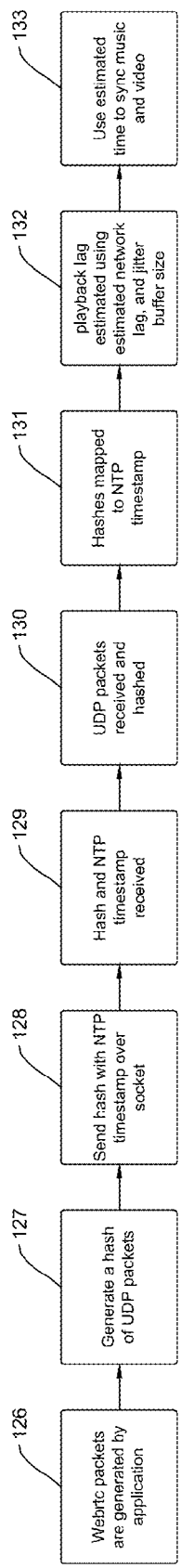
FIG. 5 is a flowchart diagram of a fourth alternative music synchronization sequence according to the present invention.
Figure 6:
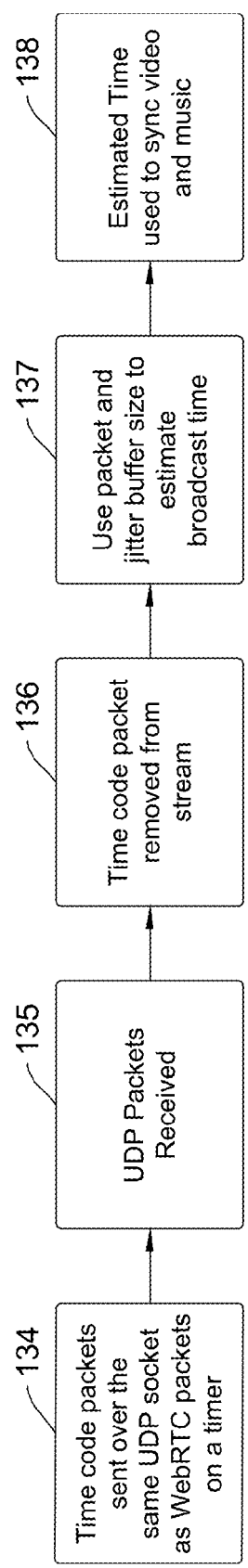
FIG. 6 is a flowchart diagram of a fifth alternative music synchronization sequence according to the present invention.

The present invention contemplates or envisions five possible methods or options for synchronizing music/media playback with real time video and audio content. FIG. 2 is a flowchart depicting a first alternative method or option for synchronizing music/media playback with real time video and audio content; FIG. 3 is a flowchart depicting a second alternative method or option for synchronizing music/media playback with real time video and audio content; FIG. 4 is a flowchart depicting a third alternative method or option for synchronizing music/media playback with real time video and audio content; FIG. 5 is a flowchart depicting a fourth alternative method or option for synchronizing music/media playback with real time video and audio content; and FIG. 6 is a flowchart depicting a fifth alternative method or option for synchronizing music/media playback with real time video and audio content.

From a comparative inspection of FIG. 2 versus FIG. 3, it will be seen that a first alternative sequencing preferably involves separately encoding as at 107 each of camera output 108, microphone output 109, and music output 110 for respective WebRTC video track 111, audio track 1 112, and audio track 2 113 deliveries processed through to the listing client 114 via a User Datagram Packet or UDP socket 115. The second alternative sequencing, by contrast, preferably involves separately encoding as at 107 camera output 108 and microphone/music outputs 109/110 into respective WebRTC video and audio tracks 118 and 119 for delivery to the listing client via 114 a UDP socket 115.

The methodology depicted in FIG. 2 thus provides for the addition of a separate audio track to the real time session, which is sent and synchronized on the receiving client. The reason the audio track is not merged with the audio track for video and audio comments is to avoid the creation of a derivative work of the copyrighted underlying work or content. A slight increase in latency is observed in this method. The methodology depicted in FIG. 3, by contrast, slightly decreases the latency on real-time sessions, but comes at the cost of creating a derivative work by merging the two audio streams.

The third method or option generally depicted in FIG. 4 involves the use of playback events in conjunction with audio signal detection. This means that as a video/audio comment event initiates as at process 120, the client sends off an event notifying the listening client that a comment is being made as at process 121. The listening client receives the event as at process 122 and tracks the audio track of the WebRTC stream. The client detects an audio signal as at (non-silent) process 123, and maps the event timestamp to the current Network Time Protocol or NTP time as at process 124.

The methodology then estimates the broadcast time by taking the event start time for the comment event sent over socket as at process 121, subtracting that from the timestamp at which a comment was detected (non-silent audio signal) as at process 123 on the receiving end, which would give the actual lag between the two devices ((Signal Detected Timestamp)−(Comment Event Time Stamp)=Network Lag) as at process 124. That lag is then be used to calculate the estimated broadcast time, which is used to delay media playback events as at process 125, so that they start approximately in synchrony with the WebRTC video/audio stream.

The fourth method or option involves the use of playback events in conjunction with hashes on the WebRTC packets as at process 126. The hashes are generated before a packet is sent over the UDP socket as at process 127. The hash is sent with a timestamp over a Transmission Control Protocol or TCP socket 86 as at process 128. The listening client receives the hash and timestamp messages as at process 129, and hashes all incoming UDP network packets as at process 130. Once a hash for a network packet matches a hash from the TCP socket message as at process 131, the application subtract the sent timestamp (sent over TCP socket 86) from the received timestamp (retrieved from device when packet hashes match). This provides an estimated network lag, which can be used to calculate playback lag by adding network lag to the size of the jitter buffer (measured in milliseconds) as at process 132. The calculated playback lag would then be used to synchronize media playback events with the WebRTC stream as at process 133.

The fifth method or option requires that a packet be injected into the data stream of the WebRTC UDP port as at process 134. This packet contains the required UDP packet information, along with a timestamp. The application sends this packet on a timer over the same UPD port as all WebRTC data is being sent as at process 135. The packet information is received on the client side as at process 136 and used to generate a duration for WebRTC playback by subtracting the jitter buffer size from the timestamp received in the UDP packet as at process 137. The broadcast duration is used to synchronize playback events with the WebRTC video stream as at process 138.

Figure 7:
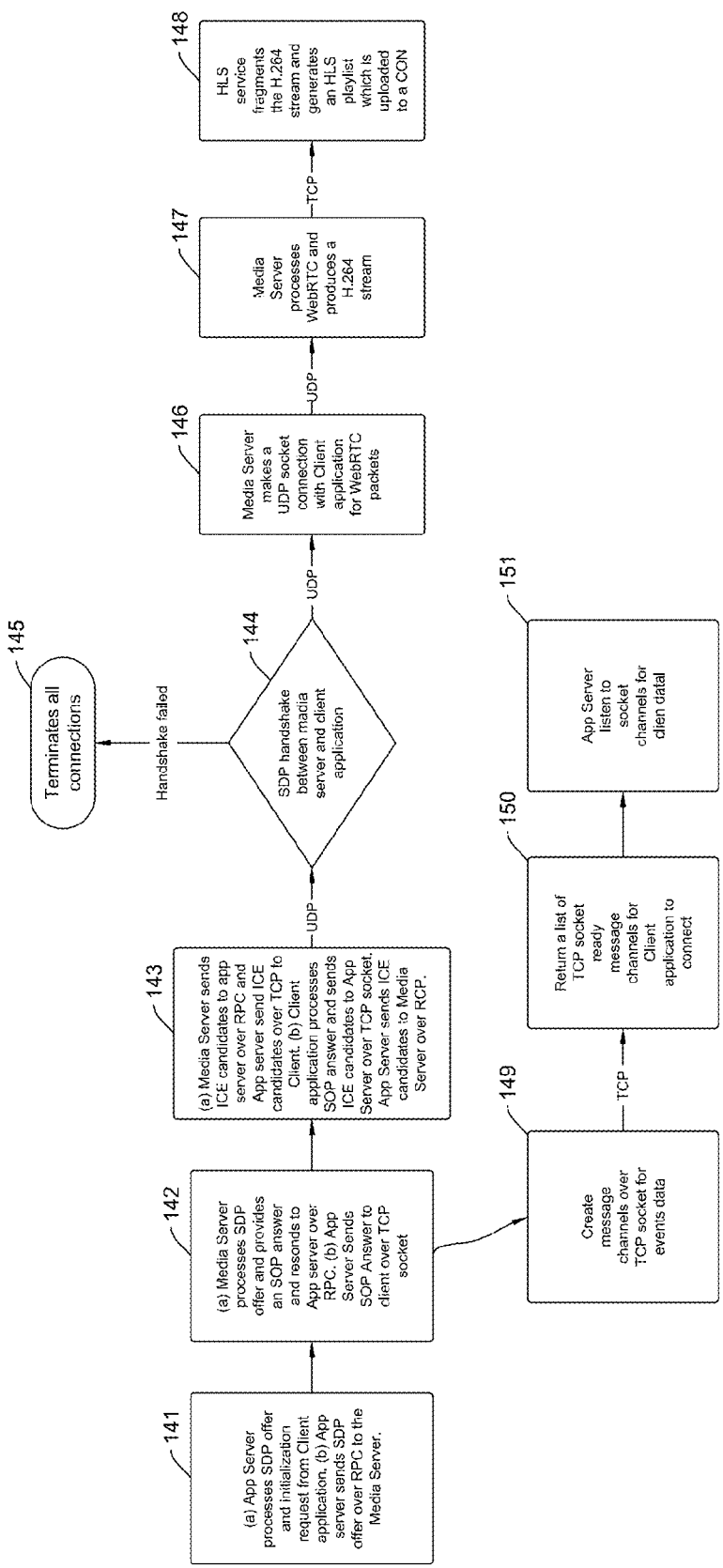
FIG. 7 is a flowchart diagram of a server sided flow for a client broadcast according to the present invention.
Figure 8:
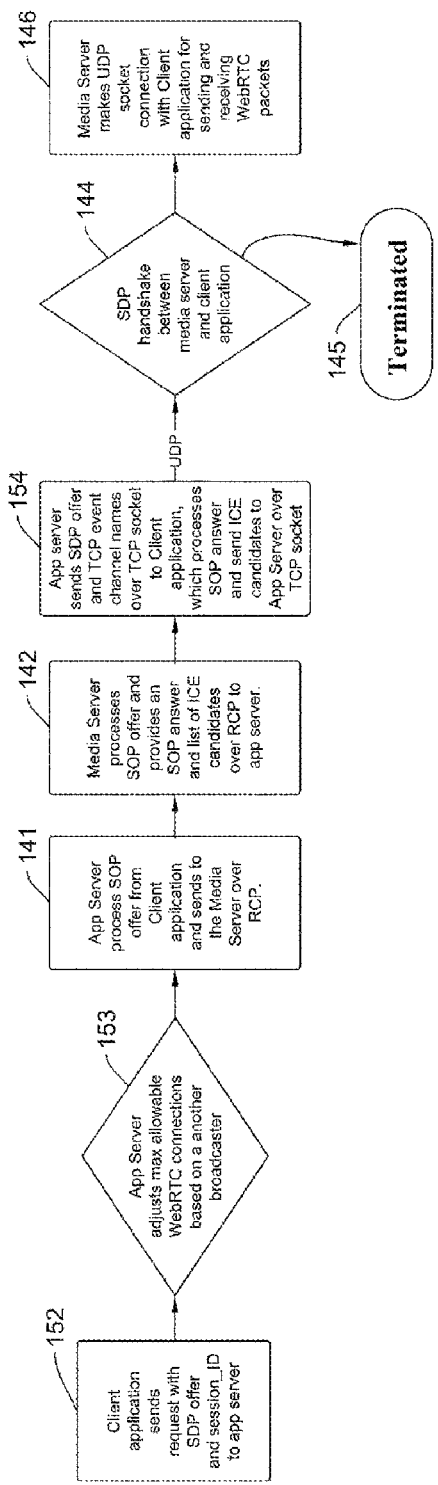
FIG. 8 is a flowchart diagram of a server sided flow for 1+ Broadcasting Clients according to the present invention.
Figure 9:
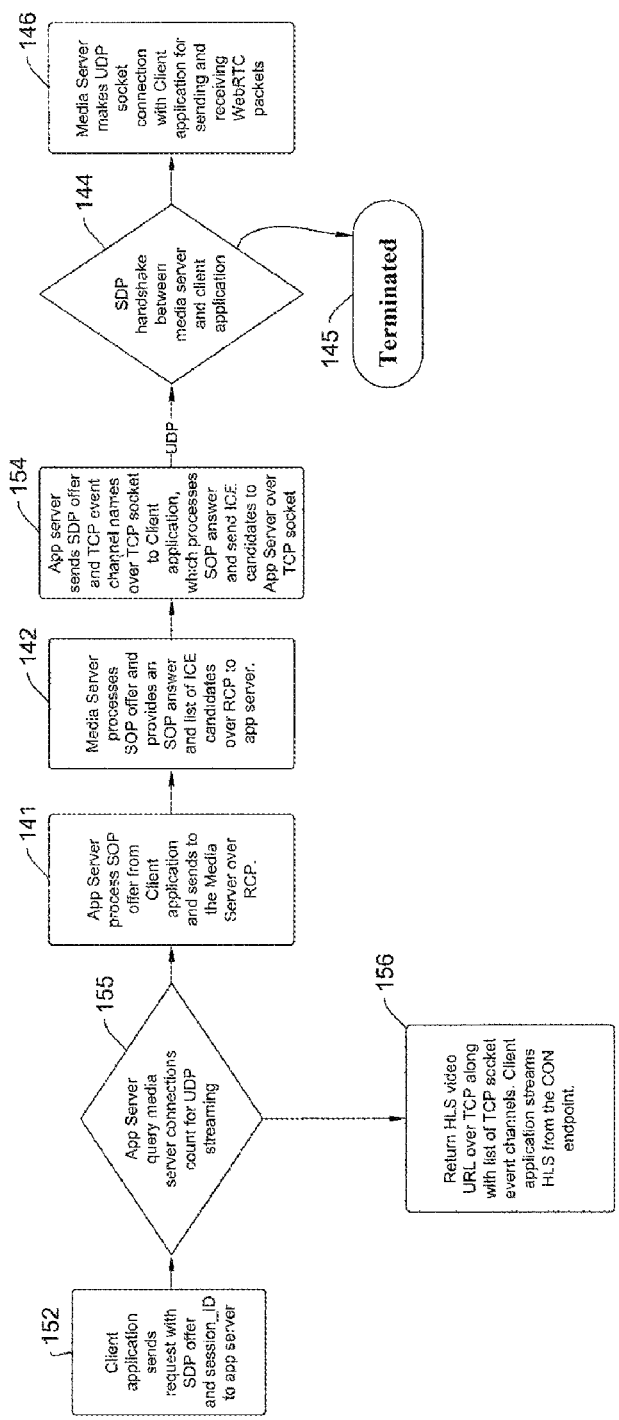
FIG. 9 is a flowchart diagram of a server sided flow for a Listening Client according to the present invention.
Figure 10:
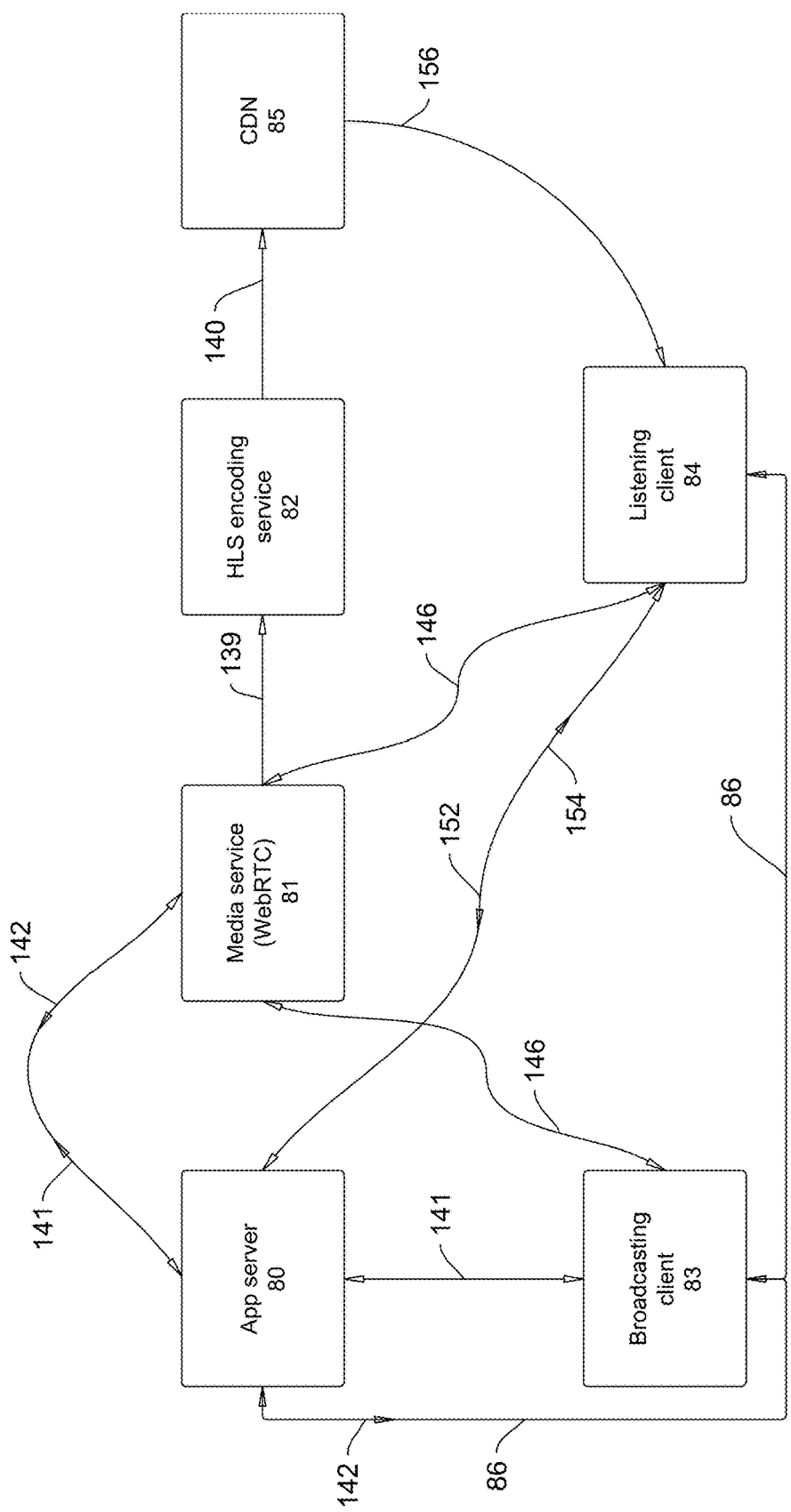
FIG. 10 is a flowchart diagram of the server sided system according to the present invention.

The system components are believed to essentially and preferably comprise an Application Server as at 20; a Media Server or WebRTC as at 21; an http live-streaming or HLS encoding service as at 82; a Broadcasting Client as at 83; a Listening Client as at 84, and a Content Delivery Network or CDN as at 85. Referencing FIGS. 7-10, the reader will there consider a server sided flowchart diagram for a single client broadcaster as generally depicted in FIG. 7; a server sided flowchart diagram for a plurality of client broadcasters as generally depicted in FIG. 8; and a server sided flowchart diagram for a listening client as generally depicted in FIG. 9. FIG. 10 depicts the interrelated systemic aspects and flows therebetween for aiding the reader's comprehension of the present invention.

The Application Server 80 provides a services that acts as an intermediary between the listening and broadcasting clients to initiate and terminate real time WebRTC sessions, and generate TCP event channels. The Application Server 80 further generates session ID's, which ID's are used to join, and terminate the appropriate WebRTC sessions. The session ID or broadcast ID, is shared by clients via posts to feed, text messages, links and push notifications, depending on the context or scope selected during initialization. As an alternative to sending a timestamp over TCP, it can also be sent as a part of the network packets being sent to the WebRTC server 81 over UDP/TCP, or extracted from the audio or video frames from the video or audio stream, in which case the listening device can determine the timestamp at playback without a hash.

The Media Server 81 primarily functions to relay WebRTC packets from broadcasting clients to listening clients, but also converts the WebRTC stream into an H.264 stream as at 139 in FIG. 10. The Media Server 81 interacts with clients mostly over UDP ports, and connections happen via Session Description Protocol or SDP handshake(s). Connections between the Application Server 80 and the Media Server 81 preferably use the Rich Client Platform or RCP protocol.

The HLS encoding service 82 receives the H.264 stream from the Media Server 81, fragments the stream, and generates an HLS playlist which is uploaded to a CDN 85 as at 140 in FIG. 10. The Broadcasting Client 83 initiates the WebRTC live session by interacting with the Application Server 80 and sends WebRTC data via the Media Server 81 over UDP. The Listening Client 84 joins the live streaming sessions via a select protocol. The select protocol, as selected from WebRTC or HLS, is determined by a dynamically calculated value "n"; the value "n" is the maximum number of WebRTC listening sessions allowed per session. The value "n" dynamically adjusts based on system load and the number of Broadcasting Clients 83.

Referencing FIG. 7, the reader will there consider process(es) 141 whereby the Application Server 80 processes a SDP offer and initialization request from the client application and sends the SDP offer over RPC to the Media Server 81. The Media Server 81 processes the SDP offer providing an SDP answer and responds to the Application Server 80 over RPC. The Application Server 80 then sends the SDP answer to the client over the TCP socket 86. In this regard, the reader is directed to process(es) 142 in FIG. 7. Message channels are created over the TCP socket 86 for communicating events data as at sub-process 149. A list of TCP socket-ready message channels to which the client application may connect is returned as at sub-process 150 and thus the Application Server 80 monitors the socket channels for client data as at sub-process 151.

The Media Server 81 sends Interactive Connectivity Establishment or ICE candidates to the Application Server 80 over RPC and the Application Server 80 sends ICE candidates over TCP socket 86 to the Broadcasting Client 83. The client application processes the SDP answer and sends ICE candidates to the Application Server 80 over the TCP socket 86 as referenced at process(es) 143. By way of UDP the Media Server 81 attempts an SDP handshake with the client application as at query process 144. If the handshake fails, all connections are terminated as at process 145. If the handshake is successful, the Media Server 81 makes a UDP socket connection with the client application for WebRTC packets as at process 146. The Media Server 81 processes WebRTC and produces an H.264 stream as at process 147. Via TCP, the HLS encoding service 82 fragments the H.264 stream and generates the HLS playlist which is uploaded to the CDN as at process 148.

Referencing FIG. 8, the reader will there consider server sided flow in the context of a plurality of broadcasting clients. In this scenario, a (listening) client application sends a request with SDP offer and session ID to the Application Server 80 as at process 152. The Application Server 80 via TCP adjusts the maximum allowable WebRTC connections based on the broadcasting environment as at query process 153. The Application Server 80 processes the SDP offer from the (listening) client application and relays the SDP offer to the Media Server 81 over RCP as at process 141.

The Media Server 81 processes the SDP offer and returns a SDP answer and list of ICE candidates over RCP to the Application Server 80. The Application Server 80 sends the SDP offer and TCP event channel names over the TCP socket 86 to the (listening) client application, which then processes the SDP answer and sends ICE candidates to the Application Server 80 over the TCP socket 86. By way of UDP the Media Server 81, as in the single broadcast client scenario, attempts an SDP handshake with the client application as at query process 144. If the handshake fails, all connections are terminated as at process 145. If the handshake is successful, the Media Server 81 makes a UDP socket connection with the client application for WebRTC packets as at process 146.

Referencing FIG. 9 the reader will there consider a server sided flow in the context or from the perspective of the listing client. The client application sends a request with SDP offer and session ID to the Application Server 80 as at 152. The Application Server 80 via TCP queries the connections count at Media Server 81 for UDP streaming as at query process 155. If the connections count is greater than value "n" the Media Server 81 returns HLS video URL over TCP with a list of TCP socket event channels. The client application then streams HLS from the CDN endpoint as at process(es) 156. If the connections count is less than value "n" the Application Server 80 processes the SDP offer from the client application by relaying the same to the Media Server over RCP as at process 141.

As before, the Media Server 81 processes the SDP offer and returns a SDP answer and list of ICE candidates over RCP to the Application Server 80. The Application Server 80 sends the SDP offer and TCP event channel names over the TCP socket 86 to the (listening) client application, which then processes the SDP answer and sends ICE candidates to the Application Server 80 over the TCP socket 86. By way of UDP the Media Server 81, as in the single broadcast client scenario, attempts an SDP handshake with the client application as at query process 144. If the handshake fails, all connections are terminated as at process 145. If the handshake is successful, the Media Server 81 makes a UDP socket connection with the client application for WebRTC packets as at process 146.

Notably, the VERTIGO[SM] branded share live system provided or enabled by the software tool of the present invention is also based on the ability to overlay intermittent video, audio, and Chat (e.g. Short Message Service or SMS) commentary upon a synchronized media (e.g. music) stream. The ability to provide this simultaneous functionality is believed central to the practice of the present invention. The intermittent nature of the video, audio, and chat commentary allows for a more passive social experience, in which users feel less pressured to share everything live, but are allowed to share at select moments while at other times they may simply share a stream of synchronized media (e.g. music) with Chat messaging. In this regard, the reader is directed to FIGS. 11 and 12. Comparatively referencing FIG. 11 versus 12, the reader will there consider alternative means for sending or broadcasting user-generated content to one or more listening devices within the client network.

Figure 11:
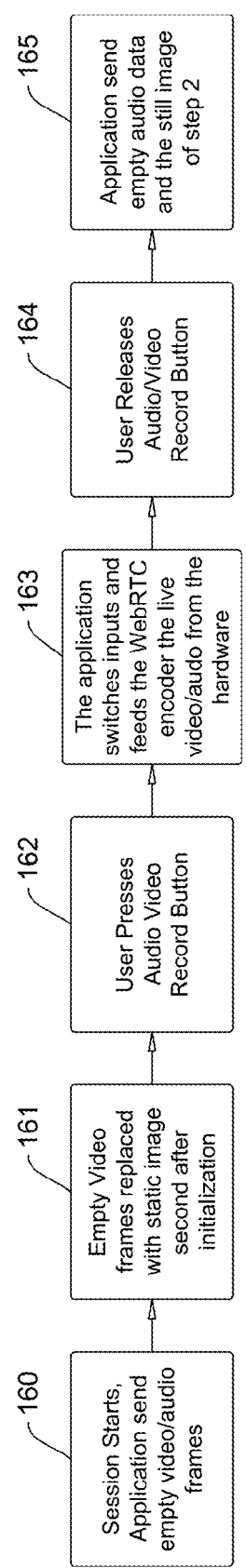
FIG. 11 is a flowchart diagram of a first alternative intermittent video/audio commentary sequence according to the present invention.

FIG. 11 details the process whereby a social contributor or broadcaster shares a static image overlaid upon the underlying streaming content such as a photograph or the like. The SHARE LIVE session starts and the client application creates empty video/audio frames as at process 160. The empty video frames are replaced with static imagery after initialization as at process 161 whereafter the user may press an activation (e.g. record) prompt as at process 162. Upon activation, the client application switches inputs and feeds the WebRTC encoder the live video/audio from the hardware as at process 163. When the user releases the activation prompt as at process 164, the client application sends the empty audio data and the still image from process 161 to the listening client(s) as at process 165.

Figure 12:
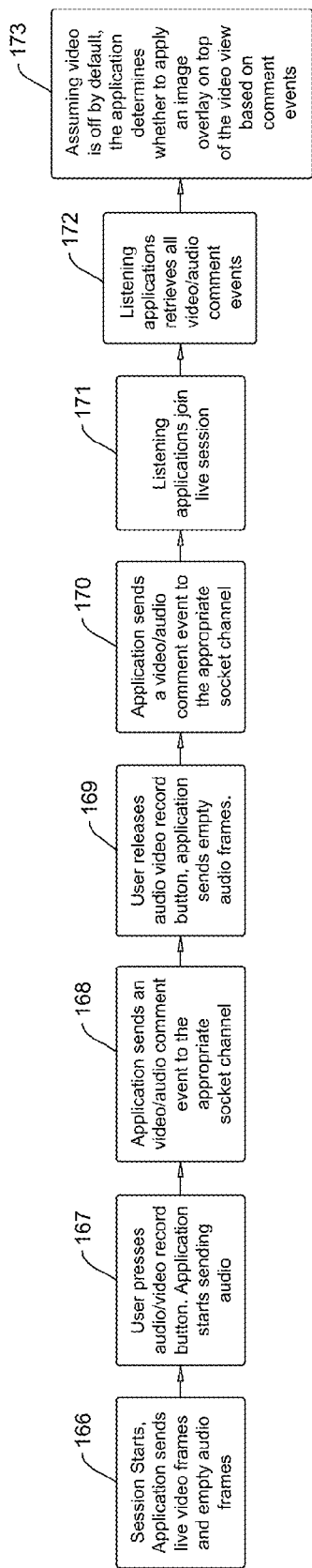
FIG. 12 is a flowchart diagram of a second alternative intermittent video/audio commentary sequence according to the present invention.

FIG. 12 details the process by which a broadcaster overlays audio/video commentary upon an underling media (e.g. music) stream. The SHARE LIVE session starts and the client application creates live video frames and empty audio frames as at process 166. The user presses an activation prompt (e.g. an audio/video record button) and the client application starts sending audio as at process 167. The client application then sends an audio/video comment event to the appropriate socket channel as at process 168. When the user releases the activation prompt, the application sends empty audio frames as at process 169. The Application then sends a video/audio comment event to the appropriate socket channel as at process 170. When listening clients join the SHARE LIVE session as at process 171, the listening application(s) retrieve all video/audio comment events for consumption as at process 172. If video functionality is off by default, the application may determine whether to apply an image overlay on top of the video view based on comment events as at process 173.

The reader should note that broadcast listening compromises the timecode generated by the music synchronization methodologies described hereinabove. In this regard, the timecode is used to synchronize music playback, Chat messaging, and video/audio commentary coming through via a WebRTC stream. Depending on which intermittent comment method used, as detailed in the foregoing and supported by FIGS. 11 and 12, broadcast listening also uses the timecode to synchronize image overlays on the live video content. In the case that there is more than one broadcaster on a session, the music will be synchronized to the WebRTC stream of the host or initializing application.

In those cases when more than one broadcaster is on a session (e.g. a group streaming session), the music is preferably synchronized to the server session. The server session may be preferably derived using a number of methods, including: (a) a universally shared and synchronized timestamp (NTP); (b) a shared curated playlist; (c) playback start time beginning once the first user joins the group streaming session—once playback starts all other users will join the session, and synchronized playback uses the initial playback start time assuming that there has been no interruption in playback; (d) NTP time and song duration may be used to determine playback assuming no interruption in playback (a normal playback rate would be assumed); (e) all clients may synchronize playback to this server session position; and (f) once all applications/users exit the group stream the session may be reset.

Figure 13:
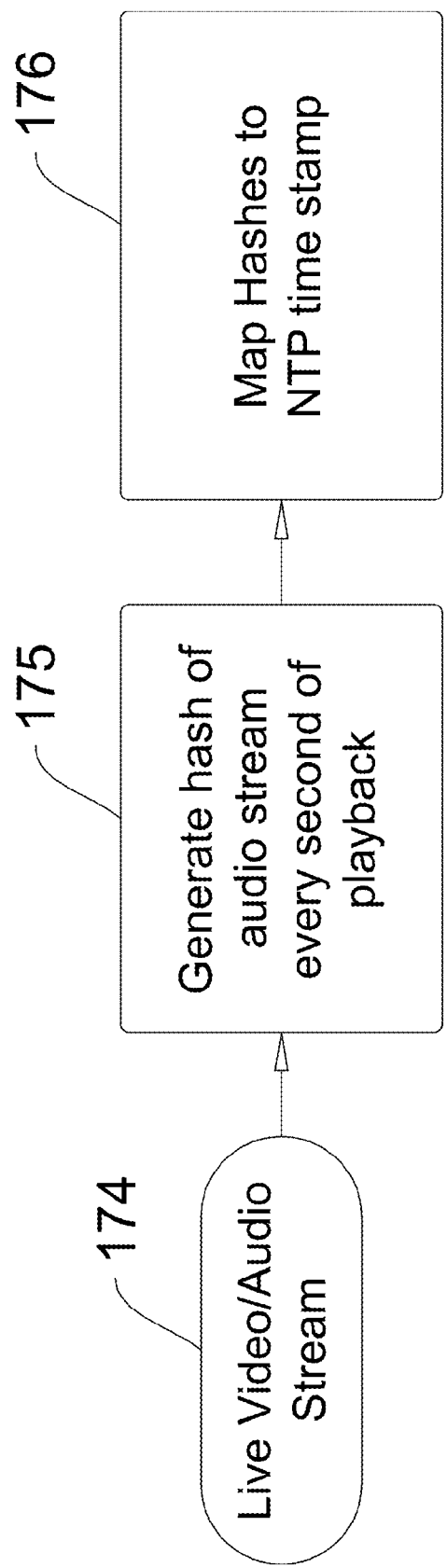
FIG. 13 is a flowchart diagram of a first alternative method for synchronizing live feeds with $3^{rd}$ party social content detailing a live stream hashing process according to the present invention.
Figure 14:
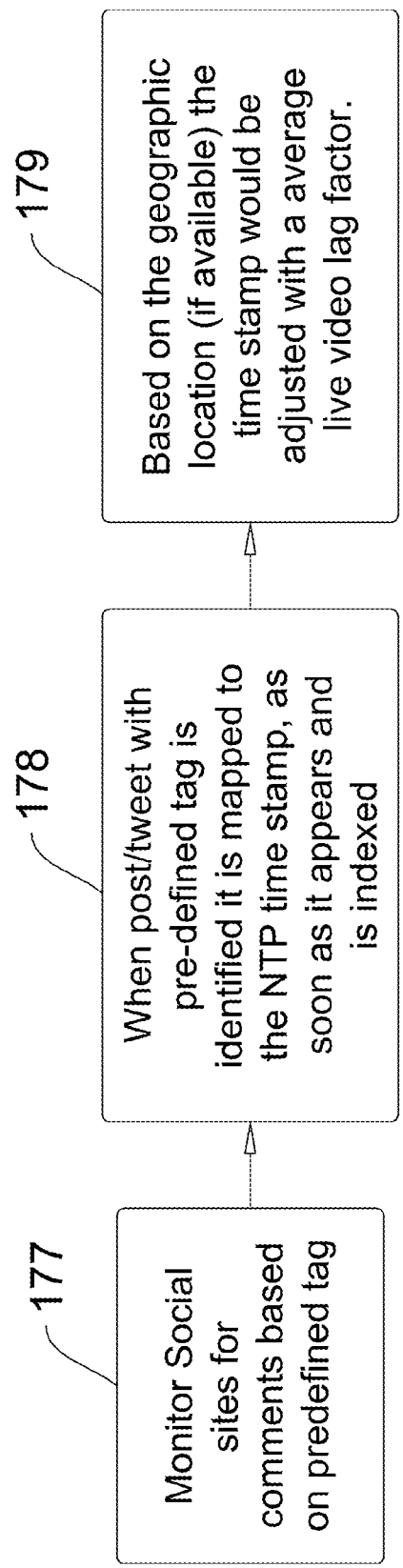
FIG. 14 is a flowchart diagram of a second alternative method for synchronizing live feeds with $3^{rd}$ party social content detailing a social comment and mapping process according to the present invention.
Figure 15:
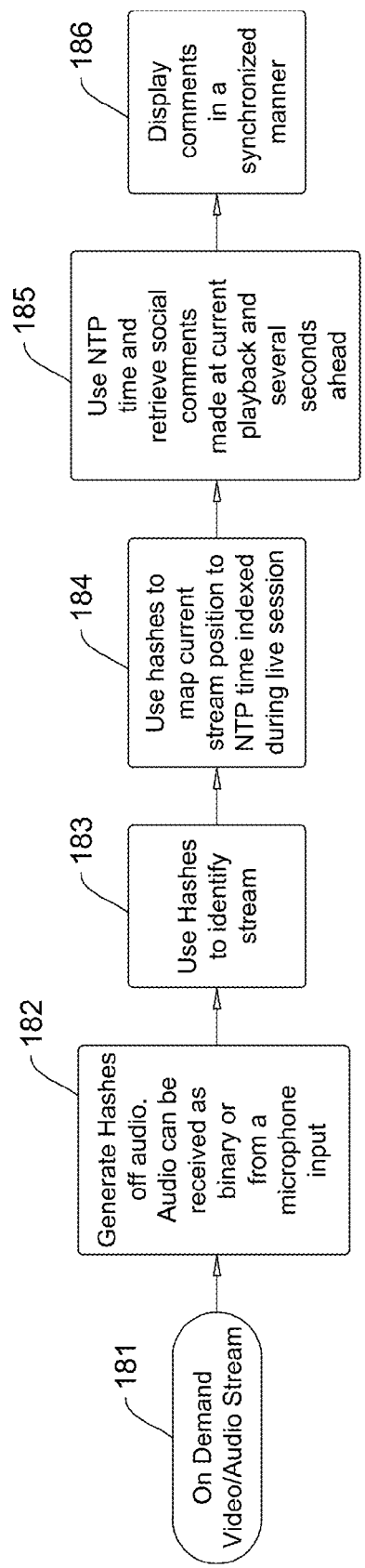
FIG. 15 is a flowchart diagram of a third alternative method for synchronizing live feeds with $3^{rd}$ party social content detailing a stream hashing and social comment synchronization process according to the present invention.
Figure 16:
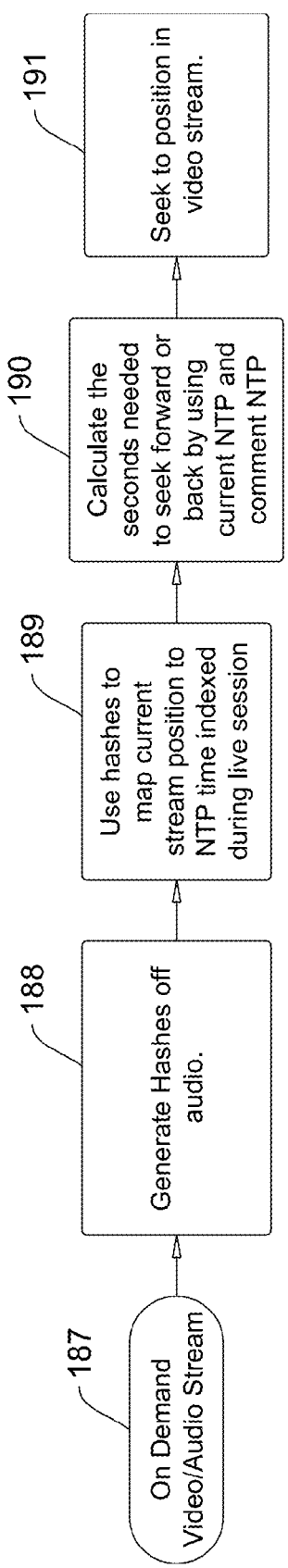
FIG. 16 is a flowchart diagram of a fourth alternative method for synchronizing live feeds with $3^{rd}$ party social content detailing a stream hashing and social comment seeking process according to the present invention.

Comparatively referencing FIGS. 13-16, the reader will there consider a number of different methods for synchronizing live feeds with $3^{rd}$ party social content, which methods include a live stream hashing process as generally depicted in FIG. 13; a social comment indexing and mapping process as generally depicted in FIG. 14; a stream hashing and social comment synchronization process as generally depicted in FIG. 15; and a stream hashing and social comment seeking process as generally depicted in FIG. 16.

Referencing FIG. 13, the reader will more particularly there consider the live stream hashing process is based on a live video/audio stream as at initiation step 174. A hash of the video/audio stream may be generated periodically (e.g. every second) during playback as at process 175, and the hashes may be mapped to NTP timestamp as at process 176. Referencing FIG. 14, the reader will there consider that the social comment indexing and mapping process may begin by monitoring social sites for commentary based on pre-defined tags as at process 177.

When a comment associated with a predefined tag is identified, it may be preferably mapped to the NTP timestamp as soon as it appears and is indexed as at process 178. Based on the geographic location (if available), the time stamp is adjusted with an average live video lag factor as at process 179. If the user is located with the geographic coordinates of an event venue or within a geographically fenced zone no offset is applied. If the user is not within the geographic coordinates or within a geographically fenced zone, and offset may be preferably applied to the commentary as at process 180. For a more detailed discussion of geographically fenced zones, the reader is directed to U.S. patent application Ser. No. 15/124,014 filed in the United States Patent and Trademark Office on 6 Sep. 2016, the specifications of which are hereby incorporated by reference thereto.

Referencing FIG. 15, the reader will consider a stream hashing and social commentary process according to the present invention. Given an on-demand video/audio stream as at initiation process 181, hashes can then be generated off the video/audio stream, which video/audio stream can be received as either binary date or from microphone inputs as at process 182. The hashes are utilized to (a) identify the stream as at process 183, and (b) map the then current stream position to NTP time as indexed during the live session as at process 184. The NTP time is used to retrieve social commentary made at current playback and several seconds ahead as at process 185 so that comments can be displayed in a synchronized manner as at process 186.

Referencing FIG. 16, the reader will there consider a stream hashing and social comment seeking process. Given an on-demand video/audio stream as at initiation process 187, again hashes may be generated therefrom as at process 188. The hashes are utilized to map the then current stream position as at process 189 whereafter time requirements are preferably calculated to seek forward or backward by using the current NTP and comment NTP as at process(es) 190. The commentary may then be more properly positioned in the video stream as at process 191.

Figure 17:
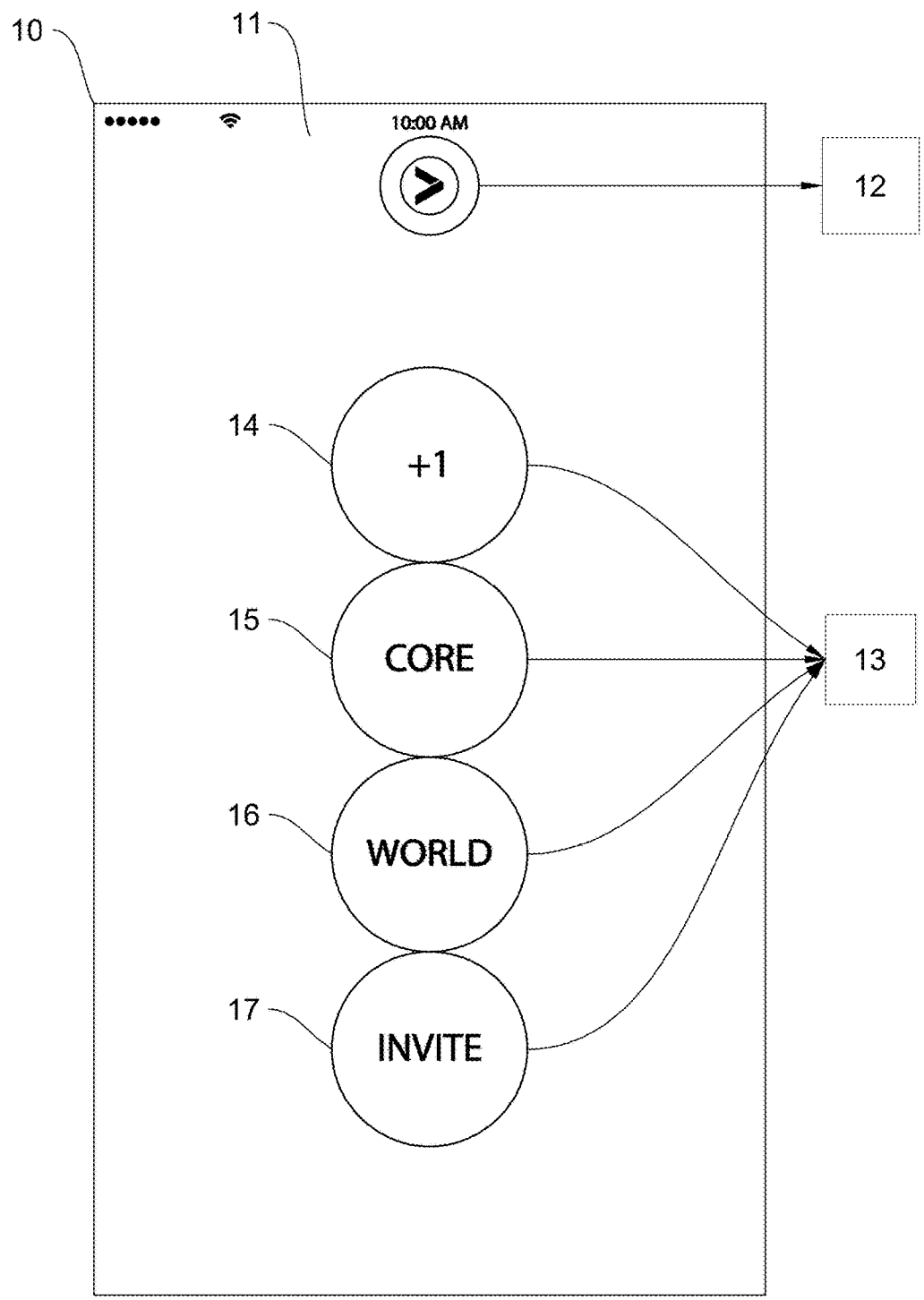
FIG. 17 is a generic application initialization screenshot enabled by the mobile application central to the practice of the present invention showing a launch prompt and a series of socialization scope prompts.

Referencing FIG. 17, the reader will there consider an application launch screenshot upon a visual display 11 of computer type mobile communications device 10 exemplified by a smart phone. Before the broadcast session initiation prompt 12 is pressed or activated, a broadcast scope is selected as at step 100 from a group of scope selections or options as at 13 also displayed upon the visual display 11. Thus the user selects the scope as at 100 of the broadcast session prior to the initiation of the broadcast session by prompt 12 activation. Broadcast session scope options 13 preferably comprise or include '+1' as at 14; 'Core' as at 15; 'World' as at 16; and 'Invite' as at 17. The target broadcast audience associated with each scope option 13 is discussed in more detail below and is generally and prefatorily referenced in FIG. 17, a screenshot showing scope options 13 and initiation prompt 12.

The '+1' option 14 may be selected when a broadcast session is intended to target or include a single user that has been pre-selected by the broadcasting user, and added to the '+1' group. The group only has 1 user in it. The 'Core' option 15 may be selected when a broadcast session is intended to target a pre-defined group (or groups) of users called 'Core'. The 'World' option 16 may be selected when a broadcast session is intended to target all of the followers of the broadcasting user. The 'Invite' option 17 may be selected when the user wishes to customize a list of broadcast recipients as selected from a list of user followers or contacts to whom the broadcast session is to be directed.

Upon scope selection 100 a loading screen appears upon the visual display 11, at which time the broadcast or SHARE LIVE session is being created. The broadcast session creation process includes (a) the creation of a video channel for video transmission; (b) the creation of an audio channel for transmitting audio; and (c) the creation of broadcast event transmission channel(s). Broadcast events are events generated on the client of the broadcasting user in response to actions taken by the broadcasting user. All broadcast events bear a timestamp that helps the listening client properly position the broadcast events.

Figure 18:
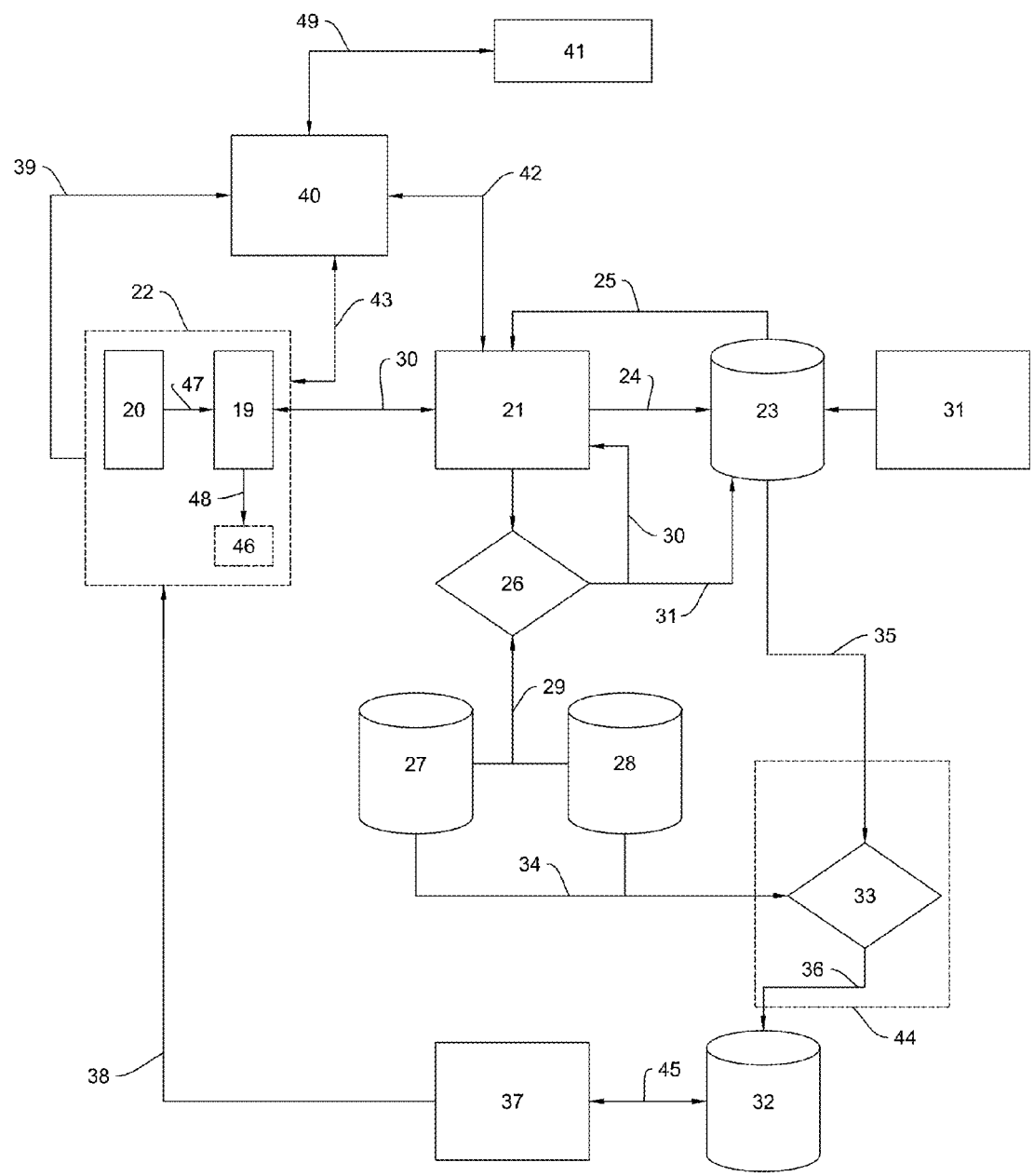
FIG. 18 is a flowchart diagram of media abstraction layer or system according to the present invention.

Playback events will usually have an abstracted entity identification or ID that is inserted by the broadcasting client to allow all listening clients to play the song from their streaming provider using the Client Software Development Kit or Client SDK as at 19 and abstracted entity routing. A media abstraction layer or system according to the present invention is generally depicted in FIG. 18 and is an abstraction of media entities such as Songs, Albums and Artists. These abstractions are collections of meta-data that are used to describe the entity to the user, while at the same time holding a mapping to the location of the media files that make up these entities on multiple providers.

The abstraction starts with the client sided SDK 19 which abstracts the complexity of dealing with multiple provider SDK's from the core application logic as at 20. Both the SDK 19 and the core application logic reside with the VERTIGO[SM] branded computer-implementable mobile application or software tool 22. The client SDK 19 takes an abstracted entity ID from the core application, which can come from 2 sources. The first source is an abstracted playlist received as at 43 from the synchronization service as at 40. The synchronization service 40 retrieves the playlist from a 3rd party streaming provider as at 41 after receiving a request for synchronization as at 39 from the client application 22.

The client application 22 abstracts the playlist structure, and resolves all song ID's to abstracted song ID's that are retrieved as at 42 from the resolver as at 21. Once structure and song ID's have been abstracted, the synchronization service 40 notifies as at 43 the client application 22 that the synchronization process is complete and the client application 22 retrieves 43 the newly abstracted playlist(s). The resolver 21 creates abstracted ID's for 3rd party provider resources, and does so by using mapping algorithms that are preferably run either as a background indexing process as at 31 or may be applied in real time as at 30 if a request to map a song comes that has never been mapped.

The real time mapping process referenced at 26 pulls data 29 from the databases (as at 27 and 28) of the providers from which a client requires mapping, and applies the mapping algorithm or real time mapping process 26 within a second, returning as at 30 the newly mapped ID to the client application 22, and caches the mapping for future use as at indexer feature 31. If a request 30 comes in for a song that has already been mapped, the application 22 pulls as at 24 from the mapping database 23 and returns as at 25 data to the client application 22.

The second manner in which the client application 22 can receive abstracted entities are from a search engine feature as at 32. The search engine 32 is populated as at 36 by pulling as at 34 provider data from provider data databases 27 and 28; inserting the pulled data into uniform search documents as at 33; and adding abstracted ID's to the uniform search documents as at 35. This allows clients with any streaming provider to interact with the data and occurs within a search updating process or environment as at 44. Searches are sent as at 38 as queries from the client application 22 to a search abstraction service as at 37, which service 37 restructures as at 45 the client request and sends to the search engine 32 (elastic search).

The media abstraction layer or system may thus be said to comprise a series of components including a client SDK 19, a resolver 21, a search updater 44, and a synchronization-playlist abstraction service 40. The client sided library that allows the core application to play, pause, seek, load songs without having to implement the different provider SDK's 46. The client SDK takes an abstracted ID and instructions as at 47 from the core application and translates the abstracted ID into a provider specific resource ID as at 30. It then translates the playback instructions as at 48 to the provider SDK as at 46.

The resolver 21 is a basically a service that houses all of the real time mapping logic, and accesses the mapping database to return mapping to the client application 22. The search updater 44 is basically a background process that merges provider data and mappings into a uniform search document. The synchronization-playlist abstraction service 40 basically abstracts the structure of playlists from 3rd party services, and returns the abstracted structures to client applications 22.

Figure 19:
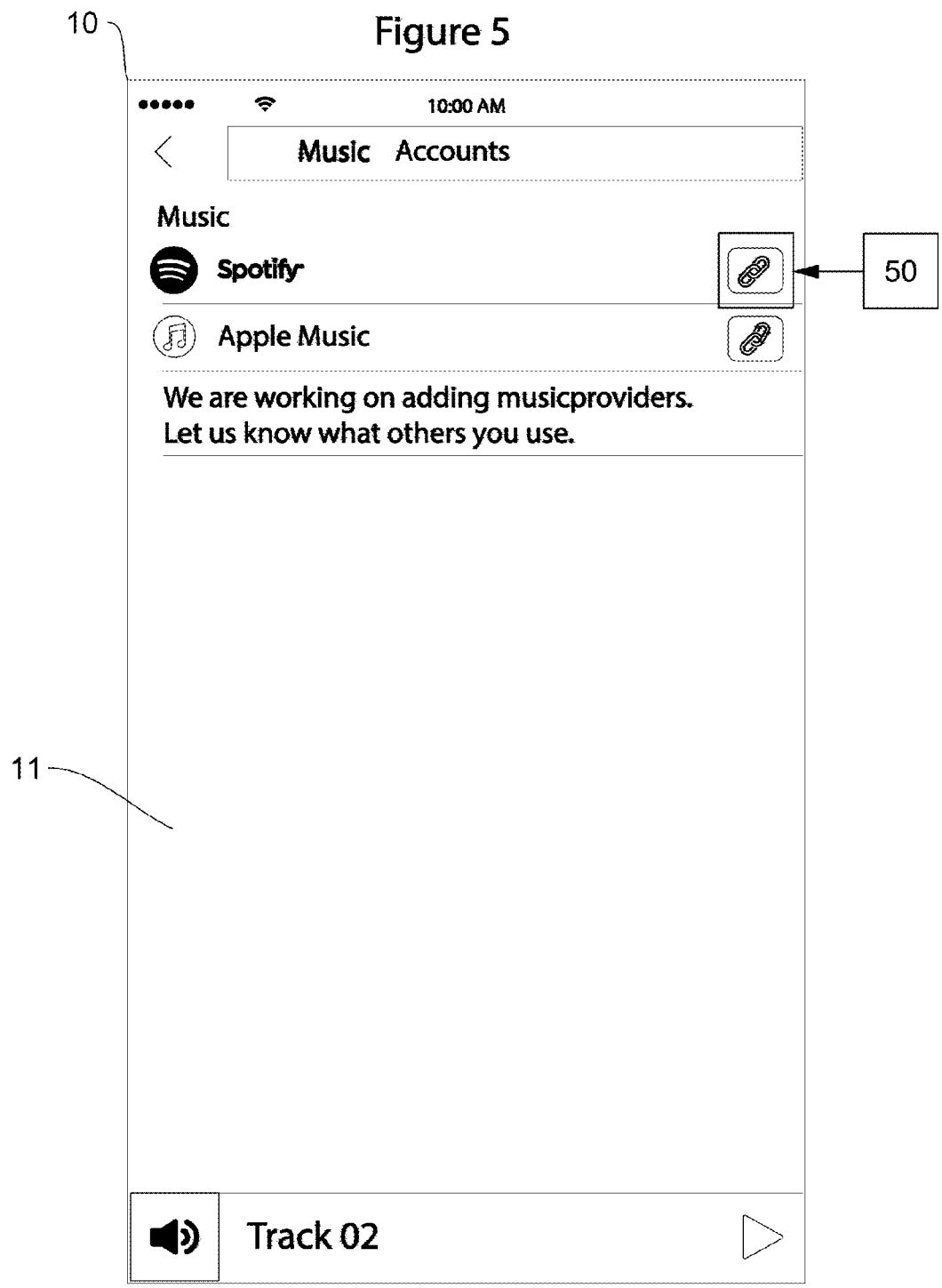
FIG. 19 is a second screenshot enabled by the mobile application central to the practice of the present invention showing a provider authentication layout and link button or prompt for linking to providers.

It will be noted that the majority of the media abstraction system generally depicted in FIG. 18 and heretofore described is hidden from the user. The only portion of the system that a user must interact with is the authentication page as generally depicted in the screen shot representation shown in FIG. 19. This page or screenshot allows the user to authenticate the client application 22 and media abstraction system to interact with 3rd party systems as at process 41 to play songs, and provide synchronization playlists as at process 49. The user may thus click on the link button or prompt 50. Once a user clicks the prompt 50, an authentication model appears where the user can input their credentials, or re-routs to the streaming provider application for the Open Authorization or OAuth protocol. In both cases the core application receives and authenticates tokens to send out playback and synchronization requests.

Media entities are derived from verified media meta-data, which meta-data can be provided by a vendor (e.g. ROVI®, GRACENOTE®) or generated by utilizing meta-data from file uploads and audio finger prints. The audio finger prints are used to identify unique audio files, and the meta-data is associated with these audio files, so that over time as many files are uploaded, an aggregation of meta-data can be used to identify the most likely entity meta-data. This is a similar process to what the musicbrainz.org database uses to map audio files to meta-data. Once these entities are generated, content is mapped to these entities using the following three processes, namely, (1) Indexing, (2) Uploading, and (3) $3^{rd}$ Party Progressive Mapping.

In the Indexing process, an indexer feature 31 scrapes public websites with publicly accessible music (e.g. SOUNDCLOUD®/YOUTUBE®) and generates audio finger prints off the audio content located on these sites that is then used to identify if verified meta-data exists for the specific file, and if so, the song_id of the entity is located and mapped to the public resource. If not, the meta-data is pulled from the site, and associated to the finger print, which is also assigned a song_id which is mapped to the public resource.

The indexing process can also use vendor provided meta-data to search 3rd party streaming provider libraries via their Web-API. The meta-data is used to identify likely matches. If a match is identified, the resource ID of the content is mapped to the entity ID, and cached for future retrieval. This process continually runs to identify potential changes in streaming provider libraries. It is also possible that streaming providers will provide data dumps that can be indexed without need for sending requests to a Web-API.

During the Uploading process, the client application 22 uploads binaries, which MAY comprise generated audio finger prints. The generated audio finger prints are used to identify if verified meta-data exists for the binary. If verified meta-data exists for the binary, the song_id of the entity is assigned to a file. If no verified meta-data exists, a new song_id is generated for the file, and the meta-data located in the file is stored and used to represent the file.

In the 3$^{rd}$ Party Progressive Mapping process entities from meta-data vendors are used to populate a search index, each of which is assigned a song_id. When the client searches the search index and locates a song that the user want to play, it passes the song_id along to a service that uses the entity meta-data to search a 3rd party provider via an established Web-API. The meta-data is used to locate the file on another provider (streaming provider), if the song is located, the resource id of the song within the provider's library is mapped to the song_id of the entity and cached, and returned to the client.

Media entities are used in multiple areas, primarily to create a universal music and social experience across multiple providers. These areas include Sharing, Synthetic Broadcasting, and Playlisting. When sharing content, entities can be posted to a user feed by using the unique identifier assigned to the entity. Other users can then view and act upon the entities within the feed irrespective of the streaming provider that they use. An entity may be shared via a link (e.g. URL) with a unique identifier embedded into the link that allows other users to access and act upon entities from Text Messages (e.g. SMS), or Emails. An entity can also be shared via direct message (socket based or push notifications), which can be a JavaScript Object Notation or JSON object shared between clients with the entity unique identifier.

During synthetic broadcasts, the abstracted entities are used for the purpose of creating a cross platform synthetic broadcast. This allows a user on the SPOTIFY® branded streaming service, for example, to listen to a synthetic broadcast of a user on APPLE MUSIC® and other providers, as long as the resources (i.e. songs) all map to the same entity. As stated above, resource mapping is critical for resource routing for it allows one client with the SPOTIFY® branded streaming service, as authenticated, to send abstract events, which another client with APPLE MUSIC®, as authenticated, can consume with no intervention from the user. The resource mapping allows the client application 22 to identify similar songs across providers in a matter of milliseconds, with a very high degree of accuracy. Since most of the resources are pre-mapped via an indexer feature 31, much of the mismatches due to variations in meta-data are corrected using a background process that accounts for metadata variation. The abstracted entities also enable the listening user to add content to their personal music library even when the broadcaster is listening to the music from another streaming provider. This is enabled because the broadcasting client is sending events that are being processed to replicate a broadcast. Playlist synchronization is believed to generally embrace those features and processes referenced at 39, 40, 41, 42, 43, and 49. Entity abstraction enables simplified synchronization of playlist(s) across multiple platforms, and it enables different playlist structures on different service providers to be hidden from the client. Entity abstraction further generates abstracted playlist(s) with abstracted song entities. When synchronization playlist changes or directs to another provider the VERTIGO$^{SM}$ branded mobile application converts the playlist structure and content into the target structure and converts the abstracted song entities into the resources of the target platform.

Thus, a VERTIGO$^{SM}$ branded playlist would be converted into a SPOTIFY® branded playlist, and the VERTIGO$^{SM}$ branded song ID's would be used to resolve to a SPOTIFY® branded resource ID. The abstraction of playlist enables the VERTIGO$^{SM}$ branded system to easily port a playlist from one streaming provider to another. Given that the services create a similar abstracted playlist for each provider, and convert the abstracted playlist into the format of the target platform, the abstraction ends of acting as a conversion intermediary that can be used to port playlist from one provider to another.

Figure 20:
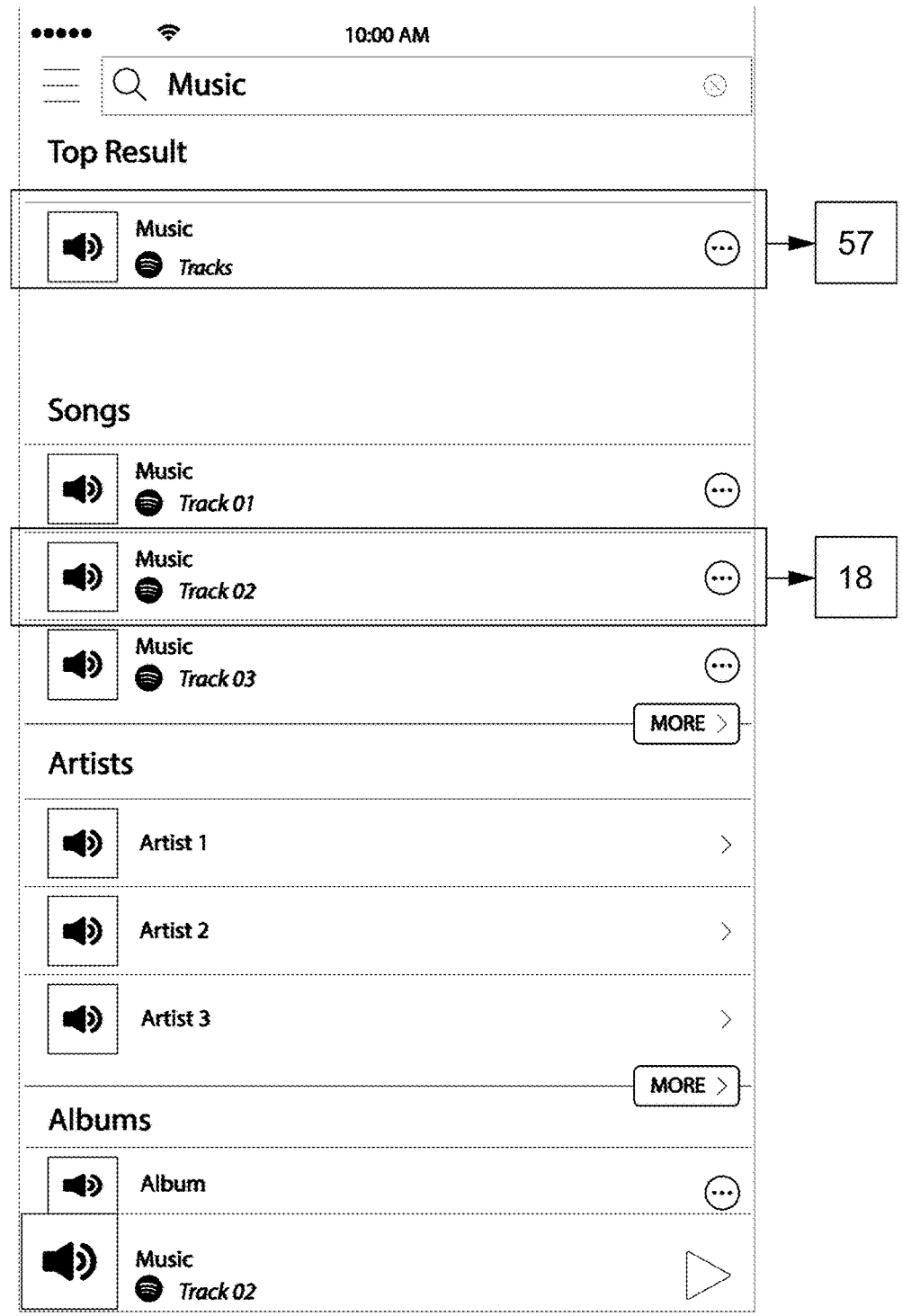
FIG. 20 is a third screenshot enabled by the mobile application central to the practice of the present invention showing a universal dynamic search screen showing a logo prompt and a play or add track prompt.
Figure 21:
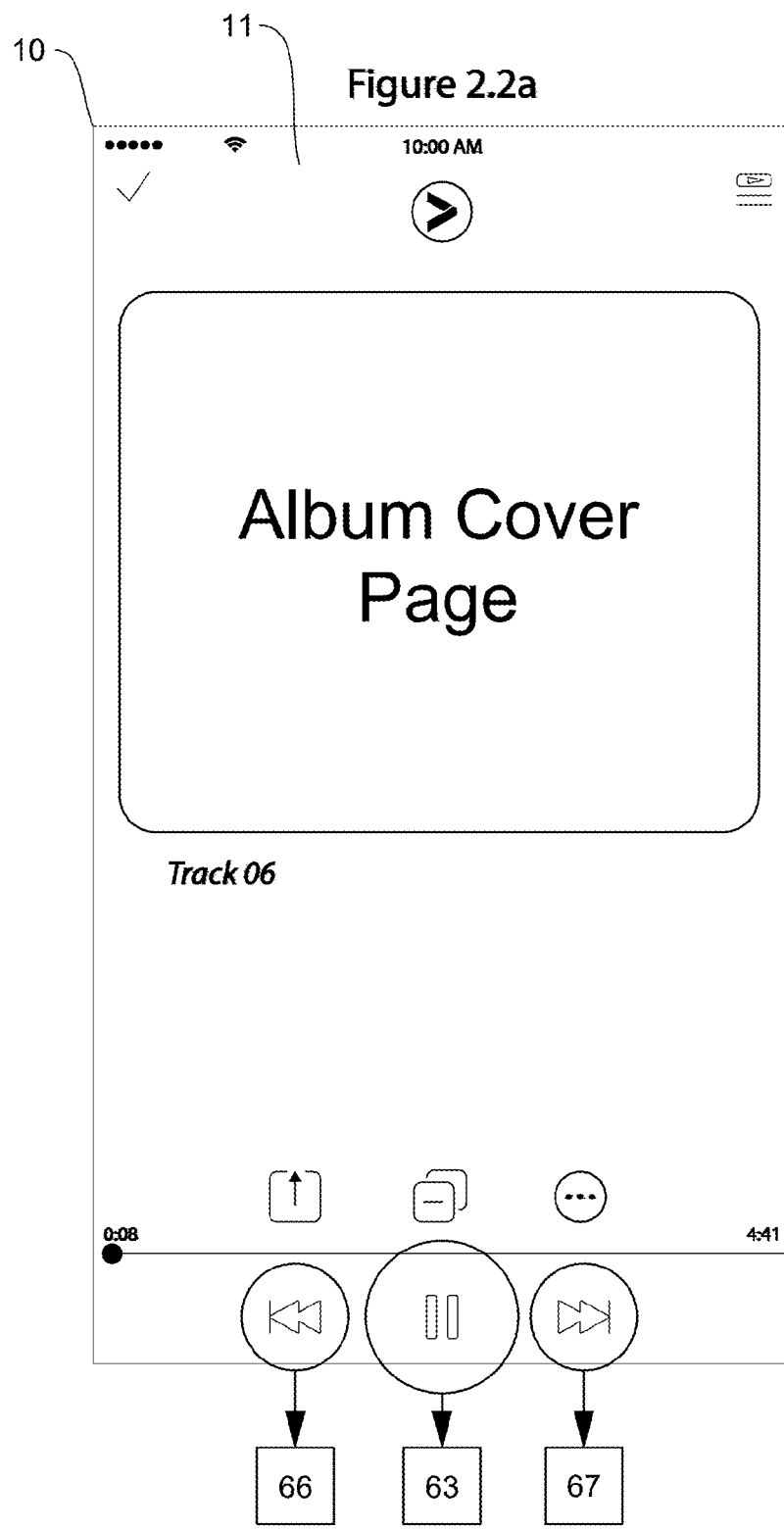
FIG. 21 is a fourth screenshot enabled by the mobile application central to the practice of the present invention showing a first playback event screen and highlighting a "previous" prompt, a "pause" prompt and a "forward" prompt.
Figure 22:
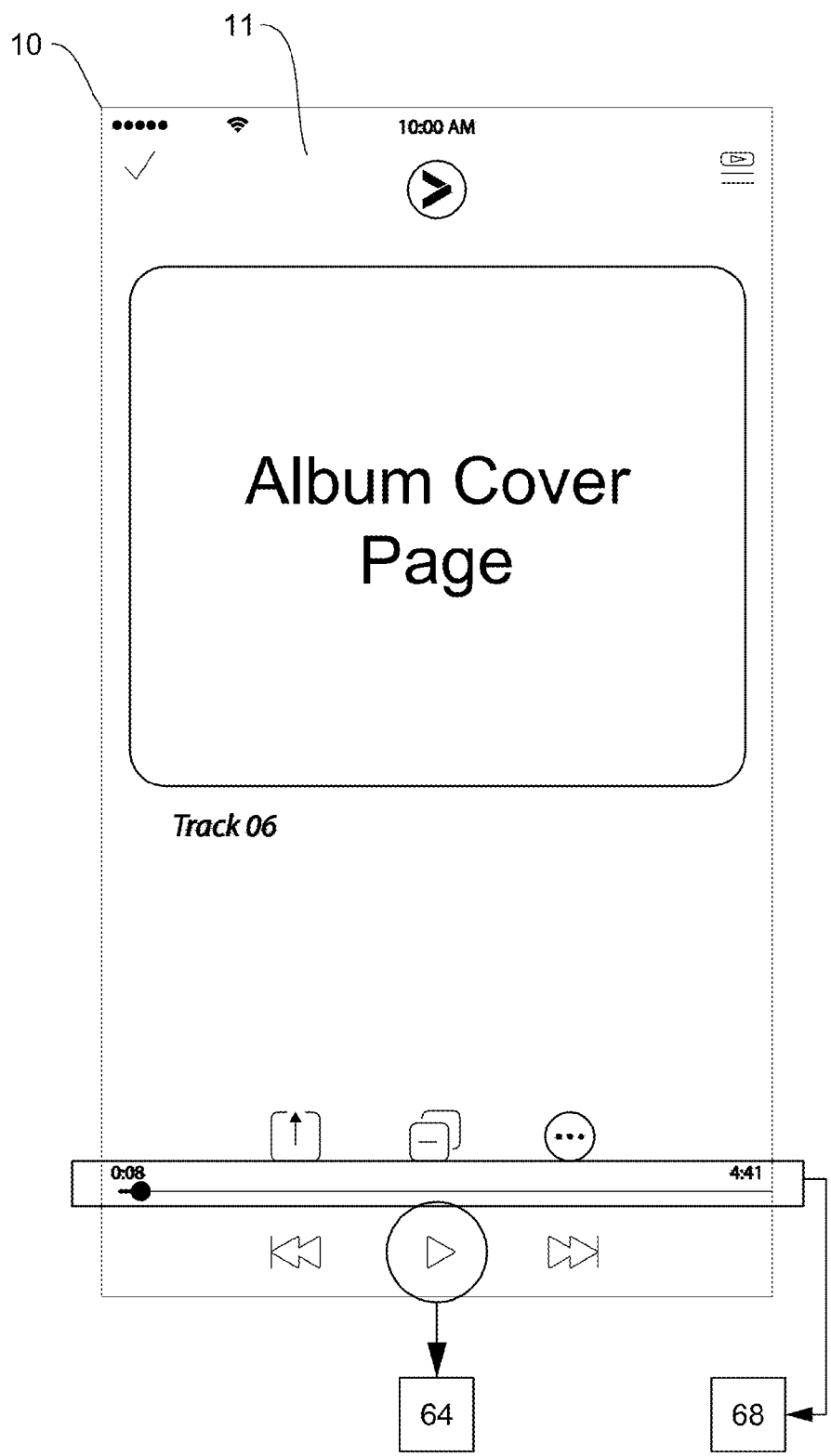
FIG. 22 is a fifth screenshot enabled by the mobile application central to the practice of the present invention showing a second playback event screen and highlighting a "play" prompt and a "seek" prompt.
Figure 23:
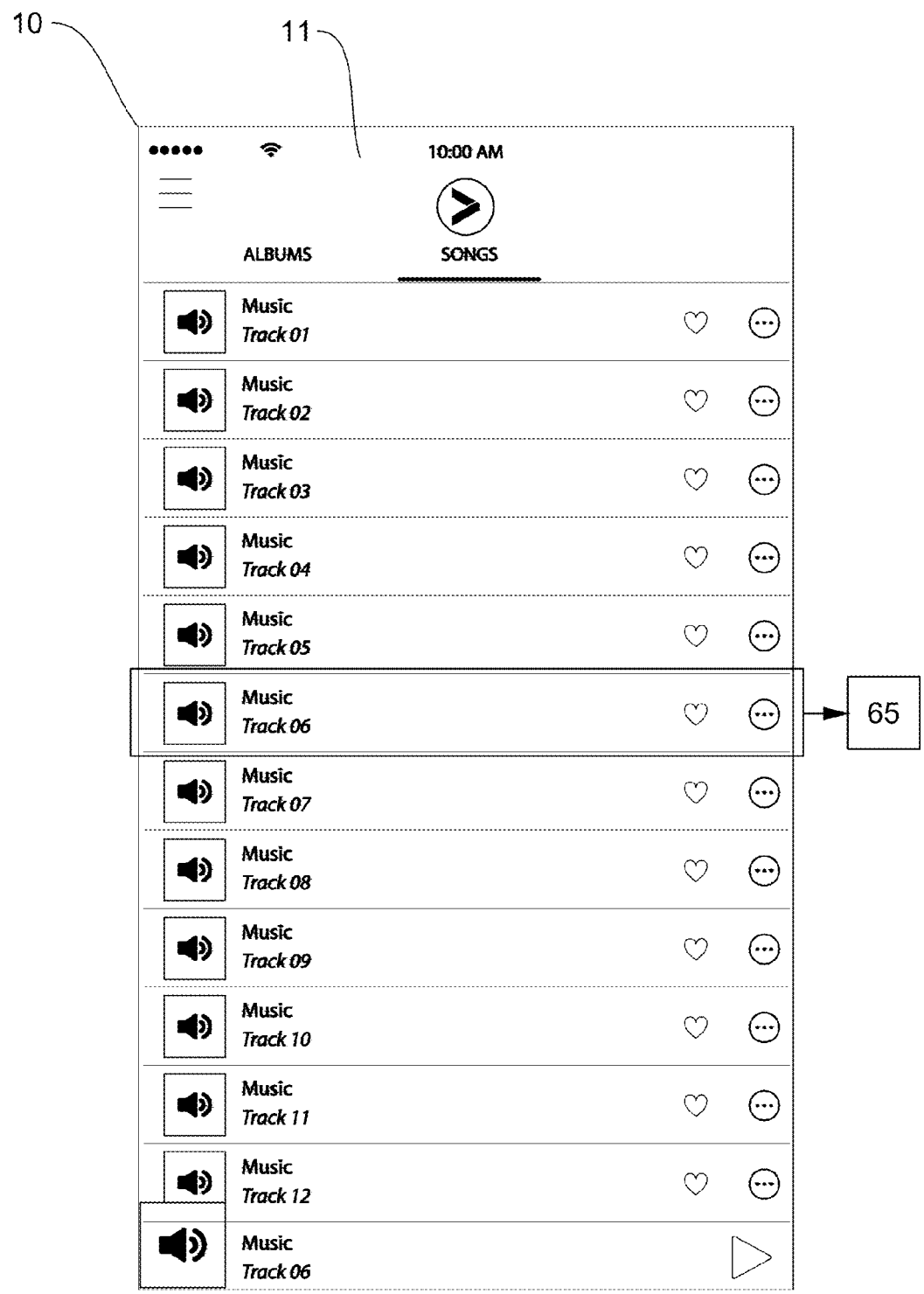
FIG. 23 is a sixth screenshot enabled by the mobile application central to the practice of the present invention showing a third playback event screen and highlighting a song track cell prompt.

The VERTIGO$^{SM}$ branded system according to the present invention preferably further comprises a Universal Dynamic Search Feature as generally depicted and referenced in FIG. 20. Comparatively referencing FIGS. 18 and 20, the reader will there consider that the universal dynamic search feature according to the present invention allows users to search as at 38 for content that is available across multiple streaming providers. This means that a user can with a single query search the libraries (e.g. databases 27 and 28) of multiple streaming providers. The user interface identifies those providers that have the music with a "logo" as at 57 next to the identified song, album, or artist. The entity abstractions are tagged to indicate which streaming providers have the content, allowing the client application 22 to mark content with the appropriate logo 57.

The universal dynamic search feature also benefits from the abstraction of entities, allowing the user to play, or add songs as at process 18 from the search without worrying about which provider to play it on. The routing mechanism according to the present invention uses the abstracted entity ID to route play requests to the proper provider SDK 19. The client application 22 comprises an abstracted SDK 19 that receives standard playback requests and the abstracted entity ID as at 47, and resolves the entity ID based on authenticated providers on the client provider SDK 46.

Thus, when the user clicks on a song in the universal dynamic search feature, it will automatically resolve 30 to the provider ID, and use that provider ID to initiate playback. All of this is seamless with no additional steps required by the user and made operable via the VERTIGO$^{SM}$ branded mobile application and or system according to the present invention. The reader will note that if there is no authenticated provider, or the authenticated provider does not have the song requested for playback, the SDK 19 will respond back to the core application indicating that there is no match. The core application then prompts the user to sign up for the appropriate streaming provider.

As earlier noted, broadcast events are events that are generated on or via the client application 22 of the broadcasting user in response to events generated by the broadcasting user. All broadcast events must have a timestamp that helps the listening client properly position the events. Playback events usually have an abstracted entity ID that is inserted by the broadcasting client to allow all listening clients to play the song from their streaming provider using the SDK 19 and abstracted entity routing as earlier explained. The reader may comparatively reference FIGS. 18 and 21-23 in connection with the following descriptions.

Play events include the playback position, and the abstracted ID of the song being played. Events may be triggered by (a) pressing of the play button or prompt as at 64; (b) pressing a song cell anywhere in the application as at prompt 65; (c) pressing the "next" prompt or "previous" prompt respectively at 67 and 66; and (d) automated iteration over a playlist. Seek events are similar to play events, the primary difference being a change in play position. It also includes the abstracted song ID. Seek events are triggered by moving/tapping the "seek" bar or prompt as at 68. Pause events indicate that playback should cease, abstracted ID's are not usually included. Pause events are triggered by pressing the "pause" button or prompt 63.

Figure 24:
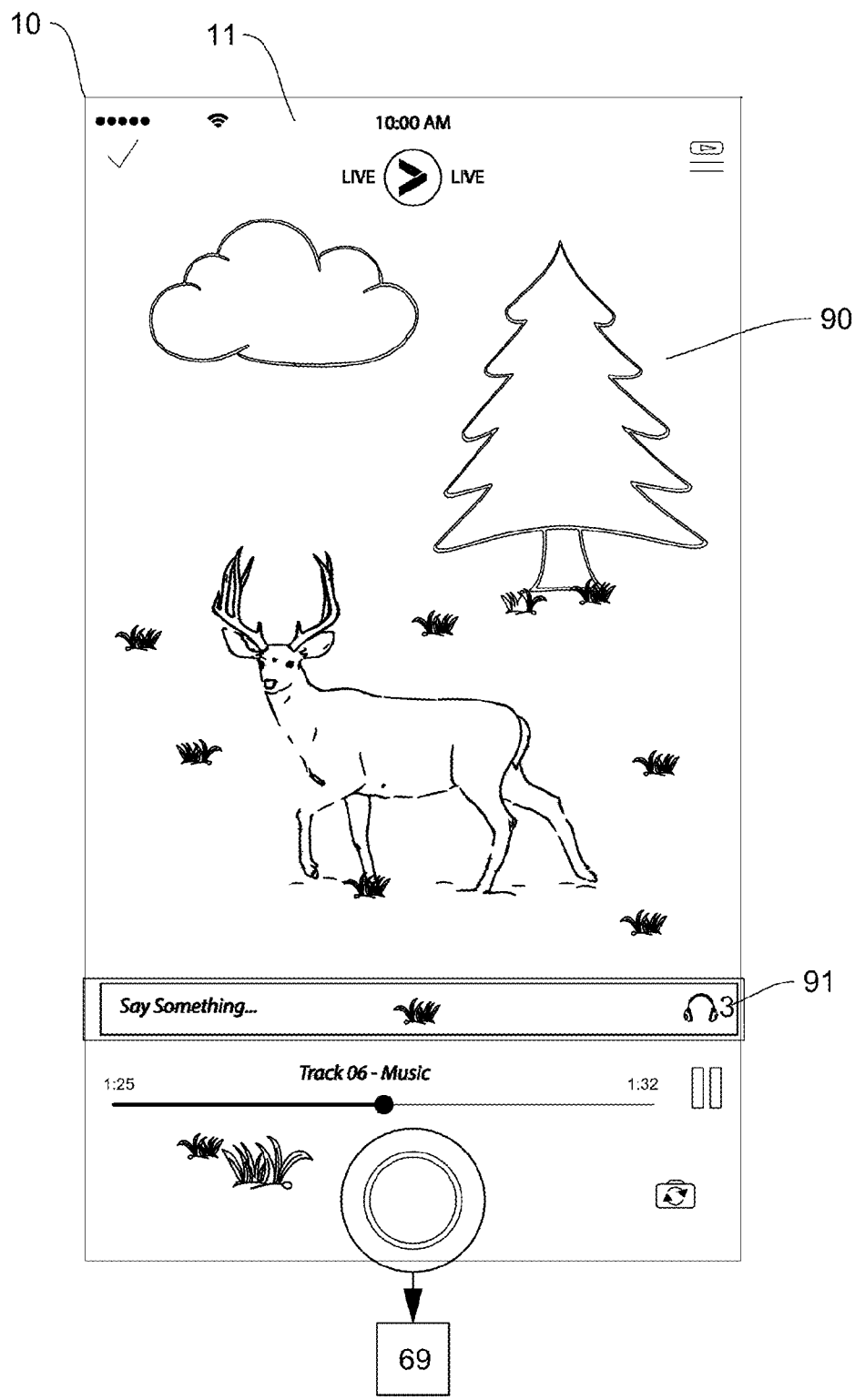
FIG. 24 is a seventh screenshot enabled by the mobile application central to the practice of the present invention showing a first comment event screen and highlighting a video comment/broadcast prompt.
Figure 24C:
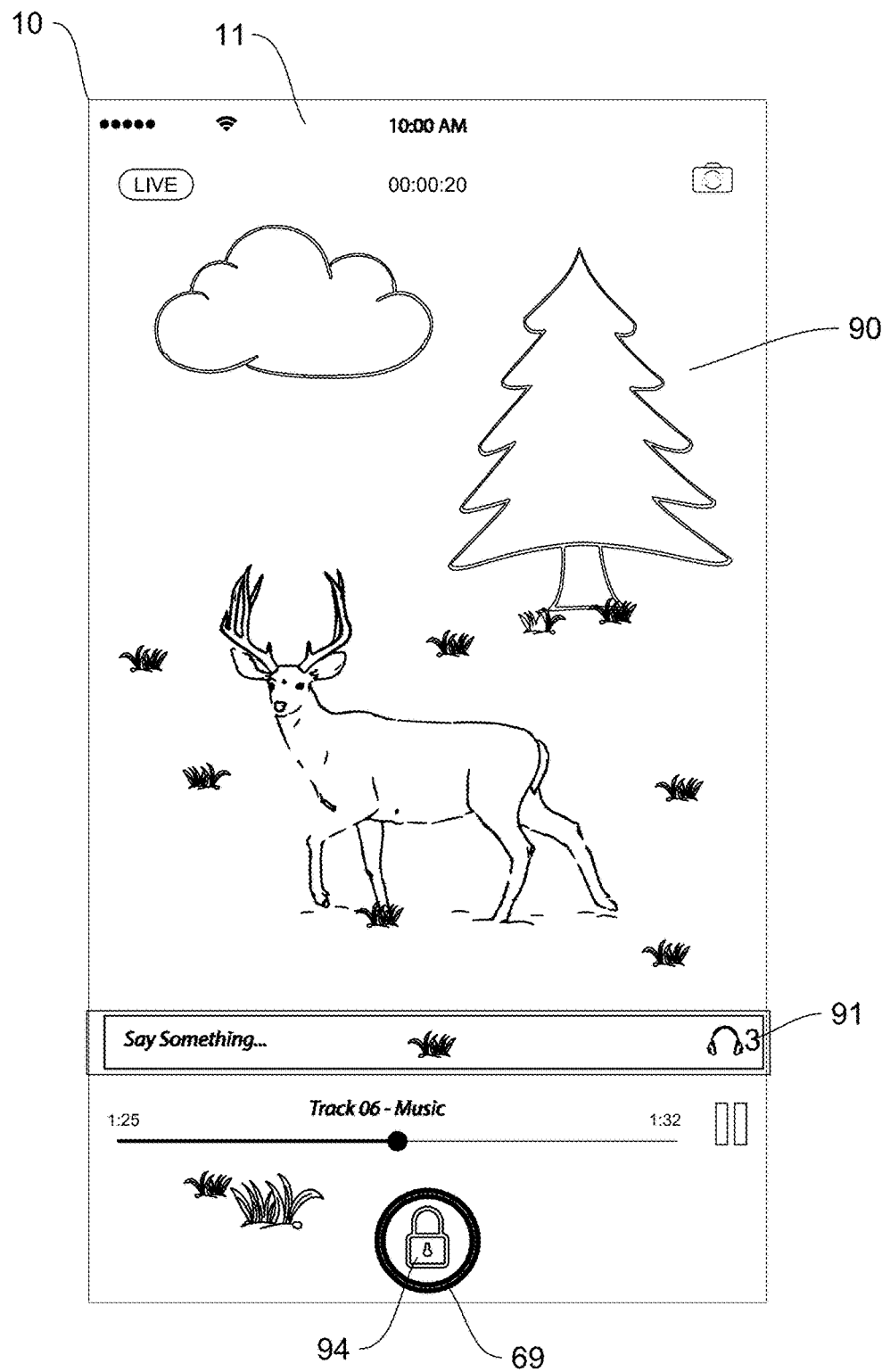
FIG. 24C is a third sequential screenshot depiction of first alternative methodology enabled by the mobile application central to the practice of the present invention depicting a third active sequence position, video content thus being broadcast in a locked state.
Figure 25:
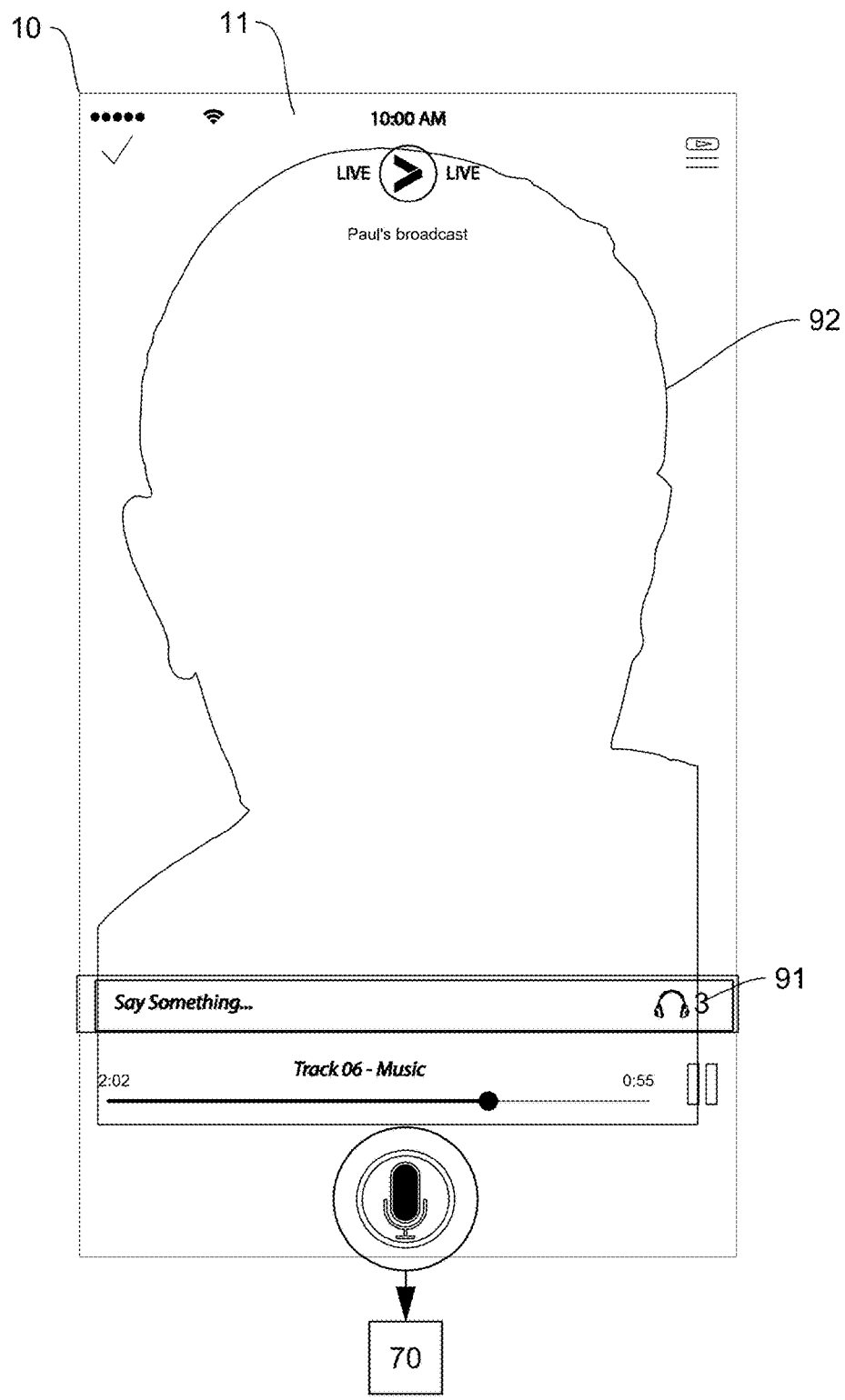
FIG. 25 is an eighth screenshot enabled by the mobile application central to the practice of the present invention showing a second comment event screen and highlighting an audio comment prompt.
Figure 25C:
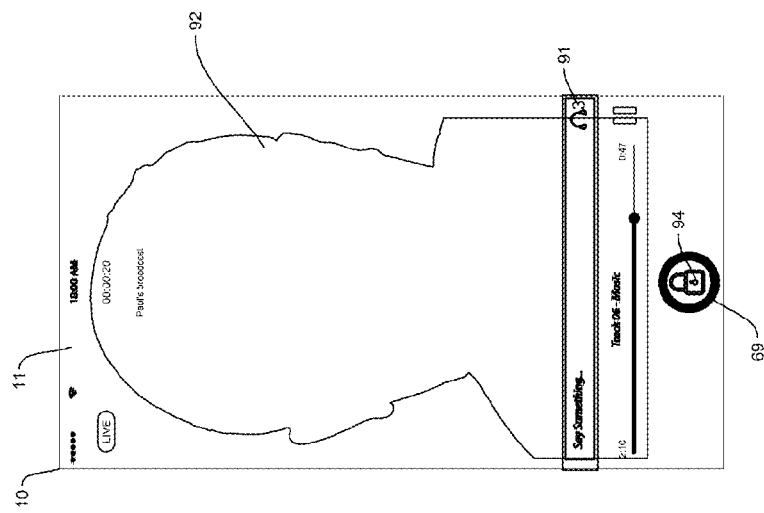
FIG. 25C is a third sequential screenshot depiction of first alternative methodology enabled by the mobile application central to the practice of the present invention depicting a third active sequence position, audio comment content thus being broadcast in a locked state.

Referencing FIGS. 24 through 25C, the reader will there consider Comment Event functionality according to the present invention. Comment events are generated whenever a user sends either a video or audio comment. A video comment is sent at the start and termination of a video comment. Video comment events may be initiated when the video comment button 69 is pressed, and terminated when the video comment button 69 is released, or unlocked. A generic video representation showing a nature scene 90 upon the visual display 11 is generally depicted in FIGS. 24-24C. The number of listeners/viewers connected to the broadcast is generally referenced at prompt 91.

Figure 24A:
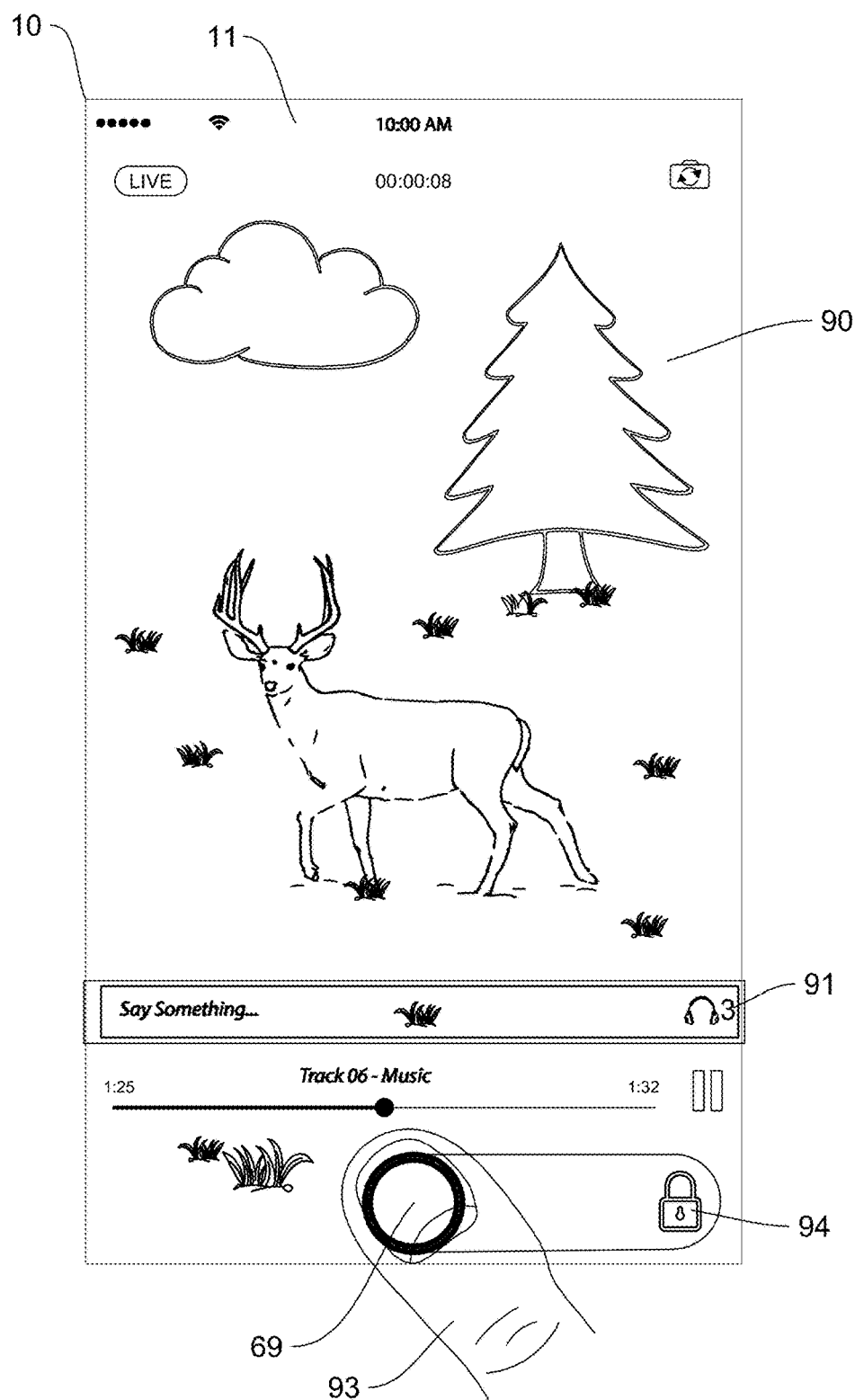
FIG. 24A is a first sequential screenshot depiction of first alternative methodology enabled by the mobile application central to the practice of the present invention showing a user's finger in a first active sequence position to initiate a video broadcast.
Figure 24B:
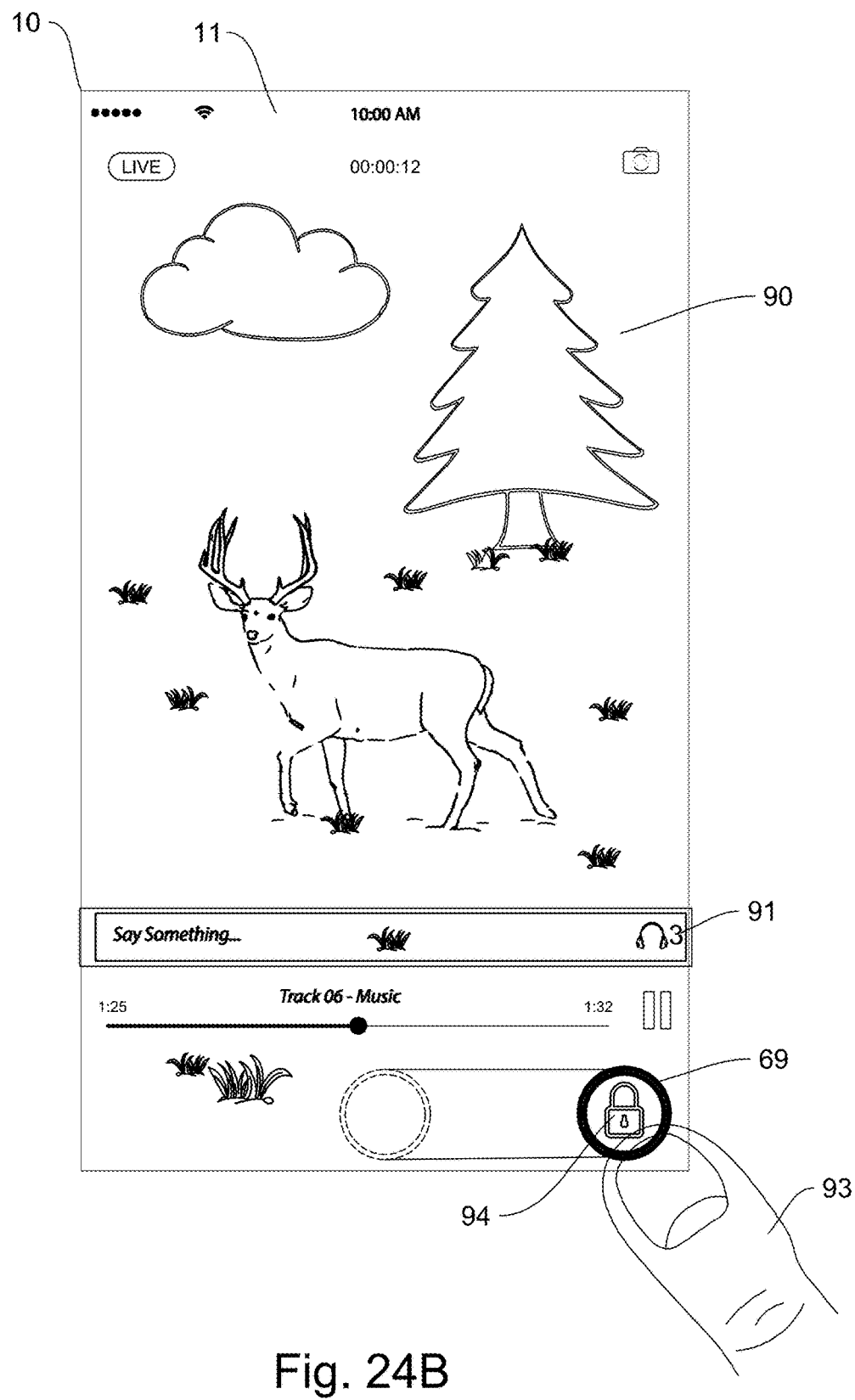
FIG. 24B is a second sequential screenshot depiction of first alternative methodology enabled by the mobile application central to the practice of the present invention showing a user's finger in a second active sequence position to lock video broadcast content for transmission.

FIGS. 24A through 24C generally depict certain alternative methodology whereby the broadcaster may depress or engage the broadcast initiation prompt or button 69 with the broadcaster's finger 93, and instead of holding the user's finger in engagement with the prompt or button 69, the user may slide the user's finger 93 and or initiation prompt 69 to a lock option as general depicted at lock icon 94. When the lock option is engaged, the user may remove his or her finger from the prompt 69 for recording the video representation 90 for transmission.

Figure 24D:
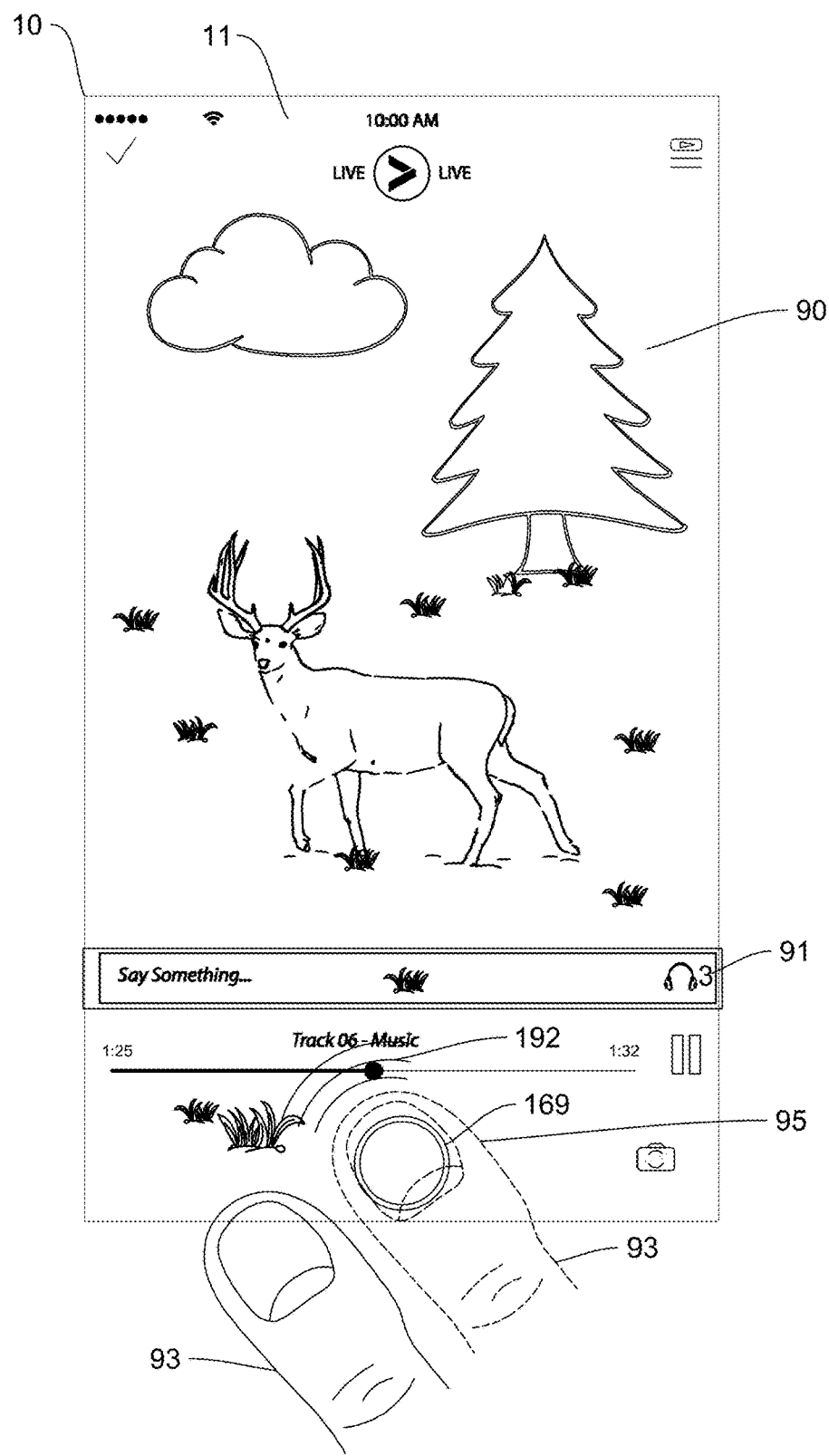
FIG. 24D is a first sequential screenshot depiction of second alternative methodology enabled by the mobile application central to the practice of the present invention showing a user's finger in first active sequence position to tap-initiate a still frame from a video broadcast.
Figure 24E:
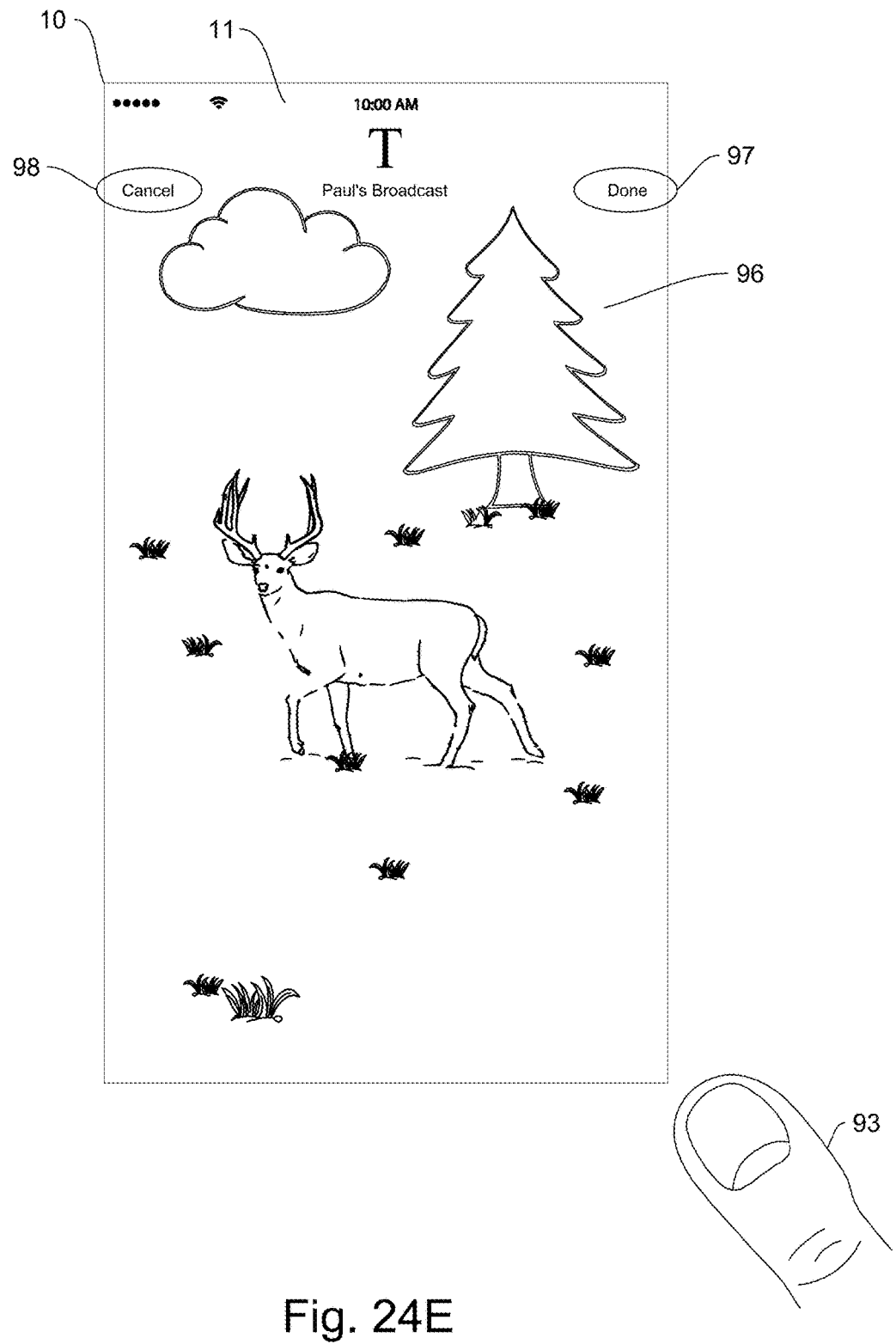
FIG. 24E is a second sequential screenshot depiction of second alternative methodology enabled by the mobile application central to the practice of the present invention showing still frame representation with alternative prompts for either broadcasting the still frame representation or canceling the still frame representation.
Figure 24F:
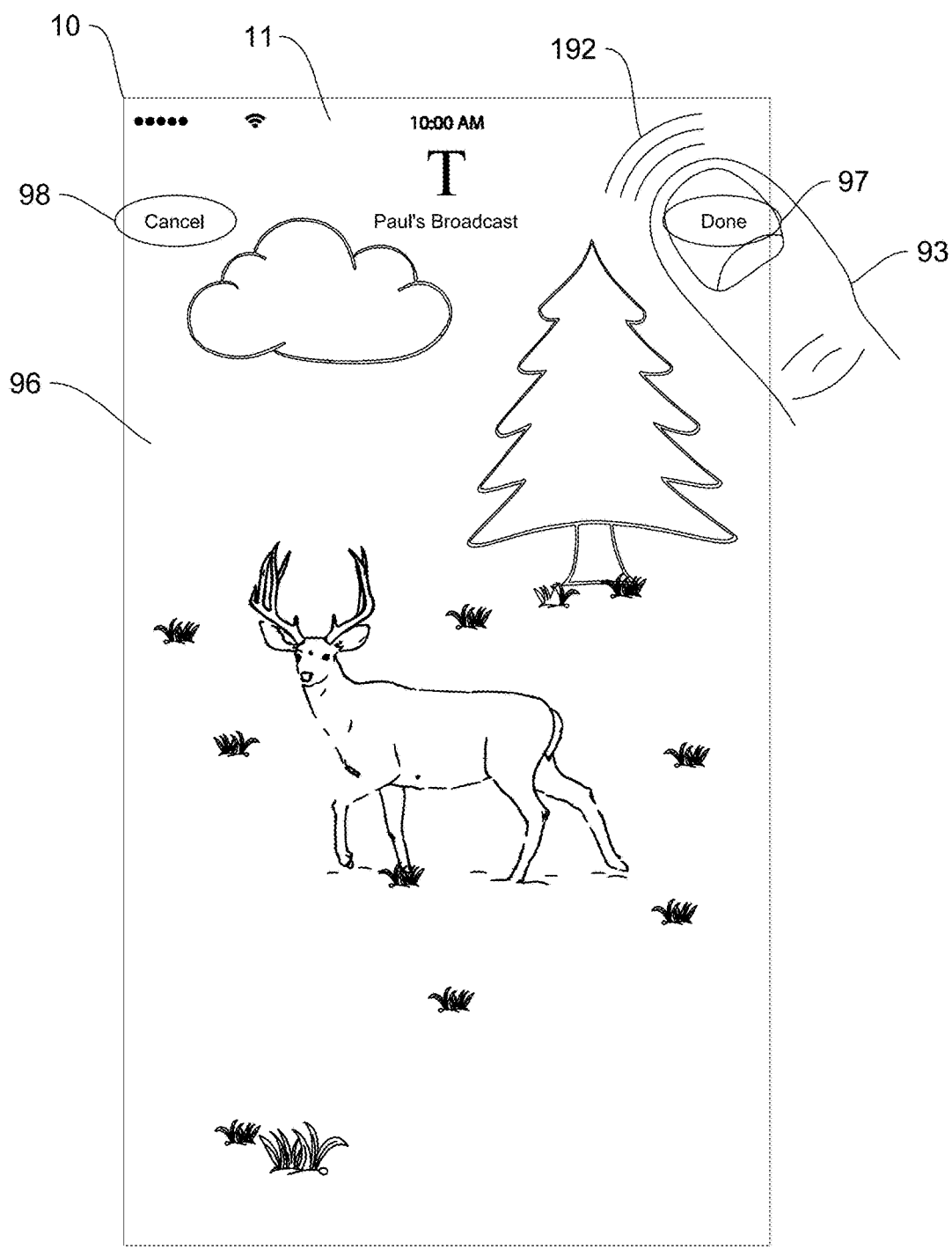
FIG. 24F is a third sequential screenshot depiction of second alternative methodology enabled by the mobile application central to the practice of the present invention depicting a user's finger option to broadcast the still frame representation via the corresponding prompt.
Figure 24G:
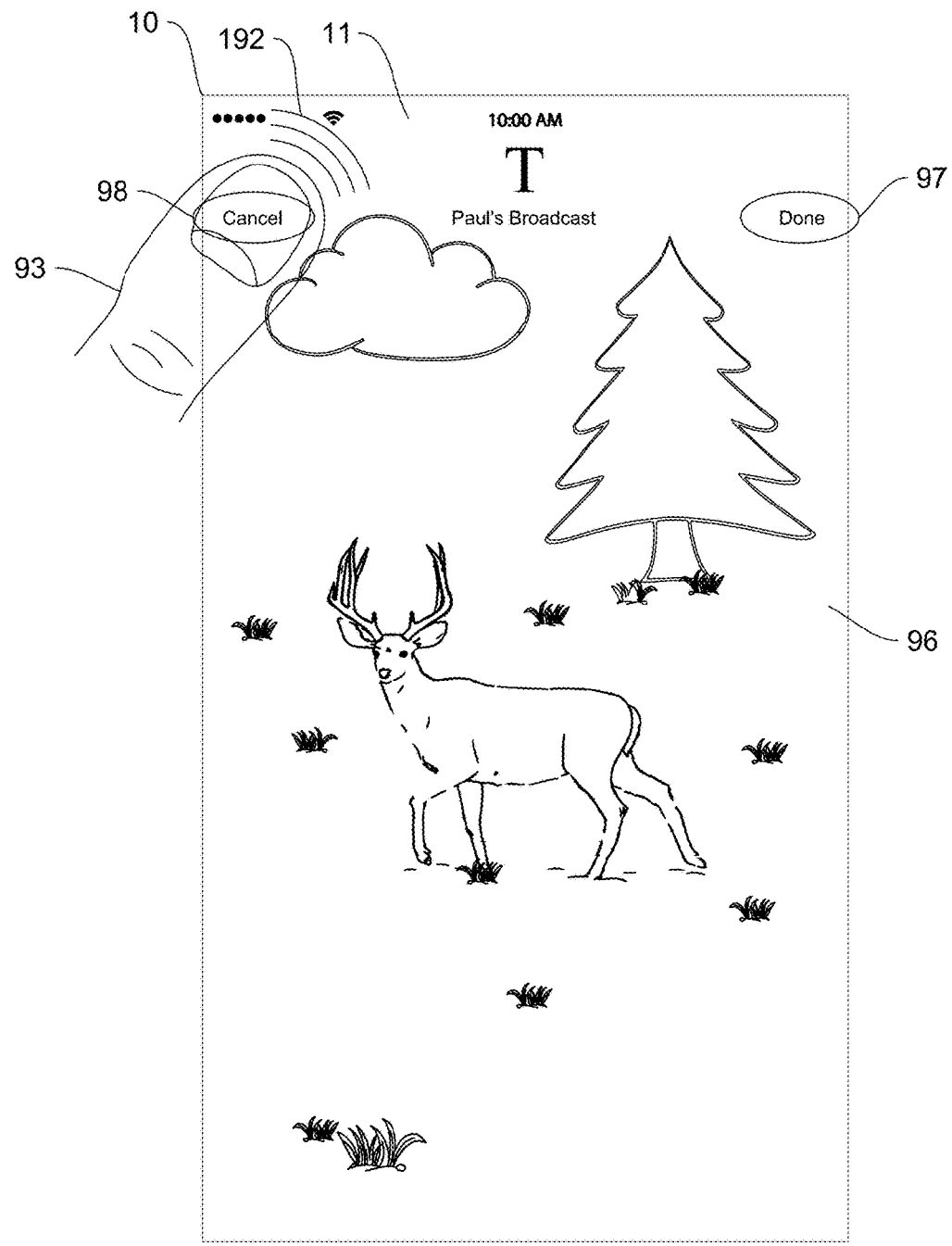
FIG. 24G is a fourth sequential screenshot depiction of second alternative methodology enabled by the mobile application central to the practice of the present invention depicting a user's finger option to cancel the still frame representation broadcast via the corresponding prompt.

Referencing FIGS. 24D-24G, the reader will there comparatively consider still further alternative methodology for broadcasting visual content. FIG. 24D depicts a user's finger 93 tapping as at 95 the initiation prompt or button 69 to snap a still frame of the then current video representation 90. FIG. 24E depicts the still frame representation 96 with prompts 97 and 98 further presented upon the visual display 11. FIG. 24F depicts a user's option to send/transmit/broadcast the still frame representation 96 by engaging prompt 97. By engaging the prompt 97, the still frame representation 96 will appear on broadcast listening client(s). By engaging prompt 98, the broadcaster may cancel the proposed broadcast as generally depicted in FIG. 24G.

FIG. 25 generally depicts audio comment functionality by which audio comments may be socially exchanged. Audio comment events may be preferably initiated when the audio comment button 70 is pressed, and terminated when the button 70 is released or unlocked. A broadcaster's profile picture as at 92 may appear when the broadcaster selects the audio comment option. The profile picture 92 may preferably always appear on the broadcast receiver's visual display 11 unless video or still frame visual material is being broadcast. The reader will note that the profile picture 92 may be provided as a picture album or slide show or could alternatively be used for advertising material.

Figure 25B:
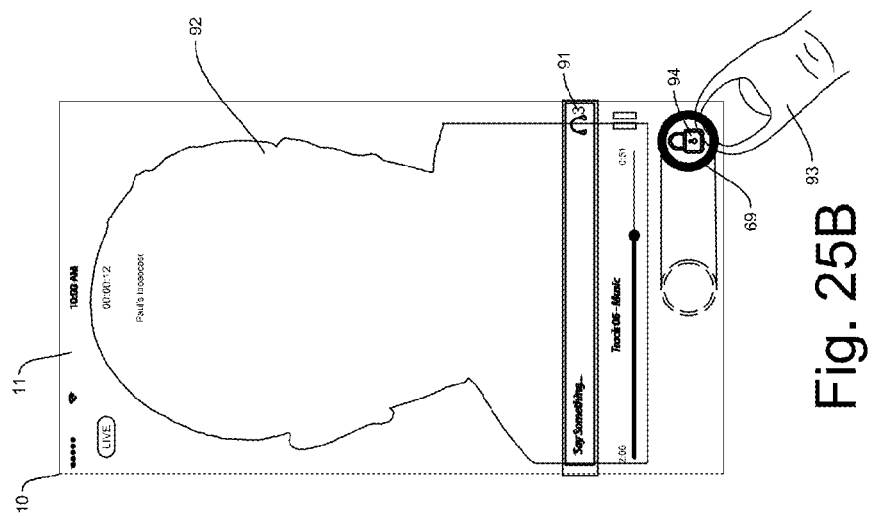
FIG. 25B is a second sequential screenshot depiction of first alternative methodology enabled by the mobile application central to the practice of the present invention showing a user's finger in a second active sequence position to lock audio comment broadcast content for transmission.
Figure 25A:
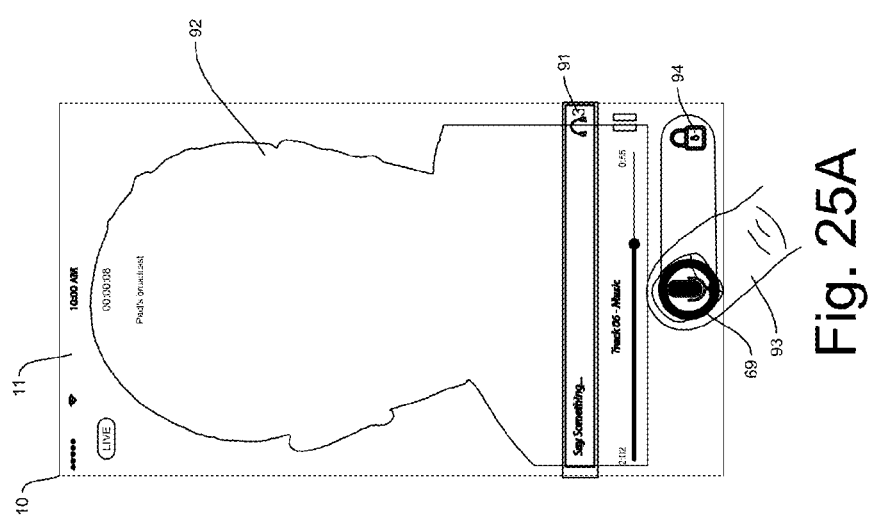
FIG. 25A is a first sequential screenshot depiction of first alternative methodology enabled by the mobile application central to the practice of the present invention showing a user's finger in a first active sequence position to initiate an audio comment broadcast.
Figure 27:
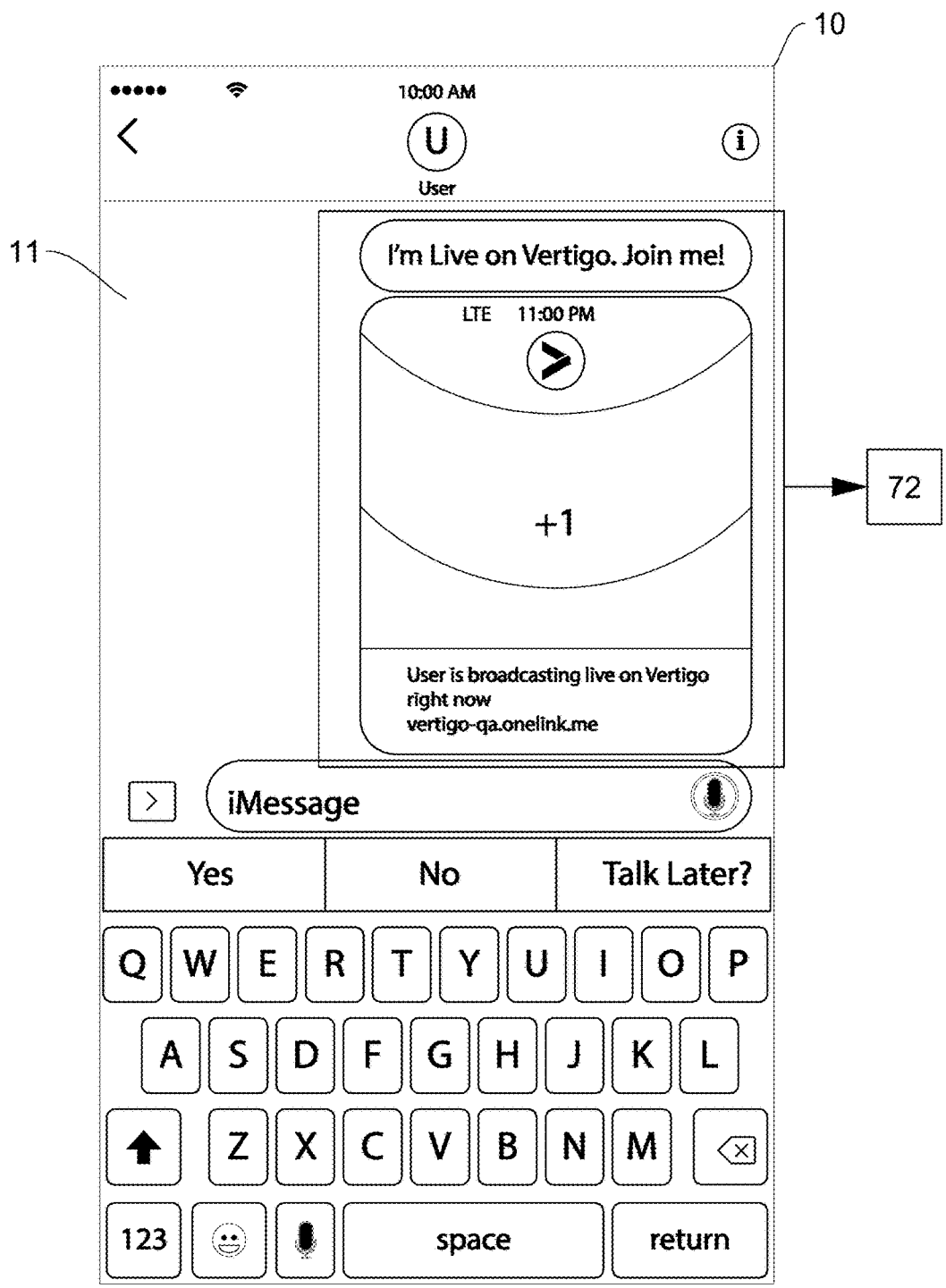
FIG. 27 is a tenth screenshot enabled by the mobile application central to the practice of the present invention showing a second broadcast joining event screen and highlighting a shared link prompt.
Figure 28:
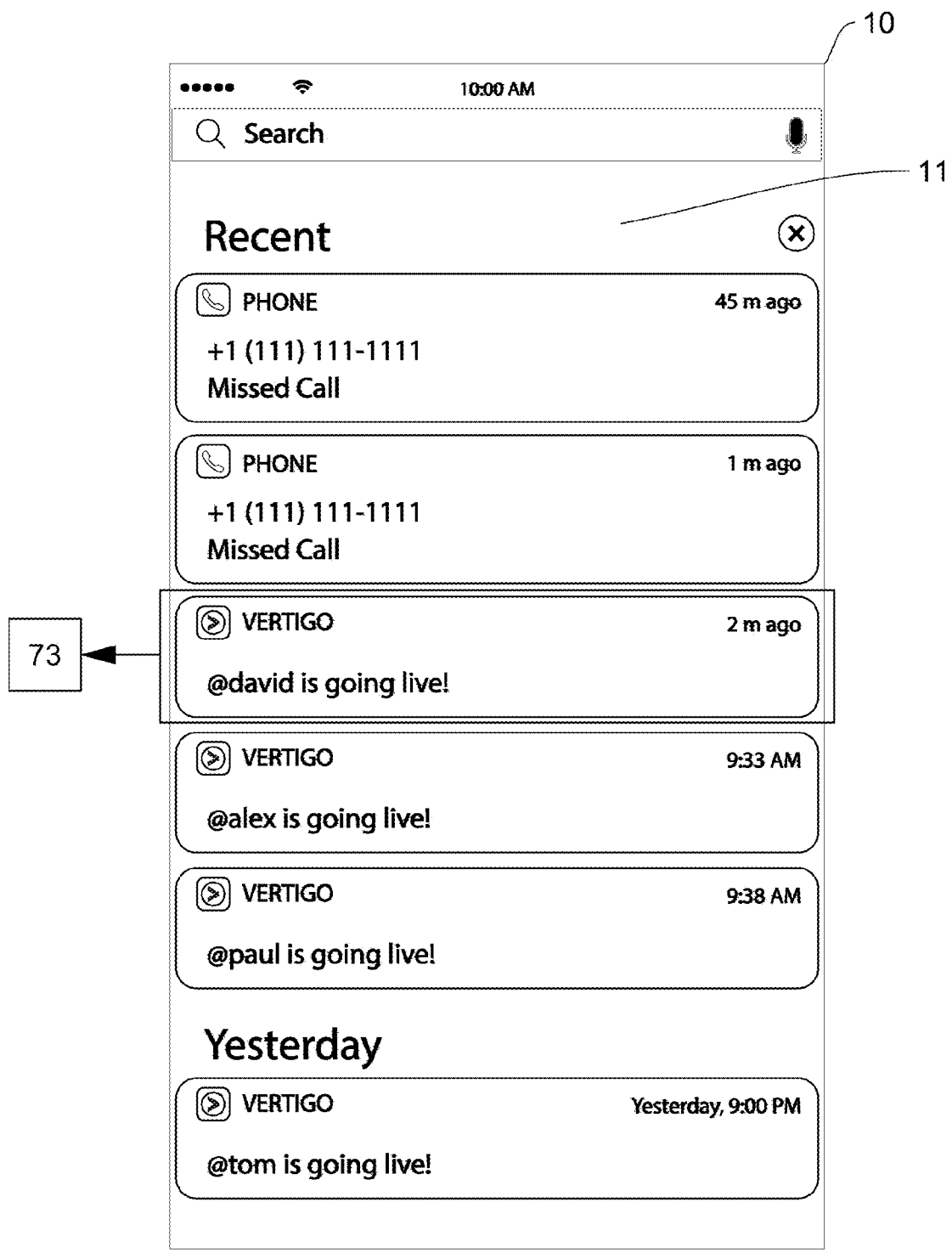
FIG. 28 is an eleventh screenshot enabled by the mobile application central to the practice of the present invention showing a third broadcast joining event screen and highlighting a push notification prompt.

FIGS. 25A through 25C generally depict certain alternative methodology whereby the broadcaster may depress or engage the broadcast initiation prompt or button 69 with the broadcaster's finger 93, and instead of holding the user's finger in engagement with the prompt or button 69, the user may slide the user's finger 93 and or initiation prompt 69 to a lock option as general depicted at lock icon 94. When the lock option is engaged, the user may remove his or her finger from the prompt 69 for recording the audio comment for transmission.

Broadcast events may either be sent over a TCP/IP channel as at TCP socket 86, or can be embedded into the video or audio stream. Video data is preferably transmitted by the broadcasting client 83 over a TCP or UDP channel 146 to the WebRTC server 81, which then relays the data to listening clients as at 84 via TCP or UPD channels 146. Audio data is preferably transmitted by the broadcasting client 83 over a TCP or UDP channel as at 146 to the WebRTC server 81, which then relays the data to listening clients 84 via TCP or UPD channels 146.

Broadcasts can be joined in one of three ways as generally and respectively depicted and referenced in FIGS. 26A, 26B, 27, and 28. In each case, the client application 22 receives a unique identifier that is used by the mobile application 22 to join the session. The first way to join a broadcast is by clicking on the broadcast tile/row in the listen live section of the application as at 71, which action enables the listing client to join a broadcast by sending off session information 152 to the Application Server 80, which then returns connection information as at 154 necessary to establish audio data, video data, and event data channels as at TCP socket 86 and TCP or UDP channel 146. Broadcast participants profile pictures 92 and/or profiles may be presented upon the visual display 11 as generally and comparatively depicted in FIG. 26A versus FIG. 26B. FIG. 26A depicts a "trending" screenshot with enlarged profile picture 92 tiles, and FIG. 26B depicts a "following" screenshot with reduced profile picture 92 bars.

The second way of joining a broadcasting session is by clicking on a link shared from the mobile application 22 via SMS, email or social networks as at 72, which joins a broadcast by sending off session information as at 152 to the Application Server 80, which then returns connection information as at 154 necessary to establish audio data, video data, and event data channels as at TCP socket 86 and TCP or UDP channel 146. The third way of joining a broadcasting session is by opening a push notification delivered to all invited parties of the broadcast as at 73. The client then joins a broadcast by sending off session information as at 152 to the Application Server 80, which then returns connection information as at 154 necessary to establish audio data, video data, and event data channels as at TCP socket 86 and TCP or UDP channel 146.

To initiate a listening session, the user clicks to join a session and the device may (a) retrieve session information as at 154 from remote services via the Application Server 80 and a unique identifier; (b) join all event(s) channel(s) based on information received from the remote services via the TCP socket 86 and TCP or UDP channel 146; (c) initiates music playback (if events require) based off of events received in the playback events channel via TCP socket 86; and starts the video and/or audio streams using the data received from the Media Server or WebRTC 81 (in the case of WebRTC this would be audio and video ICE candidates) via process 146.

Broadcast event fulfillment may occur once a client joins a session and begins to receive broadcast events. Each of the events results in different changes and are processed differently. All event fulfillment is automated with no user interaction required as long as the user is connected to the session, broadcast events fulfillment will continue. All playback events are processed based on timestamp, with the goal of synchronizing video and music. Event execution may be delayed (if required) to ensure that video is in synchrony with music position. Playback events are sent to the SDK 19, and are fulfilled by resolving the song by the song_id as previously explained in the section concerning Synthetic Broadcast-Resource Routing. Once the song is resolved the client initiates playback from the authenticated local source at the position specified by the playback event. A pause event leads to pausing.

Video comments events are likewise executed on a delay, based on timestamp. Video comment events notify the listening client that a video is incoming the following functions occur when a video event is sent. The listening client removes any overlay over the video layer to enable viewing. The listening client could give an audible indication that video is incoming to alert passive listeners to enable their screen for viewing. Audio comment events are executed on a delay, based on timestamp. Audio comment events notify the listening client that an audio is incoming the following functions occur when a video event is sent. Audio to music mix is adjusted to enable the listener to hear the audio comment coming in from the broadcaster.

Figure 29:
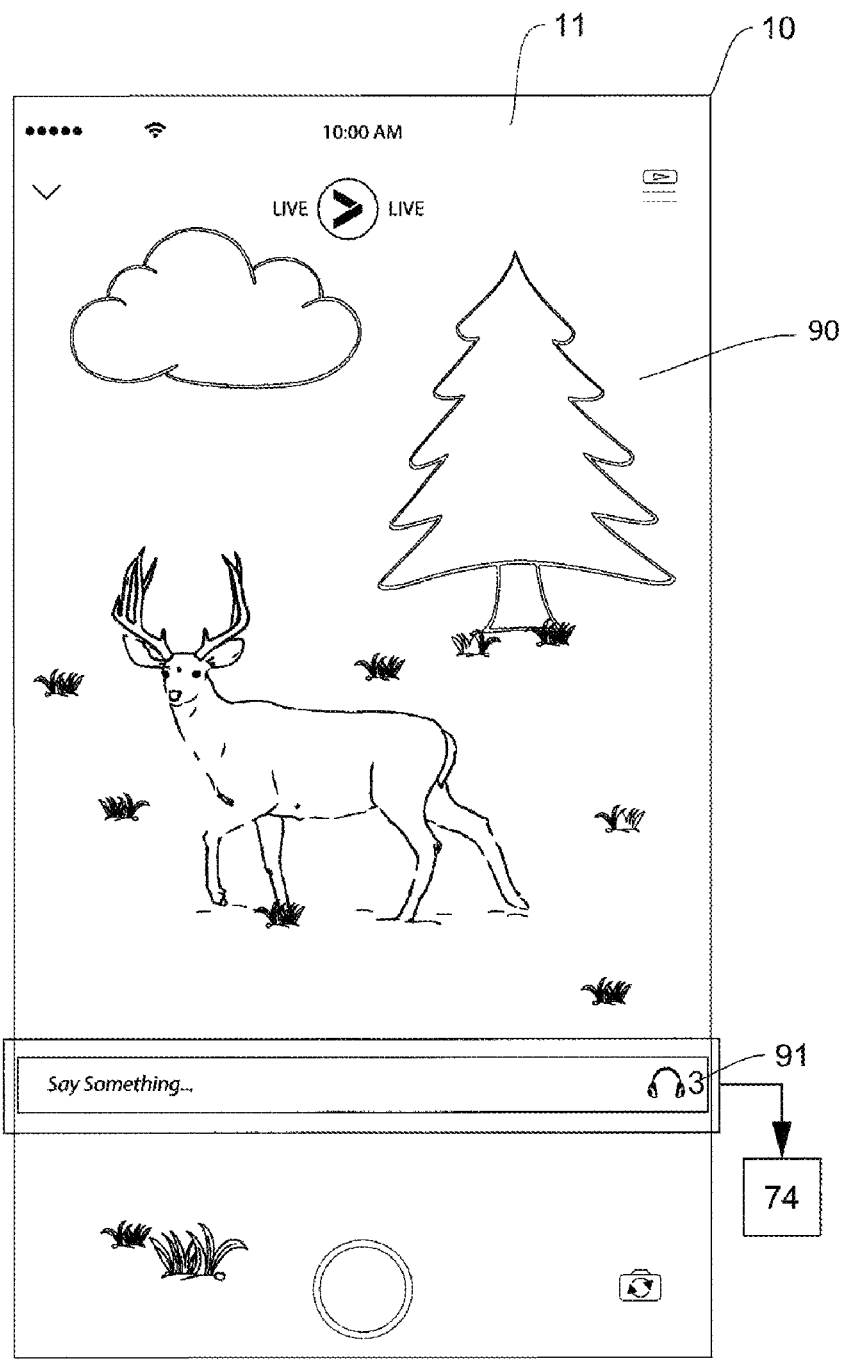
FIG. 29 is a twelfth screenshot enabled by the mobile application central to the practice of the present invention showing a first Chat event screen and highlighting an input box prompt.
Figure 30:
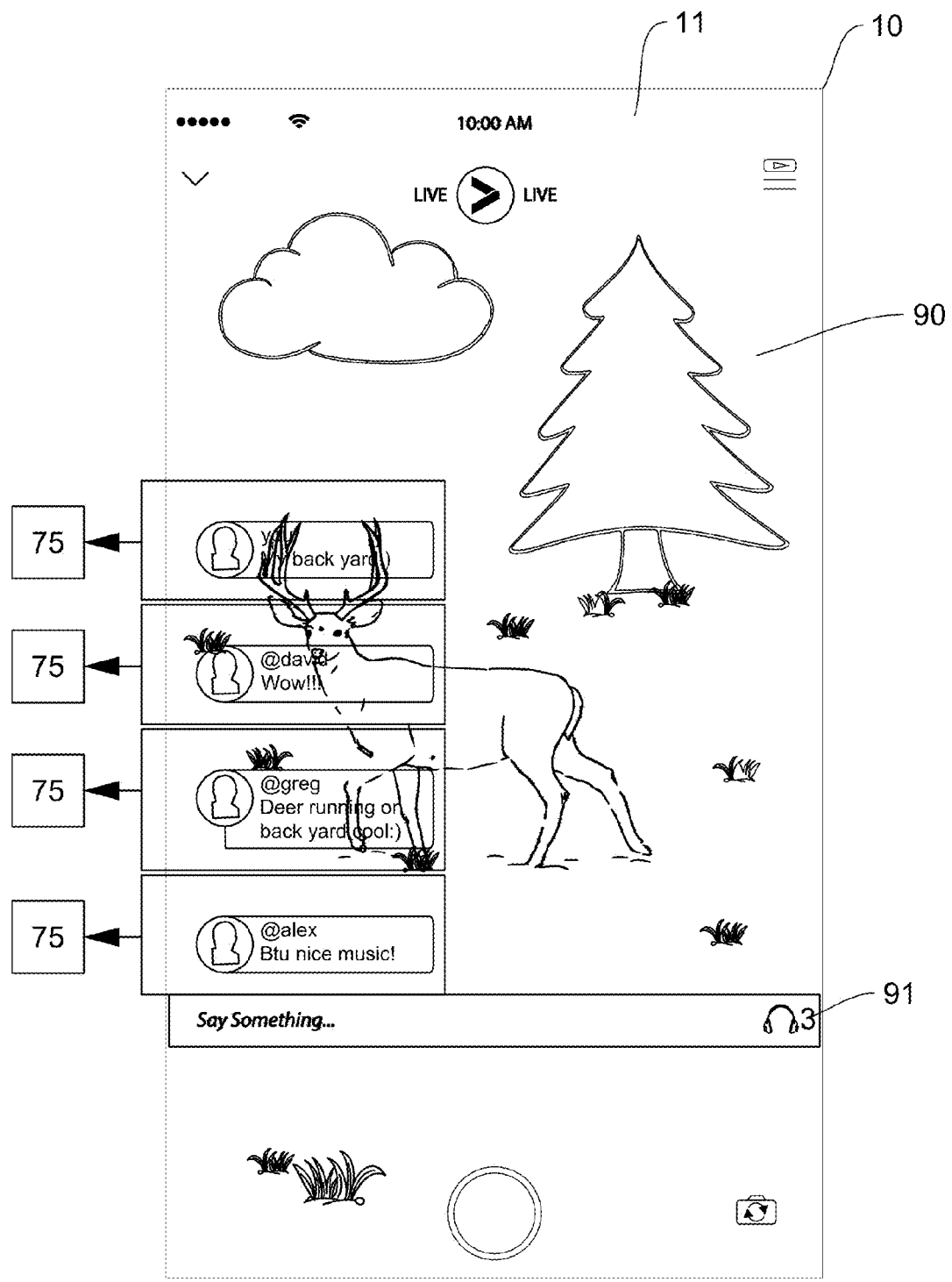
FIG. 30 is a first view of a thirteenth screenshot enabled by the mobile application central to the practice of the present invention showing a second Chat event screen and highlighting Chat history functionality.

Referencing FIGS. 29-31, the reader will there consider certain Chat functionality in accordance with the subject invention. The Chat function of the present invention builds upon the disclosures set forth in U.S. patent application Ser. No. 15/048,480 filed in the USPTO on 19 Feb. 2016, the specifications and drawings of which are hereby incorporated by reference thereto in their entirety. The so-called Chat function allows users to communicate with each other via text within a broadcast. Chat messages are sent from client to client using TCP sockets utilizing a publisher/subscriber model for data delivery substantially as set forth in the '480 application.

As with all events, Chat messages are also displayed in a delayed manner in an attempt to align and appear with the content of either a video or audio stream. Chat messages are input into the input box 74 presented in the application by either listening or broadcasting users. Chat messages appear visually over the video or broadcast commentary as at 75, where they appear for a limited time till they disappear. If a user taps on the Chat input box, all of the Chat history is displayed as at 76 in FIGS. 31 and 31A, allowing the user to scroll and view previous Chat messages. The application may limit the number of Chat-enabled listeners. For example, in the case that a broadcast could have multiple thousands of listeners, if each is given the ability to comment and Chat, it could overwhelm many users, and result in a negative experience.

Examples of how the Chat functionality may include the following. User creates his own playlist which includes songs and embedded messages or short comments between songs or overlaying songs, or whole messages or parts of a message from a podcast. The podcast is integrated into the VERTIGO^SM branded mobile application and or system according to the present invention with legal permission to use its content. The user may also broadcast the playlist, and at the time of broadcast, the user could insert message prerecorded or taken from podcast in whole or partially, thus creating synthetic live broadcast mixed with audio, video, photograph overlays plus the insertion of pre-recorded messages of his own or those of somebody else. Legal access to the podcasts are pre-obtained and the podcast itself may thus be integrated into VERTIGO^SM branded mobile application and or system according to the present invention.

Comparatively referencing FIGS. 32 and 32A, the reader will there consider certain further Chat functionality whereby the Chat history screenshot depicted in FIG. 32 may be outfitted with the number of listeners prompt 91. The prompt 91 may be finger-engaged as generally further depicted din FIG. 32 for prompting a finer listing of broadcast listening clients as shown in FIG. 32A. The listing of broadcasting listening clients depicted in FIG. 32A depicts profile pictured 92 bars for providing information to the broadcasting client as to whom is listening to the broadcast.

Figures 33, 33A:
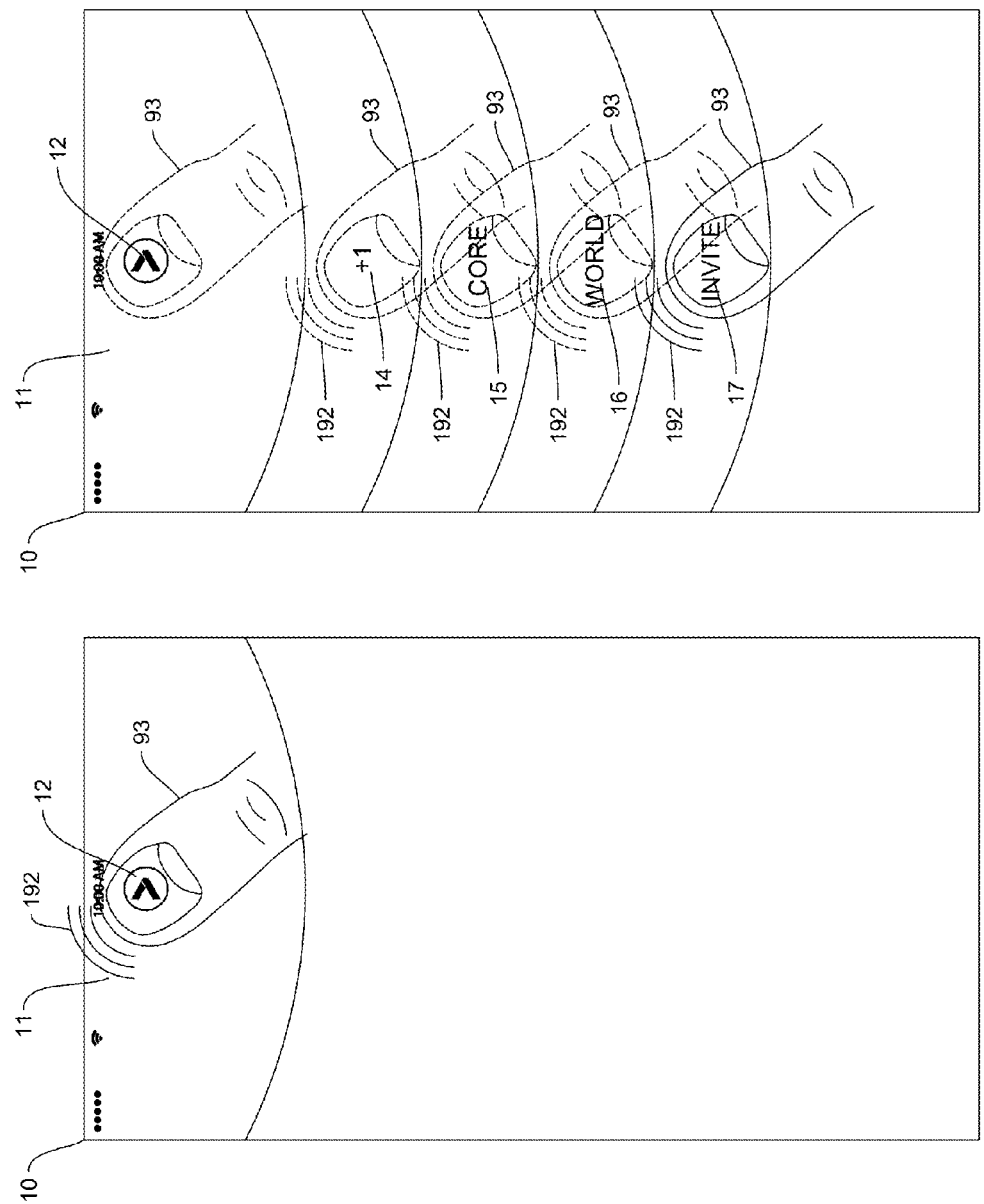
FIG. 33 is a first application initialization screenshot enabled by the mobile application central to the practice of the present invention showing a launch prompt being engaged by a fragmentary user finger.
FIG. 33A is a second application initialization screenshot enabled by the mobile application central to the practice of the present invention showing a launch prompt and a series of socialization scope prompts each being engaged by a fragmentary user finger.

FIGS. 33-37A depict certain secondary screenshots for highlighting certain subroutine functionality of the VERTIGO^SM branded mobile application and or system according to the present invention. FIG. 33 depicts an application initiation screenshot whereby a user may press or touch as at 192 the branded launch or initiation prompt 12. By initiating the application via prompt 12 engagement 192, the group of scope selections or options 13 may be displayed upon the visual display 11 for enabling the user to then make a selection therefrom as generally depicted in FIG. 33A.

Figure 34A:
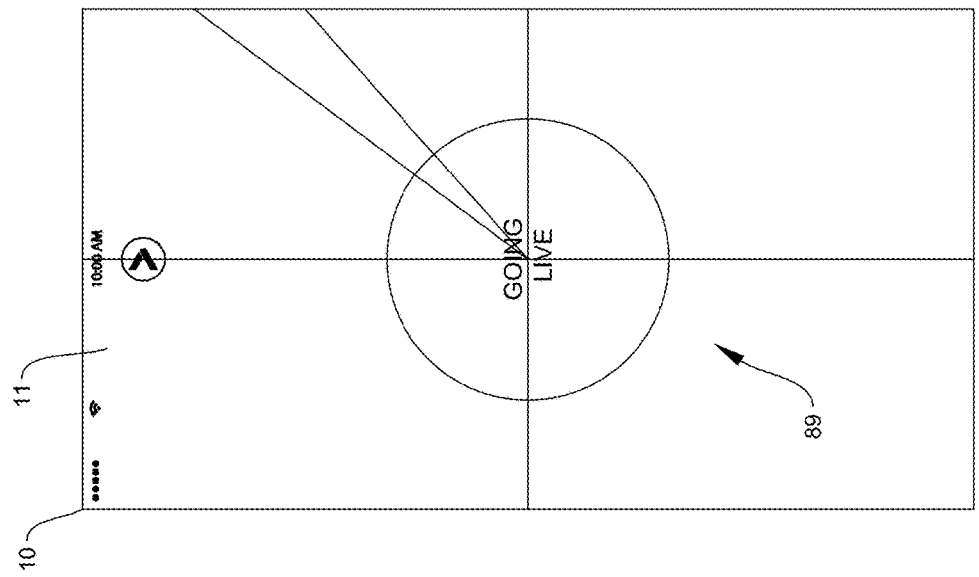
FIG. 34A is an intermediary Go LIVE initialization screenshot enabled by the mobile application central to the practice of the present invention showing a time elapse visual display.
Figure 34:
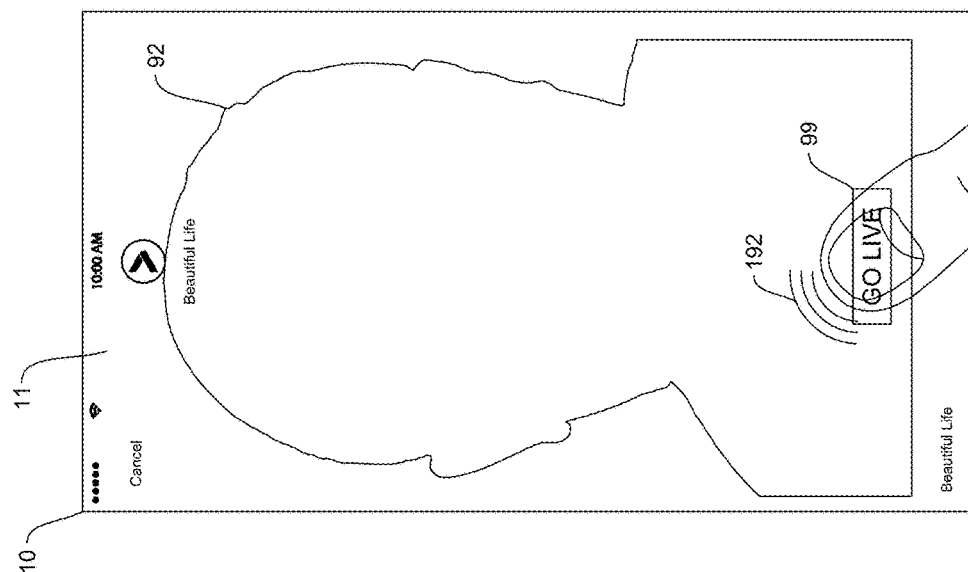
FIG. 34 is a first Go LIVE initialization screenshot enabled by the mobile application central to the practice of the present invention showing a Go LIVE launch prompt being engaged by a fragmentary user finger.
Figure 35:
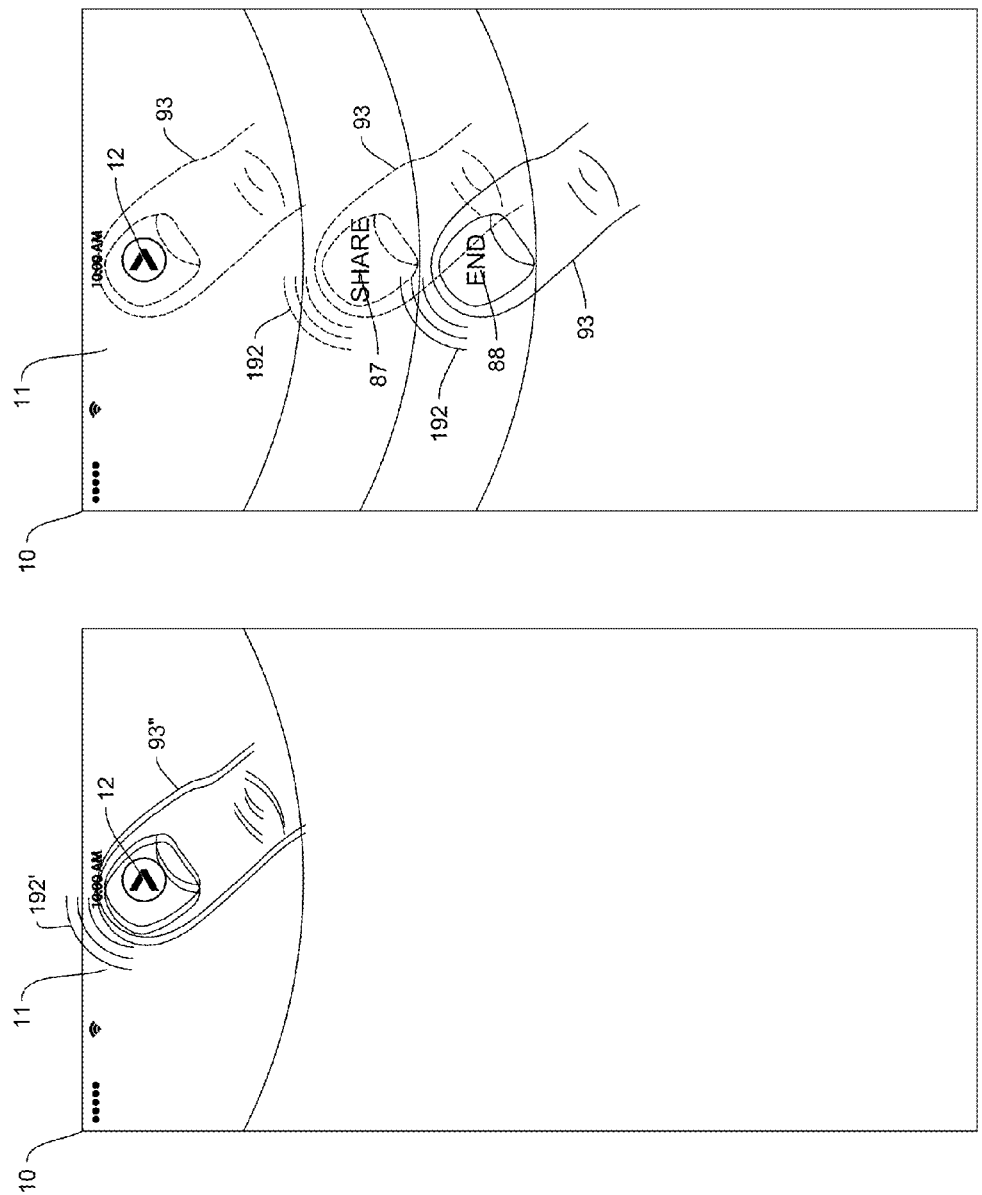
FIG. 35 is a first alternative application initialization screenshot enabled by the mobile application central to the practice of the present invention showing a launch prompt being double-click engaged by a fragmentary user finger.

Once a scope selection has been made as selected from the group of selections or options 13, a Go Live prompt 99 may preferably appear on Go Live screenshot as generally depicted in FIG. 34. The reader will note that the Go Live screenshot generally depicted in FIG. 34 may further preferably portray or show the broadcaster's profile picture as at 92. FIG. 34A depicts an intermediary screenshot showing a time elapse visual display 89 while the broadcast application initiates. FIGS. 35 and 35A comparatively depict screenshot methodology for initiating the application via initiation prompt 12 and double click as at 192 and double finger 93" and a Share/End drop down screenshot for either sharing (broadcasting) content or ending broadcast transmissions via the application as enabled via corresponding prompts 87 and/or 88.

Figure 36:
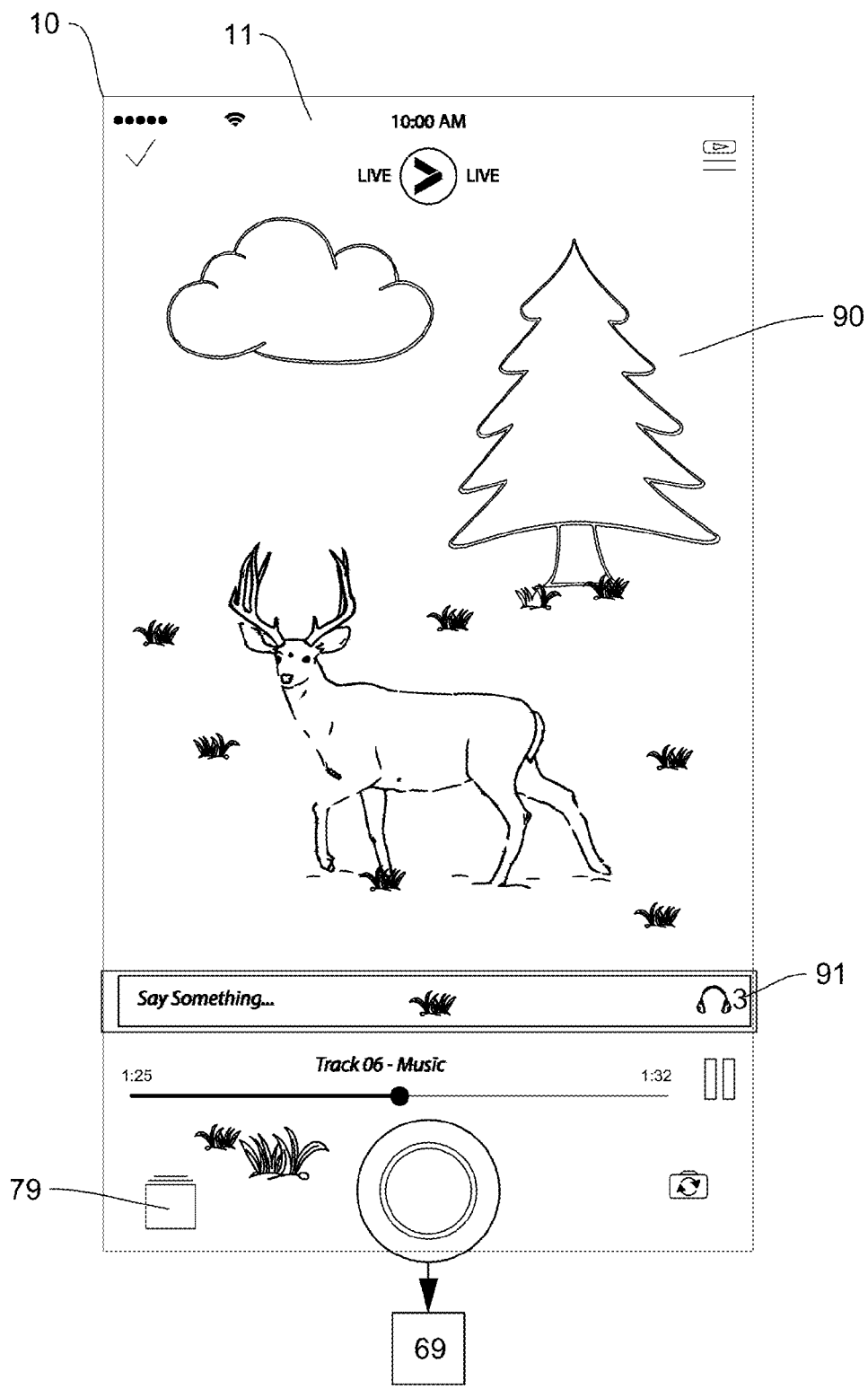
FIG. 36 is an alternative twelfth screenshot enabled by the mobile application central to the practice of the present invention showing the first Chat event screen with input box prompt and highlighting an alternative photo album library or archive prompt.

Referencing FIG. 36, the reader will there consider a photo album library or archive prompt as at 79. By engaging the photo album library or archive prompt 79, the user is taken to an archive screenshot as at 78 in FIGS. 36B and 37. The archive screenshot may provide thumbnail type tiles as at 77 outfitted with tile information such as number of slides in any given album or file as at 59 and runtime for a slideshow for the file contents as at 58.

Figure 36C:
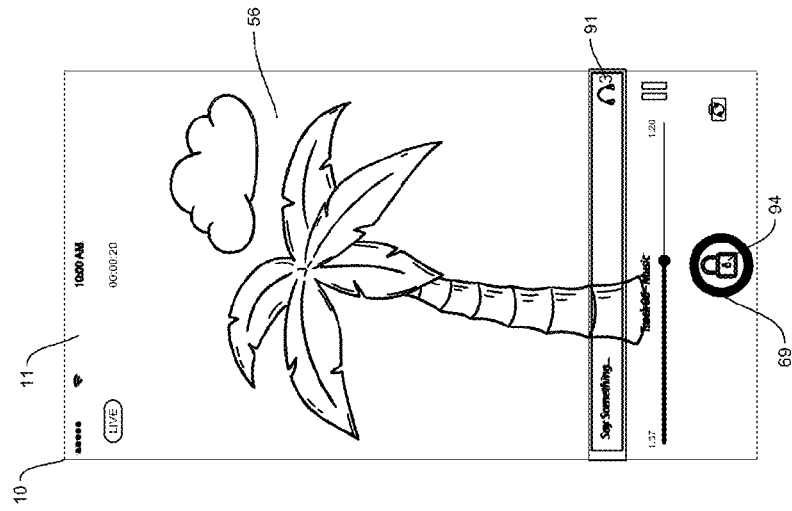
FIG. 36C a third sequential screenshot depiction of first alternative methodology enabled by the mobile application central to the practice of the present invention showing a slideshow screenshot and highlighting a third step of slide-lock functionality for maintaining a select slideshow in a play/run state.
Figure 36B:
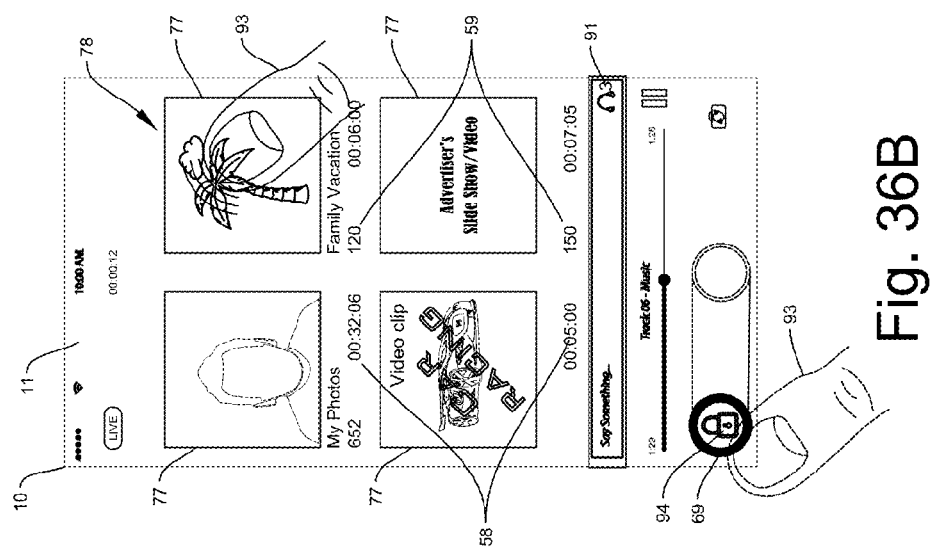
FIG. 36B a second sequential screenshot depiction of first alternative methodology enabled by the mobile application central to the practice of the present invention showing a photo album library screenshot and highlighting a second step of slide-lock functionality for maintaining a select slideshow in a play/run state.
Figure 36A:
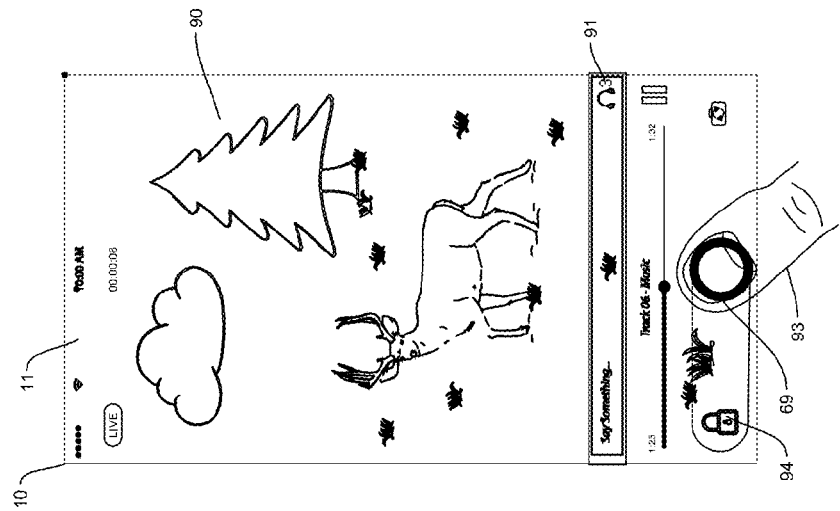
FIG. 36A a first sequential screenshot depiction of first alternative methodology enabled by the mobile application central to the practice of the present invention showing the first Chat event screen with input box prompt and highlighting a first step of slide-lock functionality for maintaining a select slideshow in a play/run state.
Figure 37A:
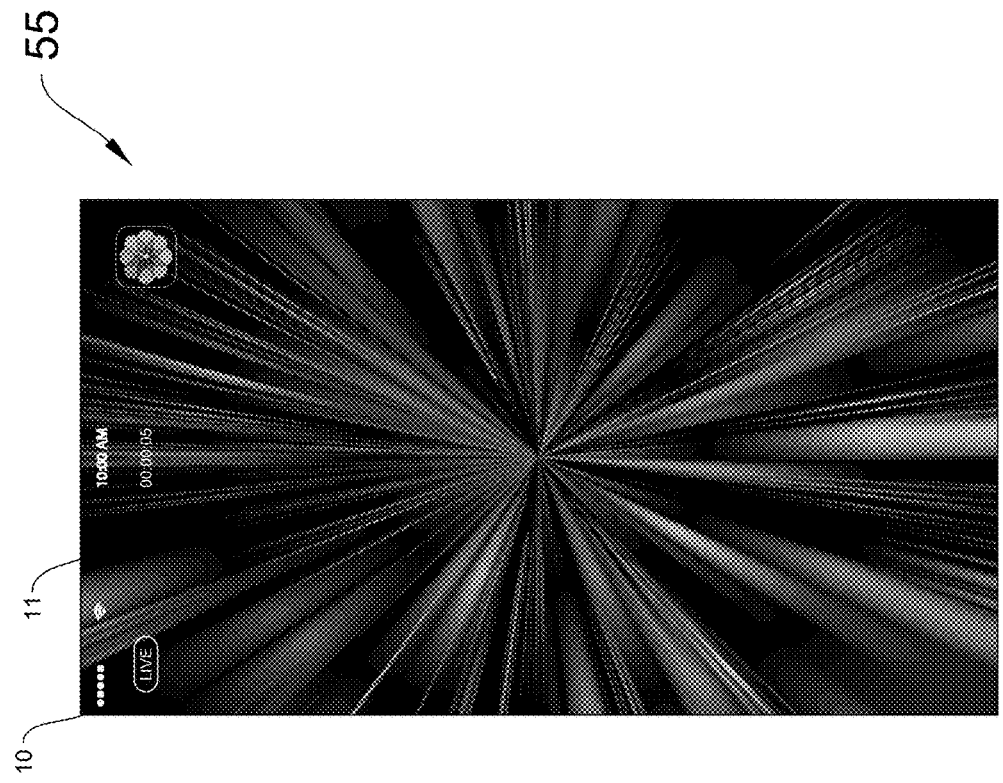
FIG. 37A is a lumiére visual display screenshot as selected from the photo album library screenshot otherwise depicted in FIG. 37.
Figure 37:
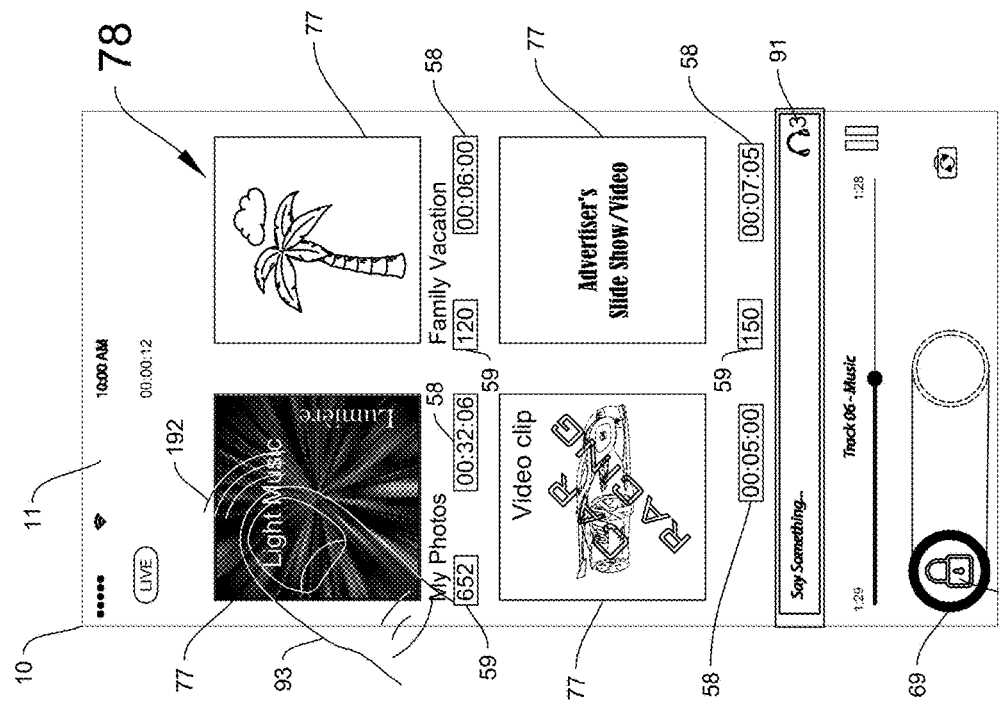
FIG. 37 is an enlarged second sequential screenshot depiction of first alternative methodology enabled by the mobile application central to the practice of the present invention showing a photo album library screenshot and highlighting a photo/video album library from which to select a visual display.

A photo-slideshow screenshot is generally depicted and referenced in FIG. 36C as at 56. FIGS. 36A-36C comparatively show the prompt-lock functionality whereby a user may lock slideshow functionality by sliding the prompt 69 to the lock icon 94 for broadcasting a photo album slideshow. FIGS. 37 and 37A comparatively depict a user's ability to overlay a lumiére visual display 55 over a broadcast selection by pressing 192 the lumiére tile or prompt as at 77 or selecting a lumiére display from a lumiére folder prompt 77.

The description and drawings as filed in this application, in combination with previously filed applications incorporated herein by reference are believed to support a systemic invention providing for either Indirect or Direct source initiation of copyrighted media to be (smartly) routed and consumed via a second Direct source of the same copyrighted media. One effect of such routing is to create a synthetic broadcast where the originating source of the media (e.g. an "Indirect initiating Source") is not actually sent through to the media consumer but rather the consumer's own separate legally compliant "direct" access point and source of the very same copyrighted material is delivered instead.

An "Indirect Initiating Source" may thus be defined as any source whereby the consumer is not "directly" selecting the specific media to be consumed but that media selection is coming from a second "Indirect Initiating Source" whether that source is a computer curated stream such as a digital "radio" provider or an individual live curator. Such (smart) routing or (smart) syncing of an Indirect source to a separate Direct compliant source uniquely enables a legal and compliant collaborative listening or viewing experience of media between two plus people when and where the access to the copyrighted material is derived from two plus separate compliant media sources of that material.

Alternatively, a "Direct Initiating Source" may be defined as a source whereby the consumer is "directly" selecting the specific media to be consumed and that specific media may be obtained from an optimal data resource location from at least two locations to which the consumer has legal access, which optimization protocol is based upon pre-defined user parameters such as price efficiency and/or data quality. Such (smart) routing or (smart) syncing of a such a request to a direct compliant source uniquely enables legal and compliant listening or viewing experience of media when and where the access to the copyrighted material is optimally derived from at least two separate compliant media sources of that material to which the consumer has legal access.

Referencing U.S. patent application Ser. No. 14/099,348, the reader will there consider that the present invention may be said to essentially provide functionality for delivering an indirect request stream from a local server (e.g. digital radio as exemplified by PANDORA® Internet Radio); delivering an indirect request stream from a peer-connected server; delivering an indirect request stream from a second direct request source (e.g. iTunes Match® or Spotify® or cloud locker like DropBox® or any media in the cloud); delivering an indirect request stream from a peer-connected server based on a second direct request source's right to play or stream; delivering a direct request stream from a second direct request source based upon (a) price efficiency or (b) sound quality of source; and delivering a direct request stream from a peer-connected source based upon a second direct request source's right to play or stream.

Given the data origin-agnostic or cloud-agnostic aspects of the present system, the system further provides (a) industry rights management (b) compliance monitoring and/or (c) compliance reporting where delivery of content is sourced from a secondary source other than the original requested source service including the examples listed above. The subject invention thus provides a smart routing synchronization system for providing an optimally sourced broadcast to a consumer comprising certain smart routing means for routing select legally-protected content to a consumer having alternative and preferable source(s) therefor. The smart routing means according to the present invention thereby provides an optimally sourced broadcast ideally and patentably characterized by optimal source delivery of the select legally-protected content to the consumer as prompted by either indirect requests, or direct requests.

The smart source routing according to the present invention may thus be preferably characterized by certain scenario types including local server-based delivery of either indirectly or directly requested streams; peer-connected server-based delivery of either indirectly or directly requested streams; or legal access point-based delivery of either indirectly or directly requested streams, which delivery bases are optimally selected based on pre-defined parameters set or defined by the user, such as price efficiency or audio/video quality.

The present invention is thus directed to real-time synchronization of streaming media content from either indirect or direct initiation sources to a direct source. The ability to source an indirect content stream with an alternative direct source (i.e. a personal and privately owned legal source NOT delivered from a peer-to-peer or computer-populated network) with a governing compliance appliance is believed foundational to the present invention. In other words, a content stream provider such as a digital radio provider is requested by a consumer to consume content from the content stream provider. The content stream provider and the consumer each have different legally owned access points to the content that is be streamed. The consumer may have a legal right to a direct request for this content form the consumer's own source or library, while the provider may stream content from a different source or library.

Figure 38:
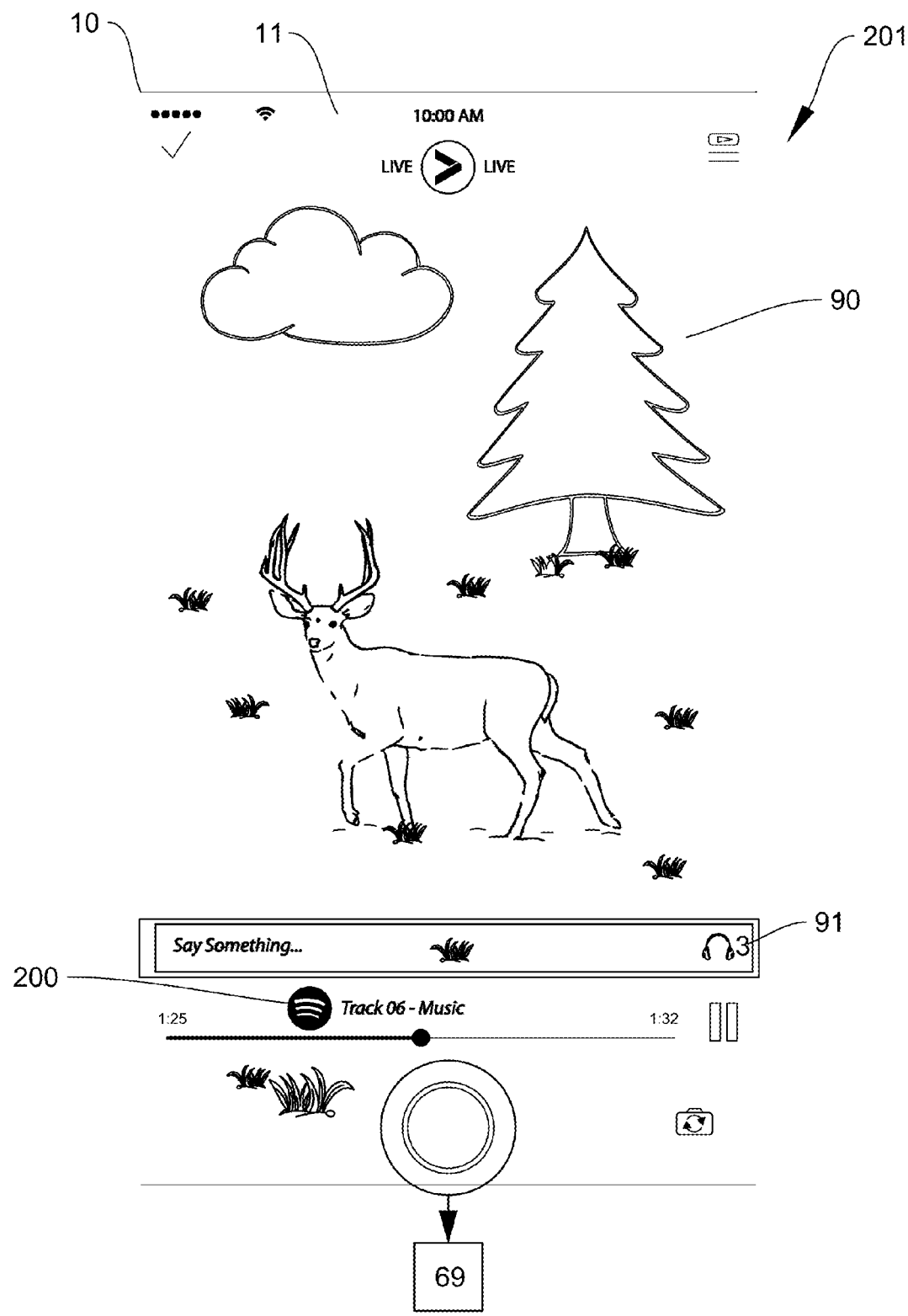
FIG. 38 is a screenshot of an exemplary broadcasting client showing a video representation and a Track 06—Music stream playing upon the broadcasting client both of which may be broadcast or shared with the broadcast listeners of which there are three as further depicted.

A direct access point to the content from the user's own library or from a library to which the user has legal access is thus believed relatively more efficient or cost effective than obtaining access to the content from the library of a provider to which the user has indirect access. Referencing FIGS. 38-38B, the reader will there collectively contemplate an exemplary broadcasting scenario. The broadcasting client "@Paul" is generally depicted and referenced in FIG. 38 as at 201. There the reader will see that "Track 06—Music" is being played upon the 201 device 10 via the client application 22 via the broadcasting user's Spotify® music streaming service account denoted at 200 with three (3) broadcast listeners listening as denoted at broadcasting listeners prompt 91. The broadcaster client 201 thus Shares Live via the video comment button 69 and may enter a comment such as "Saturday relaxing:)" as a social comment overlay with the video representation 90 as the Track 06—Music, video representation and social comment are all broadcast to the three broadcast listener clients.

Figure 38A:
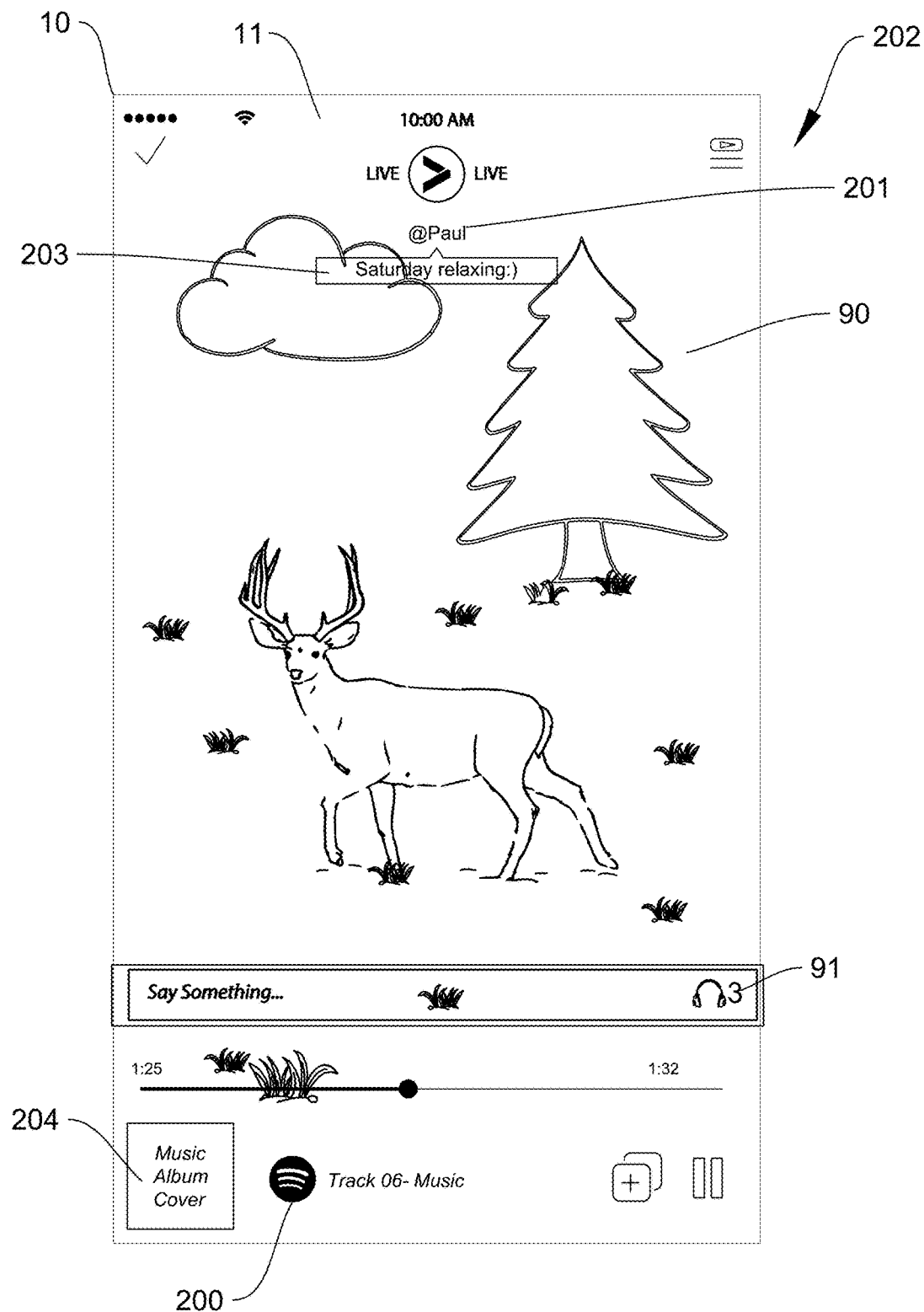
FIG. 38A is a screenshot of an exemplary first broadcast listener client showing the incoming video representation and a Track 06—Music stream being synchronized for playback upon the exemplary first broadcast listener client as sourced from the same provider as the broadcasting client but through a different provider account as a context to the video representation and social commentary provided by the broadcasting client otherwise depicted in FIG. 38.

Referencing FIG. 38A, the reader will there see that a first broadcast listener client is identified as at 202, and the broadcast listener client 202 receives an incoming broadcast from "@Paul" 201 with the text box type comment as at "Saturday relaxing:)" comment 203. The client application 22 upon the broadcast listener client 202 synchronizes the incoming broadcast "Track 06—Music" to the broadcast listing client 202 and the album cover 204 for that particular music track is displayed upon the visual display 11 of the broadcast listener client 202. The reader will note/consider that both the broadcaster client 201 in FIG. 38 and the broadcast listener client 202 in FIG. 38A are consuming synchronized "Track 06—Music" via each user's respective and preferred Spotify® music streaming service account denoted at 200.

Figure 38B:
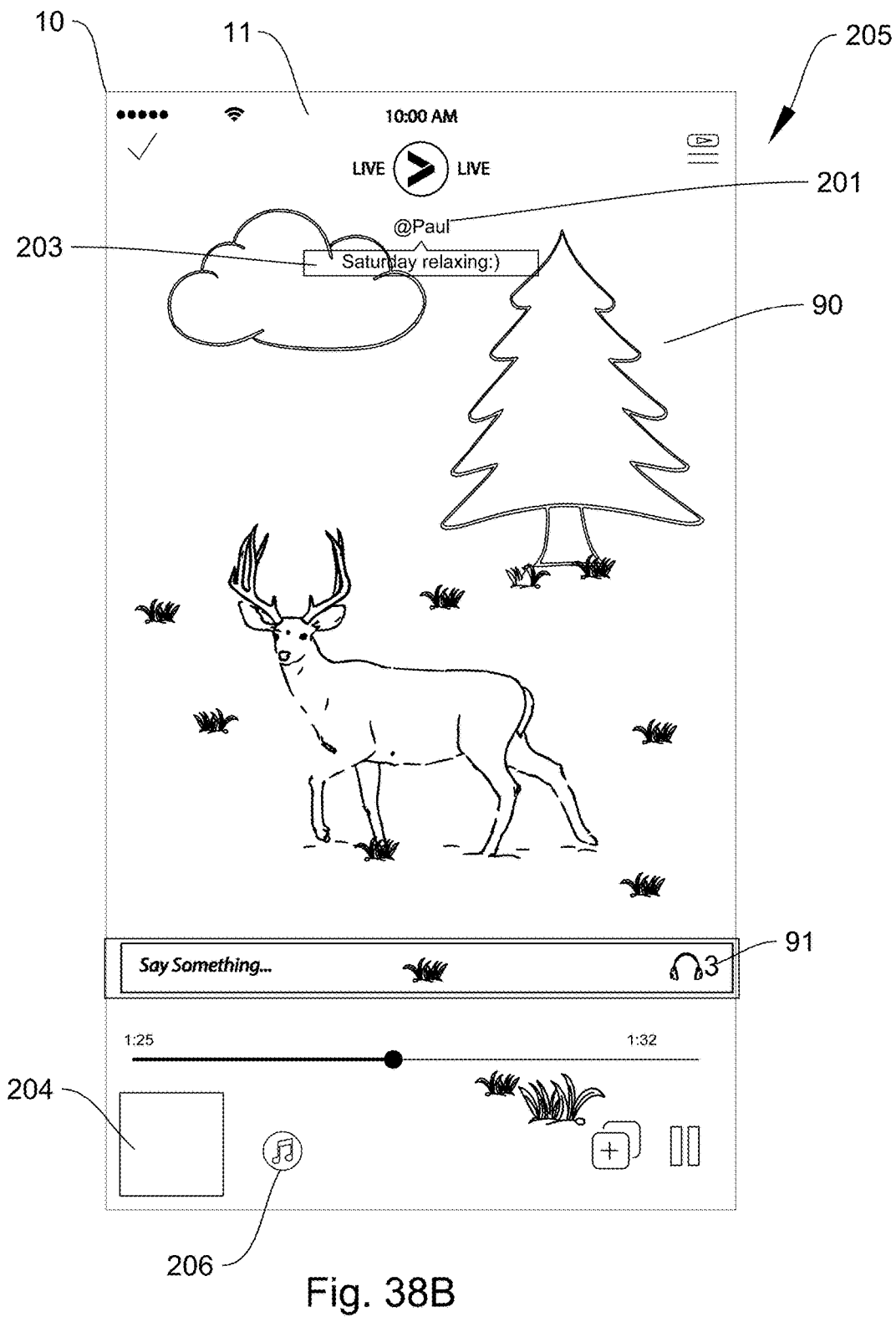
FIG. 38B is a screenshot of an exemplary second broadcast listener client showing the incoming video representation and a Track 06—Music stream being synchronized for playback upon the exemplary second broadcast listener client as sourced from a different provider as a context to the video representation and social commentary provided by the broadcasting client otherwise depicted in FIG. 38.

A second broadcast listener client is generally depicted and referenced in FIG. 38B at 205. Broadcast listener client 205 prefers and is connected to her Apple Music® brand music streaming service account. The client application 22 synchronizes the Track 06—Music from the Apple Music® brand music streaming service account as at 206. Again, the album cover 204 for that particular music track is displayed upon the visual display 11 of the broadcast listener client 205 along with the video representation 90 broadcaster identity 201 and social comment overlay as at 203.

The reader will thus see that content delivery will or should have an impact on compliance reporting by the content provider, and the client application 22 thus includes a compliance appliance for accurately tracking and reporting resulting revenue generation for copyright holders. The data-routing governance system according to the present invention thus goes hand in hand with the music sharing aspects of the present invention for governing and reporting data routing within a content delivery network. The data-routing governance system comprises a data-routing compliance appliance in communication with a routing and synchronization system operable (a) within the content delivery network and (b) with one or more data sources. The content delivery network comprises a plurality of routing instruction fulfillment sources each comprising data files.

The content delivery network delivers select data files to an end user from an optimal data fulfillment source as prompted by a routing instruction generation source. The optimal data fulfillment source is selected from the group comprising the routing instruction fulfillment sources. The routing instruction fulfillment and routing instruction generation sources each define a legal access point. Each legal access point is associated with a data file library. The select data files are sourced to the end user from a select data file library, and the compliance appliance provides (a) industry rights management (b) compliance monitoring and/or (c) compliance reporting of data file transmissions of routed, legally-protected data from the optimal data source location to owners or owner agents of the select data files.

The compliance appliance or engine is operable to generate revenue by routing to optimal sources. In this regard, it is contemplated that the rights to the revenue and ownership percentages can be transferred or created via primary or secondary public or private markets or exchanges. The possible mechanisms for rights and ownership are block chain, and public Exchange Traded Fund or ETF-type structures. In the case of block chain rights transfer, revenue transfer will be distributed by a sub-administrator.

The server registers that sub-domain name to itself and then handles all request to the sub-domain name from the local client application. In this case when a request for the stream is made by a client application, the request is served by the gateway server. The gateway server begins this service by serving the stream from the remote content delivery network via a first channel. Once the stream begins the gateway server requests the pre-recorded audio queue and begins caching the pre-recorded audio from peer-to-peer, remote content delivery network(s), or local sources. The gateway server also preferably loads the events queue from a remote database, which is constantly updated by the studio computer. The gateway server consistently receives updates of events while the stream is live via a second channel.

In order to transition from the full studio mix to the live audio only stream, the gateway server loads both streams and only serves the full mix. In order to ensure that the gateway server and the mixing application have enough time to complete all tasks, the server starts the stream 10-20 seconds from live data reception, creating a custom lag which would be used to create time for the system to execute the mixing and transition. The gateway server waits for an event bit in the full studio mix frame headers to transition to the live audio stream.

The gateway server aligns the two streams at the event bit. This is done by matching the bit code following the event bit. If the bit code matches for both events, the events are considered matched, since only the last 10-15 seconds of a stream are searched. The 32 unique bit codes provide enough uniqueness to guarantee that the matched events are in fact identical. Once event bits are matched, the gateway server transitions from the full studio mix to the live audio mix at the frame in which the event bit occurs. Using this method provides a seamless transition from stream to stream with frame-to-frame accuracy.

The present system thus provides a custom media format for accommodating reference events and routing and playback instructions during an encoding process and which routing and playback instructions are subject to a number of select playback events, the number of select playback events being selected from the group including the following events: (a) play, (b) pause, (c) stop, (d) load, (e) seek, (f) comment, (i) comment start, (ii) comment end, (g) audio mix, (h) playback speed, (j) playback direction, and (k) content identification.

While the above descriptions contain much specificity, this specificity should not be construed as limitations on the scope of the invention, but rather as an exemplification of the invention. For example, it is contemplated that the mobile application or software tool as at 22 according to the present invention essentially provides or enables a non-transitory, computer-implementable, media content-sharing system operable within a computer network environment for providing a media content broadcast to at least one, but preferably a series of content-consuming client computers exemplified by mobile communications devices 10 each of which are outfitted with the client application 22.

The media content-sharing system may be said to comprise computer-implementable functionality for (a) establishing an instruction-passing first channel to each content-consuming client via the computer network environment; (b) generating routing and playback instructions for governing playback of consumable legally-protected media content via a content-delivery second channel; and (c) passing the routing and playback instructions to the content-consuming client via the instruction-passing channel for sourcing consumable legally-protected media content to the content-consuming client from a preferred legal access point. The instruction-passing first channel and the content-delivery second channel may thus be considered concurrent channels as at TCP socket 86 and TCP or UDP channel 146 for effecting concurrent data streams within the network environment. An event-handling micro-service maintains, manages, and synchronizes media and social content delivery within the network environment.

The present invention may thus be alternatively described as essentially providing or enabling a non-transitory, computer-implementable media content-sharing system, which media content-sharing system enables users to share user-selected/generated social content while simultaneously broadcasting preferably sourced media content for consumption by listening clients within a network environment. The media content-sharing system provides concurrent data streams within the network environment for separately and respectively managing (a) media content playback instructions and (b) media content playback. The concurrent data streams function to source consumable legally-protected media content to a broadcast consumer from at least one preferred legal access point while simultaneously enabling social interaction or exchange(s) within the context of the preferably sourced media content. Further, independent social broadcast streams may be overlaid atop direct playback of the consumable legally-protected media content.

The media content broadcast may be preferably characterized by direct source delivery of the consumable legally-protected media content from a consumer-accessible content library, and may be initiated by either of an incoming indirect source and a consumer-affiliated direct source. In the case of a consumer-affiliated direct source, the same may be preferably peer-connected, and thus the consumable legally-protected media content is directly sourced to the content-consuming client based upon the consumer-affiliated direct source's legal right to source said consumable legally-protected media content.

Notably, the media content-sharing system may further preferably comprise or operate in cooperative association with a data-routing governance system for governing and reporting data routing within a content delivery network. The data-routing governance system preferably comprises a compliance appliance for providing (a) industry rights management, (b) compliance monitoring and/or (c) compliance reporting. The compliance appliance thus manages, monitors and/or reports transmission of the variously routed consumable legally-protected content for proper accounting to rights holders. The compliance appliance enables virtual currency generation via preferred source routing governance.

Certain methods supported by the foregoing and incorporated by reference specifications may be said to provide for a subscription-based social media platform implementation method comprising the steps of: server-receiving from a social content broadcasting client computer an Application Programming Interface (API) request for initializing a social exchange atop a media content delivery stream, the API request being generated by an application running on the social content broadcasting client computer; server-storing metadata information of the received API request in a database coupled to a method-enabling server; server-sending a configuration request to an encoding service provider, the configuration request requesting a plurality of stream configurations; server-receiving a protocol location from the encoding service provider; server-storing stream information in the database; server-sending the protocol location to the social content broadcasting client computer; and server-receiving a notification from the social content broadcasting client computer that the social content broadcasting client computer has initiated the social exchange atop the media content delivery stream.

Other aspects of the present invention include timed metadata-based routing and playback instructions. Further, a custom media format accommodates event referencing and routing and playback instructions during an encoding process. The playback event information is preferably and continuously transmitted via facilitated sockets. The preferably sourced media content is sourced by way of a proprietary resolution method to identify and preferably source media content files as controlled by a media content consumer and may be based on parameters such as price efficiency or media quality.

Accordingly, although the inventive system and method have been described by reference to a number of varying exemplary systems and methodologies, it is not intended that the computer-implemented systems and methods be limited thereby, but that modifications thereof are intended to be included as falling within the broad scope and spirit of the foregoing disclosure, the following claims, and the drawings, both diagrammatic and illustrative, submitted in support of these specifications.

What is claimed is:

1. A non-transitory, computer-implementable media content-sharing system, the media content-sharing system being operable within a network-based media content playback environment comprising at least two computers for providing a selectively sourced media content broadcast to at least one consumer of the selectively sourced media content broadcast having access to a first of the least two computers for sharing user-selected/generated social content while simultaneously broadcasting and consuming variously sourced media content within the network environment, the media content-sharing system providing concurrent data streams within the network environment for separately and respectively managing (a) media content playback instructions via an instruction-passing secondary channel of the media content-sharing system and (b) media content playback via a content-delivery primary channel of the media content-sharing system, the concurrent data streams thus for sourcing consumable legally-protected media content to the at least one consumer of the selectively sourced media content broadcast from at least one user-preferred select legal access point for each consumer of the selectively sourced media content broadcast and enabling simultaneous social interaction in the context of variously sourced media content deriving from the respective user-preferred select legal access points.

2. The media content-sharing system of claim 1 wherein playback event information is continuously transmitted via facilitated sockets.

3. The media content-sharing system of claim 1 wherein the variously sourced media content is sourced by way of a proprietary resolution method to identify and source media content files as controlled by each consumer of the selectively sourced media content broadcast.

4. The media content-sharing system of claim 1 comprising a data-routing compliance appliance for providing (a) industry rights management (b) compliance monitoring and/or (c) compliance reporting of data file transmissions of routed, legally-protected data.

5. The media content-sharing system of claim 4 wherein the compliance appliance enables virtual currency generation via optimal source routing governance.

6. The media content-sharing system of claim 1 wherein independent social broadcast streams are sourced to each consumer of the selectively sourced media content broadcast via the instruction-passing secondary channel and media content playback is delivered via the content-delivery primary channel, the independent social broadcast streams thus being simultaneously overlaid atop media content play.

7. The media content sharing system of claim 1 comprising an event-handling micro-service, the event-handling micro-service for maintaining, managing, and synchronizing media and social content delivery within the network environment.

8. A method for implementing a subscription-based social media platform within a network-based media content playback environment comprising at least two computers for providing a selectively sourced media content broadcast to at least one consumer having access to a first of the least two computers, the method comprising the steps of:
server-receiving from a social content broadcasting client computer an Application Programming Interface (API) request for initializing a social exchange via an instruction-passing secondary channel in parallel to a content-delivery primary channel, the API request thereby being atop a media content delivery stream, the API request being generated by an application running on the social content broadcasting client computer;
server-storing metadata information of the received API request in a database coupled to a method-enabling server;
server-sending a configuration request to an encoding service provider, the configuration request requesting a plurality of stream configurations;
server-receiving a protocol location from the encoding service provider;
server-storing stream information in the database;
server-sending the protocol location to the social content broadcasting client computer; and
server-receiving a notification from the social content broadcasting client computer that the social content broadcasting client computer has initiated the social exchange atop the media content delivery stream.

* * * * *